US007830347B2

(12) United States Patent
Goto et al.

(10) Patent No.: US 7,830,347 B2
(45) Date of Patent: Nov. 9, 2010

(54) LIQUID CRYSTAL DISPLAY DEVICE WITH INFLUENCES OF OFFSET VOLTAGES REDUCED

(75) Inventors: Mitsuru Goto, Chiba (JP); Hiroshi Katayanagi, Chiba (JP); Yukihide Ode, Mobara (JP); Yoshiyuki Saitou, Mobara (JP); Koichi Kotera, Kokubunji (JP)

(73) Assignees: Hitachi, Ltd., Tokyo (JP); Hitachi Device Engineering Co., Ltd., Chiba-Ken (JP); Hitachi Ulsi Systems Co., Ltd., Tokyo (JP)

( * ) Notice: Subject to any disclaimer, the term of this patent is extended or adjusted under 35 U.S.C. 154(b) by 622 days.

(21) Appl. No.: 11/862,433

(22) Filed: Sep. 27, 2007

(65) Prior Publication Data

US 2008/0024419 A1 Jan. 31, 2008

Related U.S. Application Data

(60) Division of application No. 10/832,435, filed on Apr. 27, 2004, now Pat. No. 7,417,614, which is a continuation of application No. 10/143,796, filed on May 14, 2002, now Pat. No. 6,731,263, which is a continuation of application No. 09/260,076, filed on Mar. 2, 1999, now Pat. No. 6,388,653.

(30) Foreign Application Priority Data

Mar. 3, 1998 (JP) ................................ 10-050699

(51) Int. Cl.
*G06F 3/038* (2006.01)
*G09G 3/36* (2006.01)

(52) U.S. Cl. ............................ 345/96; 345/89; 345/98; 345/100; 345/209; 345/690

(58) Field of Classification Search ........... 345/55–100, 345/204–214, 690–697
See application file for complete search history.

(56) References Cited

U.S. PATENT DOCUMENTS 4,138,649 A 2/1979 Schaffer
4,902,981 A 2/1990 Gard et al.

(Continued)

FOREIGN PATENT DOCUMENTS

JP 55-1702 1/1980

(Continued)

*Primary Examiner*—David L Lewis
(74) *Attorney, Agent, or Firm*—Antonelli, Terry, Stout & Kraus, LLP.

(57) ABSTRACT

A liquid crystal display device includes drain signal lines, gate signal lines, thin film transistors, and a drain driver. The drain driver includes an amplifier circuit having a switching circuit which switches between a first state and a second state, the first state being a state where a first input terminal of the amplifier circuit is coupled to an inverting input terminal and a second input terminal is coupled to a noninverting input terminal, and the second state being a state where the first input terminal is coupled to the noninverting input terminal and the second input terminal is coupled to the inverting input terminal. The amplifier circuit supplies signal voltages to the thin film transistors via the drain signal lines which are gray scale voltages one of plus and minus offset voltages in a first frame and in a second frame.

6 Claims, 49 Drawing Sheets

U.S. PATENT DOCUMENTS

| | | | | | |
|---|---|---|---|---|---|
| RE34,428 | E | | 11/1993 | George et al. | |
| 5,334,944 | A | | 8/1994 | Hirakata | |
| 5,467,009 | A | | 11/1995 | McGlinchey | |
| 5,706,024 | A | | 1/1998 | Park | |
| 5,724,057 | A | | 3/1998 | Kimura et al. | |
| 5,831,605 | A | | 11/1998 | Yasui et al. | |
| 5,909,146 | A | | 6/1999 | Okada | |
| 5,995,073 | A | | 11/1999 | Isami et al. | |
| 6,046,736 | A | | 4/2000 | Atherton | |
| 6,140,876 | A | | 10/2000 | Yero | |
| 6,140,989 | A | * | 10/2000 | Kato | 345/89 |
| 6,157,360 | A | | 12/2000 | Jeong et al. | |
| 6,166,725 | A | | 12/2000 | Isami et al. | |
| 6,184,855 | B1 | | 2/2001 | Kobayashi et al. | |
| 6,480,178 | B1 | * | 11/2002 | Itakura et al. | 345/89 |

FOREIGN PATENT DOCUMENTS

| | | |
|---|---|---|
| JP | 59-149408 | 8/1984 |
| JP | 1-202909 | 8/1989 |
| JP | 4-38004 | 2/1992 |
| JP | 5-232898 | 9/1993 |
| JP | 9-281930 | 10/1997 |

* cited by examiner

ODD-NUMBERED FRAME

EVEN-NUMBERED FRAME

FIG. 38A
| D1 | D0 | CLOSED SW | OUTPUT | FIGS. |
|---|---|---|---|---|
| 0 | 0 | S1 | Va | 38B |
| 0 | 1 | S2, S3 | Va+1/4ΔV | 38C |
| 1 | 0 | S3, S5 | Va+2/4ΔV | 38D |
| 1 | 1 | S2, S4 | Va+3/4ΔV | 38E |
FIG. 38B
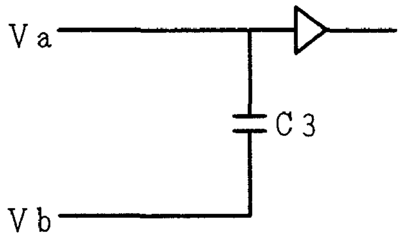
FIG. 38C
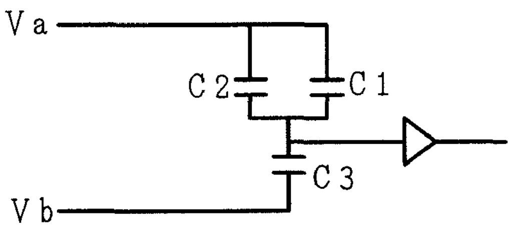
FIG. 38D
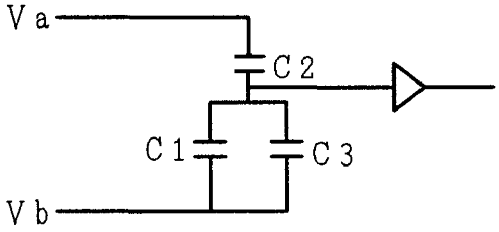
FIG. 38E
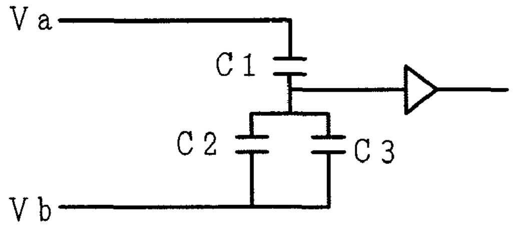

LIQUID CRYSTAL DISPLAY DEVICE WITH INFLUENCES OF OFFSET VOLTAGES REDUCED

CROSS REFERENCE TO RELATED APPLICATION

This is a division of U.S. application Ser. No. 10/832,435, filed Apr. 27, 2004, now U.S. Pat. No. 7,417,614, which is a continuation of U.S. application Ser. No. 10/143,796, filed May 14, 2002, now U.S. Pat. No. 6,731,263, which is a continuation of U.S. application Ser. No. 09/260,076, filed Mar. 2, 1999, now U.S. Pat. No. 6,388,653, the subject matter of which is incorporated by reference herein.

BACKGROUND OF THE INVENTION

The present invention relates to a liquid crystal display device, and more particularly to a technique effectively applied to a video signal line driver circuit (drain driver) of a liquid crystal display device capable of carrying out multi-gray scale display.

A liquid crystal device of an active matrix type having an active element (for example, a thin film transistor) for each pixel and switching the active element is widely used as a display device of a notebook personal computer or the like.

In the active matrix type liquid crystal display device, a video signal voltage (a gray scale voltage in correspondence with display data; hereinafter referred to as a gray scale voltage) is applied to a pixel electrode via an active element and accordingly, there is produced no crosstalk among respective pixels, a special driving method need not be used for preventing crosstalk as in a simple matrix type liquid crystal display device and multi-gray scale display is feasible.

There has been known as one of the active matrix type liquid crystal display device, a liquid crystal display module of a TFT (Thin Film Transistor) type having a liquid crystal display panel of a TFT type (TFT-LCD), drain drivers arranged at the top side of the liquid crystal display panel and gate drivers and an interface circuit arranged at the side of the liquid crystal display panel.

In the liquid crystal display module of the TFT type, there are provided in the drain driver, a multi-gray scale voltage generating circuit, a gray scale voltage selector for selecting one gray scale voltage in correspondence with display data from among a plurality of gray scale voltages generated by the multi-gray scale voltage generating circuit and an amplifier circuit receiving the one gray scale voltage selected by the gray scale voltage selector.

In this case, the gray scale voltage selector is supplied with respective bit values of the display data via a level shift circuit.

Further, such a technique is described in, for example, Japanese Patent Laid-Open No. Hei 9-281930 (corresponding to U.S. application Ser. No. 08/826,973 filed on Apr. 9, 1997, now U.S. Pat. No. 5,995,073).

The concept of eliminating offset voltages in amplifiers is disclosed in the following patent applications or patents: Japanese Patent Laid-Open Nos. Sho 55-1702 (Application No. Sho 53-72691, laid open on Jan. 8, 1980); Sho 59-149408 (Application No. Sho 59-17278, laid open on Aug. 27, 1984); Hei 1-202909 (Application No. Sho 63-26572, laid open on Aug. 15, 1989); Hei 4-38004 (Application No. Hei 2-145827, laid open on Feb. 7, 1992); U.S. Pat. No. 4,902,981 (application Ser. No. 07/283,149, issued on Feb. 20, 1990); U.S. Pat. No. Re. 34,428 (application Ser. No. 07/846,442, reissued on Nov. 2, 1993); and U.S. Pat. No. 5,334,944 (application Ser. No. 08/168,399, issued on Aug. 2, 1994).

In recent years, in liquid crystal display devices of a liquid, crystal display module of a TFT type or the like, the number of steps of gray scales is increasing from 64 to 256 and a voltage step per gray scale (a voltage difference between two successive gray scale voltages) in the plurality of gray scale voltages generated by the multi-gray scale voltage generating circuit becomes small.

An offset voltage is produced in the amplifier circuit by variations in properties of active elements constituting the amplifier circuit and when the offset voltage is produced in the amplifier circuit, an error is caused in an output voltage from the amplifier circuit and the output voltage from the amplifier circuit becomes a voltage different from a specified gray scale.

Thereby, there poses a problem in that black or white vertical lines are generated in a display screen displayed in the liquid crystal display panel (TFT-LCD) and display quality is significantly deteriorated. A liquid crystal display device of a liquid crystal display module of a TFT type or the like has a tendency toward a larger screen size and a higher display resolution (a larger number of pixels) of a liquid crystal display panel (TFT-LCD), and also there is requested a reduction of the border areas such that areas other than a display area of the liquid crystal display panel are made as small as possible in order to eliminate non-useful area and achieve aesthetic qualities as a display device.

Further, the level shift circuit installed at the first stage of the gray scale voltage selector is constituted by transistors having a high voltage breakdown capacity between the source and the drain.

However, when transistors having a high-voltage rating are used as the transistors for the level shift circuit, there poses a problem in that an area of the level shift circuit becomes large in a semiconductor integrated circuit (IC chip) constituting the drain driver, the chip size of the semiconductor integrated circuit constituting the drain driver becomes large, the unit cost of the chip cannot be lowered and the reduction of the border areas cannot be achieved.

Further, conventionally, in a liquid crystal display device, a higher resolution liquid crystal display panel has been requested, the resolution of a liquid crystal display panel has been enlarged from 640×480 pixels of a VGA (Video Graphics Array) display mode to 800×600 pixels of an SVGA (Super VGA) display mode. In recent years, in a liquid crystal display device, in accordance with a request for a larger, screen size of a liquid crystal display panel, as a resolution of a liquid crystal display panel, there has been requested a further higher resolution of 1024×768 pixels of an XGA (Extended Video Graphics Array) display mode, 1280×1024 pixels of an SXGA (Super Extended Video Graphics Array) display mode or 1600×1200 pixels of a UXGA (Ultra Extended Video Graphics Array) display mode.

In accordance with such a higher resolution of a liquid crystal panel, a display control circuit, drain drivers and gate drivers are obliged to carry out high-speed operation, and more particularly, there has been requested high-speed operation for a clock for latching display data (CL2) outputted from the display control circuit to the drain driver and an operating frequency of display data.

Thereby, there poses a problem in that a timing margin is reduced when display data is latched inside of a semiconductor integrated circuit constituting the drain driver.

SUMMARY OF THE INVENTION

The present invention has been carried out in order to solve the problems of the conventional technologies mentioned above and it is an object of the present invention to provide a technique capable of improving display quality of a display screen displayed on a liquid crystal display element by preventing black or white vertical lines caused by an offset voltage from being produced in the display screen, of the liquid crystal display element in an amplifier of a video signal line driver circuit in a liquid crystal display device.

It is another object of the present invention to provide a technique capable of reducing the chip size of a semiconductor integrated circuit constituting a video signal line driver circuit by using lower source-drain voltage rating transistors in a level shift circuit of the video signal line driver circuit in a liquid crystal display device.

It is another object of the present invention to provide a technique capable of ensuring a timing margin when display data is latched inside of a semiconductor integrated circuit constituting a video signal line driver circuit even if high-speed clock operation is performed in latching display data as well as an operating frequency of display data in a liquid crystal display device.

The above-described objects and novel features of the present invention will become apparent by description and attached drawings in the specification.

In accordance with one embodiment of the present invention, there is provided a liquid crystal display device including a plurality of pixels adapted to be supplied with respective video signal voltages, and a plurality of video signal driver circuits which output respective output voltages and supply the output voltages to the plurality of pixels as the video signal voltages. Each of the plurality of video signal driver circuits includes a pair of amplifier circuits which supply a respective one of the video signal voltages to one of the plurality of pixels. The pair of amplifier circuits includes a first amplifier circuit including a first output terminal, a first input terminal, and a second input terminal, and a second amplifier circuit including a second output terminal, a third input terminal, and a fourth input terminal. Each of the plurality of video signal driver circuits further includes a first connecting circuit switchable between a first connection in which an output voltage output from the first output terminal is input to the first input terminal as a reference voltage, and a second connection in which the output voltage output from the first output terminal is input to the second input terminal as a reference voltage, and a second connecting circuit switchable between a third connection in which an output voltage output from the second output terminal is input to the third input terminal as a reference voltage, and a fourth connection in which the output voltage output from the second output terminal is input to the fourth input terminal as a reference voltage.

BRIEF DESCRIPTION OF THE DRAWINGS

In the accompanying drawings, in which like reference numerals designate similar components throughout the figures, and in which:

FIGS. 4A, 4B show diagrams for explaining a polarity of a liquid crystal drive voltage outputted from a drain driver to a drain signal line (D) when a dot-inversion drive method is used as a method of driving the liquid crystal display module in which FIG. 4A shows an example of an odd-numbered frame and FIG. 4B shows an example of an even-numbered frame;

FIGS. 13A, 13B are diagrams for explaining reasons for which vertical lines are caused in a liquid crystal display panel due to the offset voltage (Voff) in which FIG. 13A shows a case in which vertical lines are caused and FIG. 13B shows a case in which they are not caused;

FIGS. 38A, 38B, 38C, 38D and 38E are diagrams for explaining operation of a secondary gray scale voltage generating circuit shown in FIG. 37 in which FIGS. 38B, 38C, 38D and 38E show a constitution of the secondary gray scale voltage generating circuit corresponding to lower-order two bits of display data;

DETAILED DESCRIPTION OF THE PREFERRED EMBODIMENTS

An explanation of embodiments of the present invention will be given with reference to the drawings.

Figure 1:
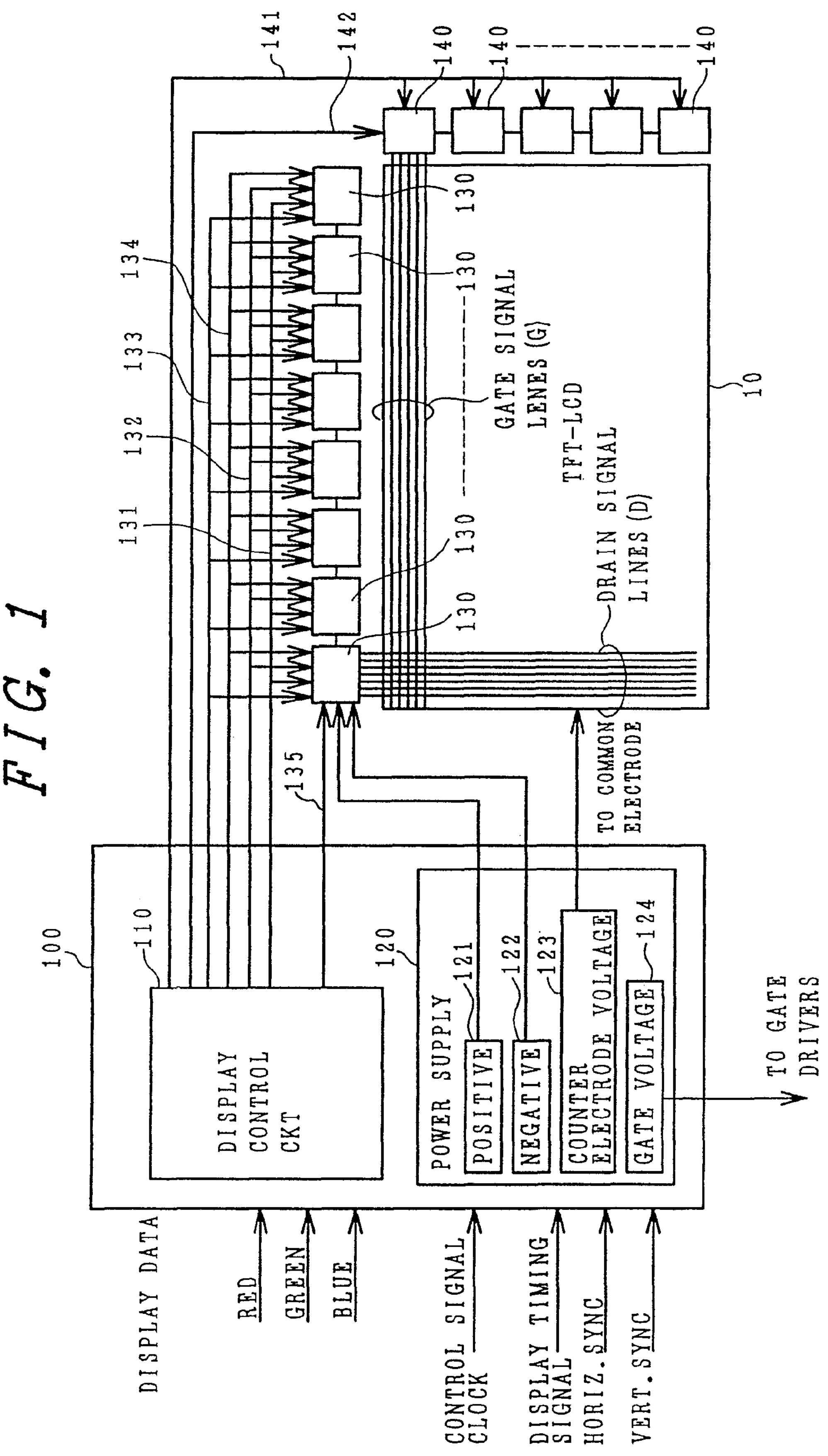
FIG. 1 is a block diagram showing a schematic constitution of a liquid crystal display module of a TFT type according to Embodiment 1 of the present invention.

To be more specific, all of the drawings for explaining embodiments of the present invention, portions having the same functions are attached with the same notations and repeated explanation thereof will be omitted. Embodiment 1 FIG. 1 is a block diagram showing a schematic constitution of a liquid crystal display module of a TFT type according to Embodiment 1 of the present invention. In a liquid crystal display module (LCM), drain drivers 130 are arranged on the upper side of a liquid crystal display panel (TFT-LCD) 10, further, gate drivers 140 and an interface circuit 100 are arranged at the sides of the liquid crystal display panel 10.

The interface circuit 100 is mounted to an interface board, further, also the drain drivers 130 and the gate drivers 140 are mounted to special TCPs (Tape Carrier Packages), respectively, or directly on the liquid crystal display panel.

Figure 2:
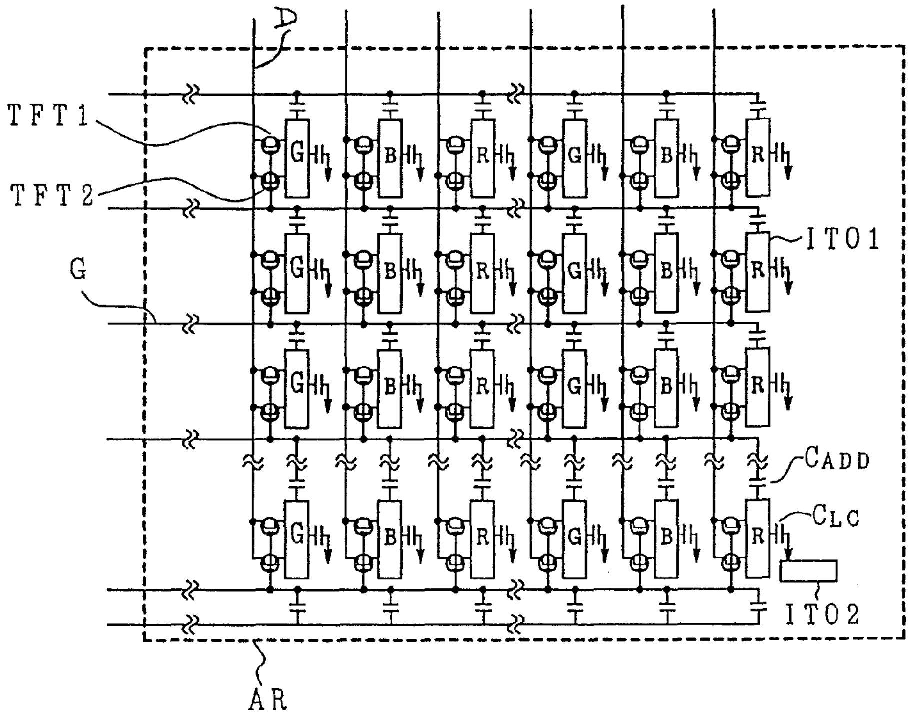
FIG. 2 is a diagram showing an equivalent circuit of an example of a liquid crystal panel shown in FIG. 1.

FIG. 2 is a diagram showing an equivalent circuit of an example of the liquid crystal display panel 10. As shown in FIG. 2, the liquid crystal display panel 10 is provided with a plurality of pixels arranged in a matrix.

Each pixel is arranged in an area surrounded by two adjacent drain signal lines (D) and two adjacent gate signal lines (G) intersecting with the two drain signal lines. Each pixel is provided with two thin film transistors (TFT1, TFT2) and source electrodes of the thin film transistors (TFT1, TFT2) of each pixel are connected to a pixel electrode (ITO1). A liquid crystal layer is provided between the pixel electrode (ITO1) and a common electrode (ITO2) and accordingly, electrostatic capacitance of the liquid crystal layer (CLC) is equivalently connected between the pixel electrode (ITO1) and the common electrode (ITO2).

Further, additional capacitance (CADD) is connected between the source electrodes of the thin film transistors (TFT1, TFT2) and a preceding one of the gate signal line (G).

Figure 3:
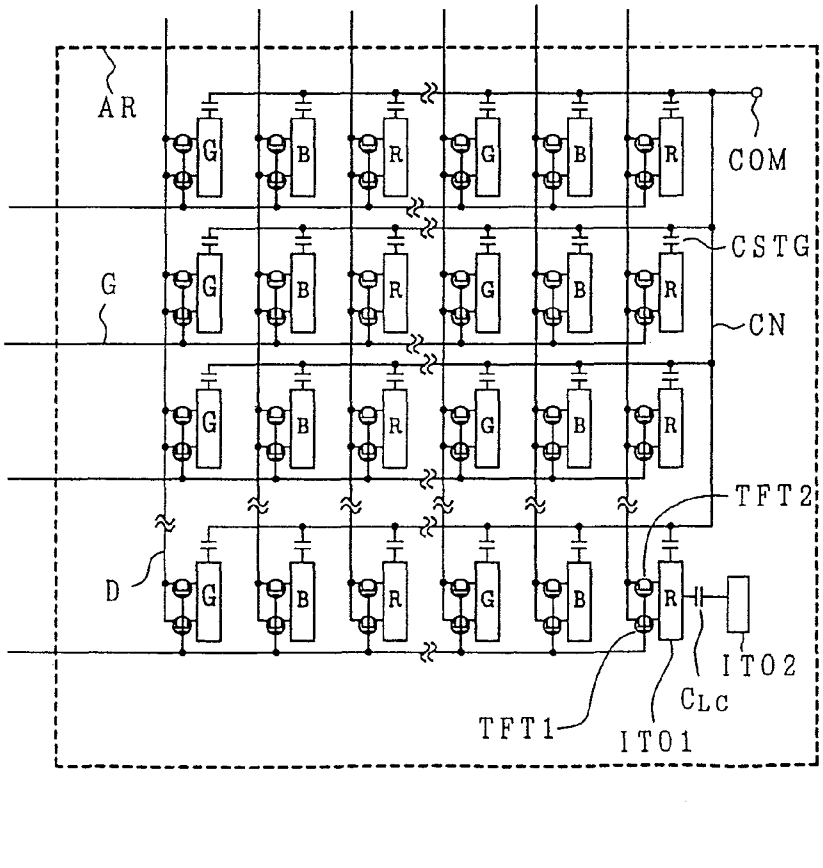
FIG. 3 is a diagram showing an equivalent circuit of other example of the liquid crystal display panel shown in FIG. 1.

FIG. 3 is a diagram showing an equivalent circuit of another example of the liquid crystal display panel 10 shown in FIG. 1.

Although, in the example shown in FIG. 2, the additional capacitance (CADD) is formed between the preceding one of the gate signal line (G) and the source electrodes, in the equivalent circuit of the example shown in FIG. 3, a holding capacitance (CSTG) is formed between a common signal line (COM) and the source electrodes which is a difference therebetween.

Though the present invention is applicable to both the types of FIG. 2 and FIG. 3, in the former type, a pulse of the preceding stage of the gate signal line (G) is introduced to the pixel electrode (ITO1) via the additional capacitance (CADD), in the latter system, the pulse is not introduced to the pixel electrode, and accordingly, further excellent display is feasible.

FIG. 2 and FIG. 3 show equivalent circuits of a vertical field type liquid crystal display panel in which an electric field is applied in the direction of the thickness of its liquid crystal layer as in, for example, Twisted Nematic Type liquid crystal display panel and in FIG. 2 and FIG. 3, notation AR designates a display area. Further, they are drawn in correspondence with actual geometrical arrangements.

In the liquid crystal display panels 10 shown in FIG. 2 and FIG. 3, drain electrodes of the thin film transistors (TFT) of each of pixels arranged in a column direction are respectively connected to the drain signal lines (D) and the respective drain signal lines (D) are connected to the drain drivers 130 for applying gray scale voltages to the liquid crystals of the respective pixels in the column direction.

Besides, gate electrodes of the thin film transistors (TFT) at each of pixels arranged in a row direction are respectively connected to the gate signal lines (G) and the respective gate signal lines (G) are connected to the gate drivers 140 for supplying scanning drive voltages (positive bias voltages or negative bias voltages) to the gate electrodes of the thin film transistors (TFT) of each of pixels in the row direction for one horizontal scan time.

The interface circuit 100 shown in FIG. 1 is constituted with a display control circuit 110 and a power supply circuit 120.

The display control circuit 110 is constituted with one piece of a semiconductor integrated circuit (LSI) for controlling and driving the drain drivers 130 and the gate drivers 140 based on respective display control signals of a clock signal, a display timing signal, a horizontal/vertical scanning sync signal, and so on as well as data (R, G, B) for display transmitted from a host computer side.

When a display timing signal is inputted, the display control circuit 110 determines it as start of display and outputs a start pulse (a start signal of a display data input) to the first drain driver 130 via a signal line 135. The display control circuit 110 outputs one row of display data to a plurality of the drain drivers 130 via a bus line 133 for display data.

At this occasion, the display control circuit 110 outputs a display data latch clock (CL2) (hereinafter referred to merely as a clock CL2) which is a display control signal for latching display data to a data latch circuit of each of the drain drivers 130 via a signal line 131.

Display data of 6-bit supplied by a host computer are transmitted in one pixel unit including a trio of display data for three sub-pixels for red (R), green (G) and blue (B), respectively at each unit period of time.

Latch operation of the data latch circuit at the first drain driver 130 is controlled by the start pulse inputted thereto.

When the latch operation of the data latch circuit at the first drain driver 130 has been completed, a start pulse is inputted from the first drain driver 130 to the second, drain driver 130, and latch operation of the data latch circuit of the second drain driver is controlled.

Hereinafter, similarly, latch operation of the data latch circuits in each drain driver 130 is controlled and display data is successively written to the data latch circuits.

When input of the display timing signals has been finished or a predetermined constant period of time has elapsed after input of the display timing signals was executed, the display control circuit 110 determines that input of data corresponding to one horizontal scanning line has been completed. And then, the display control circuit 110 outputs to the respective drain drivers 130 via a signal line 132 a clock (CL1) for controlling an output timing (hereinafter referred to merely as clock CL1) which is a display control signal for outputting display data stored in the data latch circuits of the respective drain drivers 130 to the drain signal lines (D) of the liquid crystal display panel 10.

When the first display timing signal is inputted after receiving input of the vertical scanning sync signal, the display control circuit 110 determines that the signal is for displaying the first line and outputs a frame start signal to the gate driver 140 via a signal line 142.

Then, the display control circuit 110 outputs a clock (CL3) which is a shift clock having a period of one horizontal scan time to the gate drivers 140 via a signal line 141 for successively applying a positive bias voltage on respective gate signal lines (G) of the liquid crystal display panel 10 with a period of the horizontal scan time.

Accordingly, the plurality of thin film transistors (TFT) connected to the respective gate signal lines (G) of the liquid crystal display panel 10 become conducting for a period of time to execute one horizontal scan.

By the above-described operation, a picture image is displayed on the liquid crystal display panel 10.

The power supply circuit 120 shown in FIG. 1 is constituted with a positive-polarity voltage generating circuit 121, a negative-polarity voltage generating circuit 122, a common-electrode (counter electrode) voltage generating circuit 123 and a gate electrode voltage generating circuit 124.

Both the positive-polarity voltage generating circuit 121 and the negative-polarity voltage generating circuit 122 are constituted with a series-resistor voltage divider. The positive-polarity voltage generating circuit 121 outputs five positive-polarity gray scale reference voltages (V"0 through V"4) and the negative-polarity voltage generating circuit 122 outputs five negative-polarity gray scale reference voltages (V"5 through V"9). The positive-polarity gray scale reference voltages (V"0 through V"4) and the negative-polarity gray scale reference voltages (V"5 through V"9) are supplied to each drain driver 130.

Further, the respective drain drivers 130 are supplied with control signals for AC driving (AC driving timing signal M) from the display control circuit 110 via a signal line 134.

The common-electrode voltage generating circuit 123 generates a drive voltage applied to the common electrode (ITO2) and the gate-electrode voltage generating circuit 124 generates a drive voltage (positive bias voltage and negative bias voltage) applied to gate electrodes of the thin film transistors (TFT).

Generally, when a liquid crystal layer is supplied with the same voltage (direct current voltage) for a long period of time, tilting of liquid crystal molecules is gradually fixed, as a result, image retention is caused and life of the liquid crystal layer is shortened.

In order to prevent this, in the TFT type liquid crystal display module, the polarity of voltages applied across the liquid crystal layer is reversed periodically, that is, voltages applied to the pixel electrodes is alternated from positive to negative with respect to the voltage applied to the common electrode voltage periodically.

As driving methods for applying alternating current voltages to the liquid crystal layer, there are known two ways of methods of a fixed common-electrode voltage method and a common-electrode voltage inversion method. The common-electrode voltage inversion method is a method which reverses polarities of both voltages applied to a common electrode and a pixel electrode periodically. On the other hand, the fixed common-electrode voltage method is a method which makes voltages applied to pixel electrodes alternately positive and negative with respect to a fixed common electrode voltage periodically.

Although the fixed common-electrode voltage method has a drawback in which the amplitude of voltage applied to the pixel electrode (ITO1) becomes twice as much as that of the common-electrode voltage inversion method, and thus low-voltage rating drivers cannot be used unless a low-threshold voltage liquid crystal material is developed. There can be used a dot-inversion drive method or an every-Nth-line inversion drive method which is excellent in view of low power consumption and display quality.

In the liquid crystal display module of the present embodiment, the dot-inversion drive method is used as a driving method thereof.

Figure 4A:
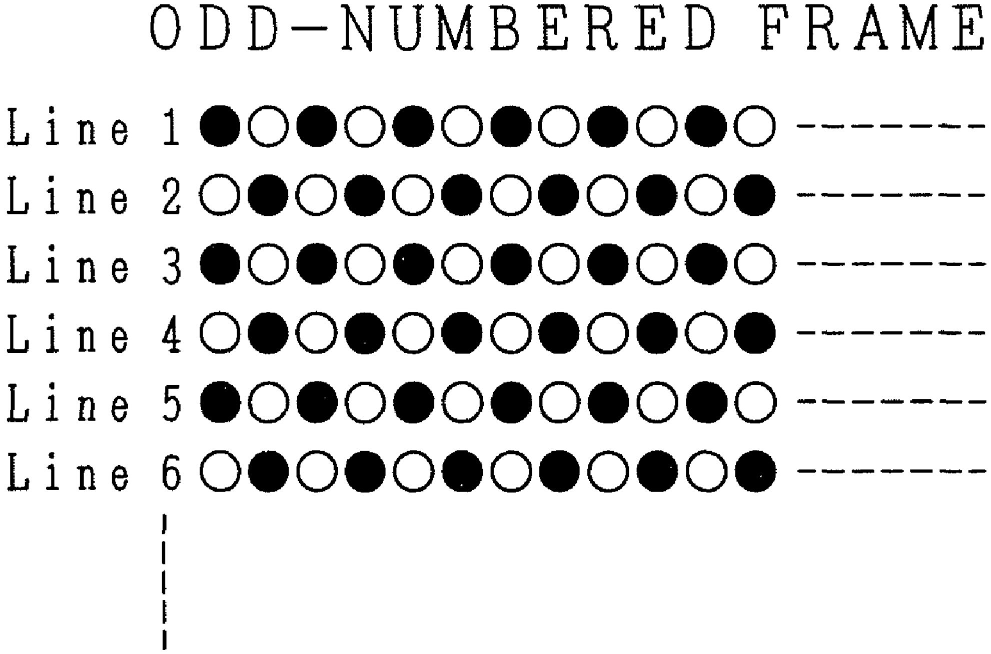
Figure 4B:
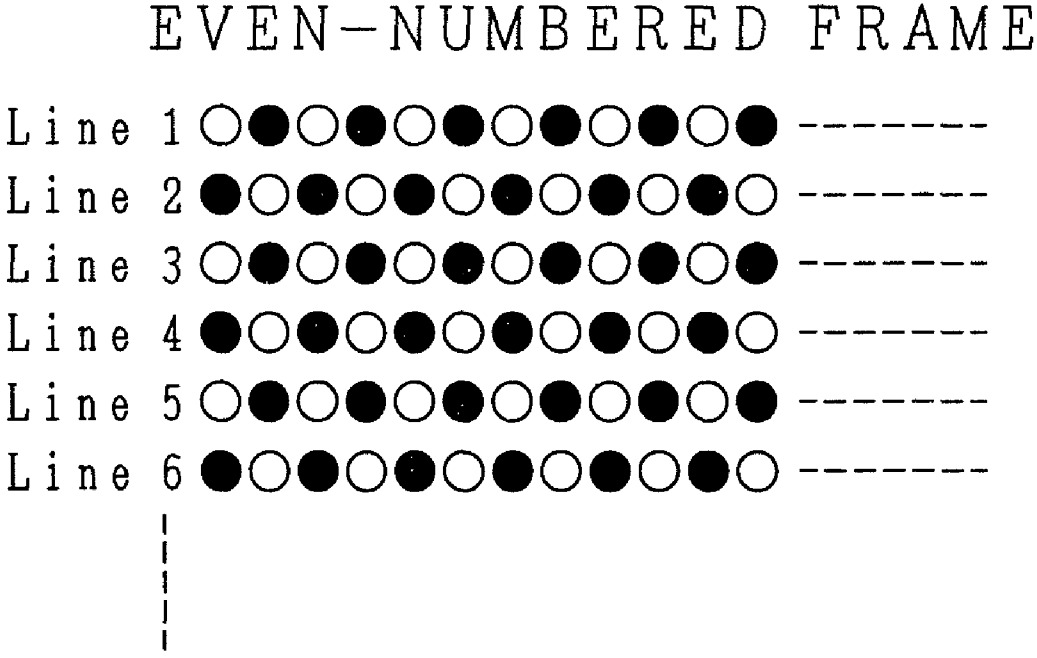

FIGS. 4A and 4B are diagrams for explaining polarities of liquid crystal drive voltages outputted from the drain drivers 130 to the drain signal lines (D) (that is, liquid crystal drive voltages applied to pixel electrodes (ITO1) (refer to FIGS. 2 and 3)) when the dot-inversion drive method is used as a method of driving the liquid crystal display module.

An explanation will be given of a case using the dot-inversion drive method as a method of driving the liquid crystal display module. First, FIG. 4A shows an example of odd-numbered frames. In odd-numbered horizontal lines, from the drain drivers 130, odd-numbered drain signal lines (D) are supplied with liquid crystal drive voltages negative with respect to the liquid crystal drive voltage VCOM applied to the common-electrode ITO2 (designates by • in FIG. 4A), and for even-numbered drain signal lines (D) are supplied with liquid crystal drive voltages positive with respect to the liquid crystal drive voltage VCOM applied to the common-electrode ITO2 (designated by ○ in FIG. 4A). In even-numbered horizontal lines, from the drain drivers 130, odd-numbered drain signal lines (D) are supplied with positive-polarity liquid crystal drive voltages and even-numbered drain signal lines (D) are supplied with negative-polarity liquid crystal drive voltages.

Next, FIG. 4B shows an example of even-numbered frames. Voltage polarity on each horizontal line is reversed from frame to frame and accordingly, from the drain drivers 130, odd-numbered drain signal lines (D) are supplied with positive-polarity liquid crystal drive voltages and even-numbered drain signal lines (D) are supplied with negative-polarity liquid crystal drive voltages. In even-numbered horizontal lines, from the drain drivers 130, odd-numbered signal lines (D) are supplied with negative-polarity liquid crystal drive voltages and even-numbered drain signal lines (D) are supplied with positive-polarity liquid crystal drive voltages.

By using the dot-inversion drive method, the polarities of the voltages applied to the two adjacent drain signal lines (D), respectively, are opposite from each other, and accordingly, currents flowing into the common electrode (ITO2) and gate electrodes of the thin film transistors (TFT) are canceled by the adjacent drain signal lines and power consumption can be reduced.

Further, current flowing in the common electrode (ITO2) is insignificant and voltage drop does not become large, and accordingly, the voltage level of the common electrode (ITO2) is stabilized and deterioration of display quality can be restrained to a minimum.

Figure 5:
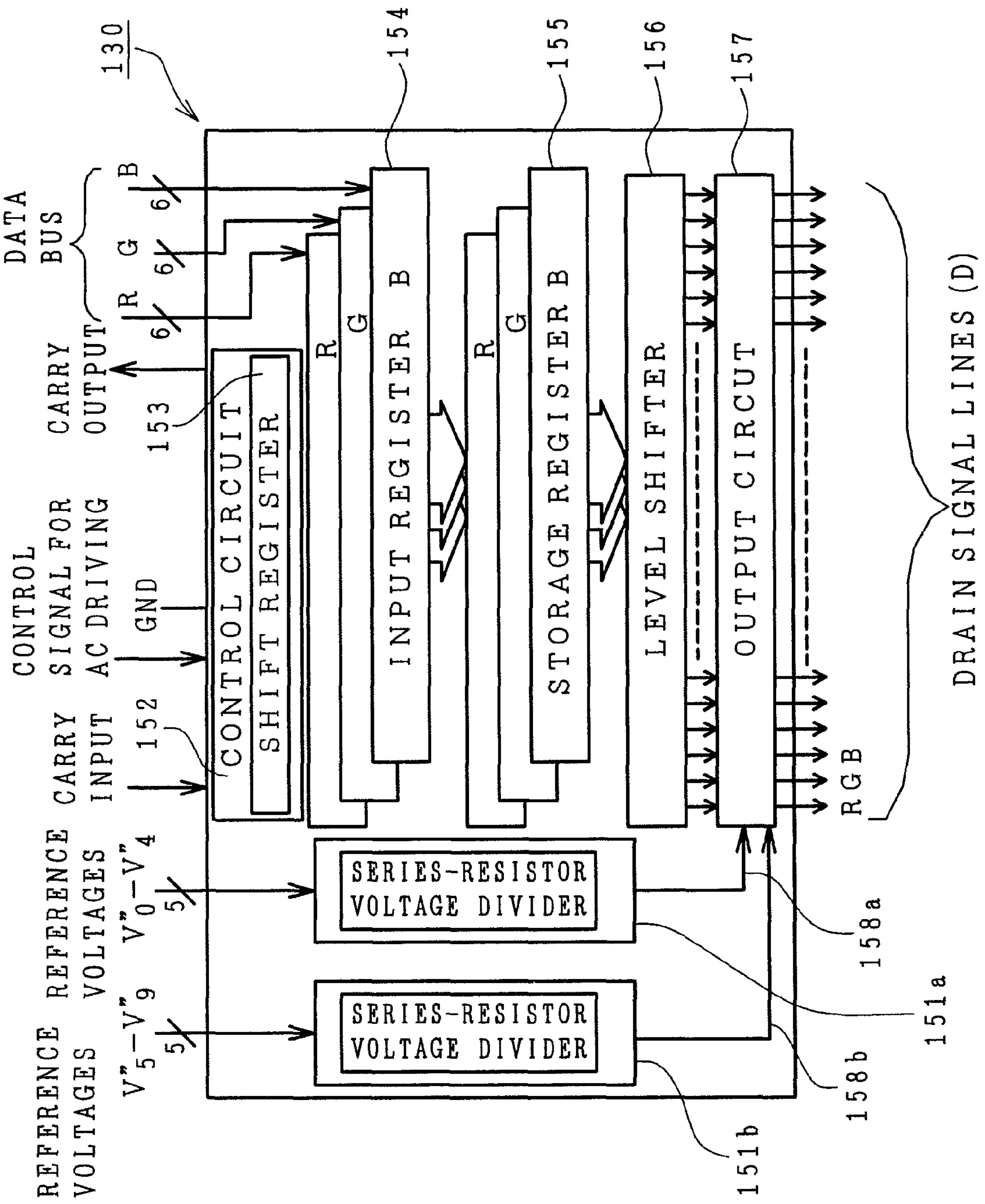
FIG. 5 is a block diagram showing a schematic constitution of an example of a drain driver shown in FIG. 1.

FIG. 5 is a block diagram showing an overall constitution of an example of the drain driver 130 shown in FIG. 1. In the figure, drain driver 130 is constituted with one piece of a semiconductor integrated circuit (LSI). In FIG. 5, a positive-polarity gray scale voltage generating circuit 151*a* generates 64 levels of positive-polarity gray scale voltages based on five positive-polarity gray scale reference voltages (V"0 through V"4) inputted from the positive voltage generating circuit 121 (refer to FIG. 1) and outputs them to an output circuit 157 via a voltage bus line 158*a*.

A negative-polarity gray scale voltage generating circuit 151*b* generates 64 levels of negative-polarity gray scale voltages based on five negative-polarity gray scale reference voltages (V"5 through V"9) inputted from the negative voltage generating circuit 122 and outputs them to the output circuit 157 via a voltage bus line 158*b*.

Further, a shift register circuit 153 in a control circuit 152 of the drain driver 130, generates a data input control signal based on the clock (CL2) inputted from the display control circuit 110 and outputs it to an input register circuit 154.

The input register circuit 154 latches display data of 6-bit per color based on the data input control signal outputted from the shift register circuit 153 in synchronism with the clock (CL2) inputted from the display control circuit 110.

A storage register circuit 155 latches display data in the input register circuit 154 in accordance with the clock (CL1) inputted from the display control circuit 110. Display data inputted to the storage register circuit 155 is then inputted to the output circuit 157 via a level shift circuit 156.

Figure 6:
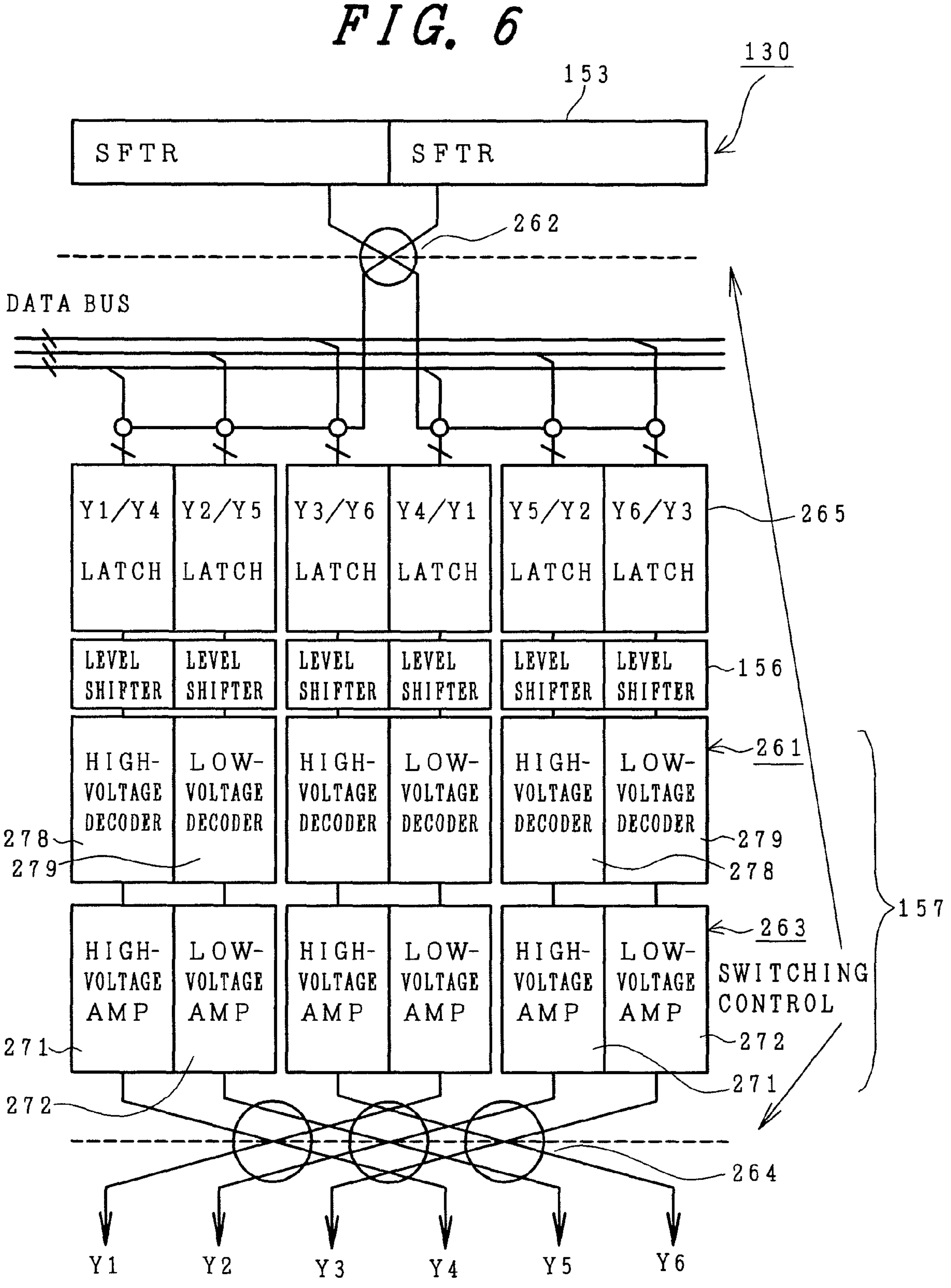
FIG. 6 is a block diagram for explaining a constitution of the drain driver shown in FIG. 5 centering on a constitution of an output circuit.

The output circuit 157 selects one gray scale voltage (one gray scale voltage out of 64 gray scale levels) in correspondence with display data from among 64 levels of positive-polarity gray scale voltages or 64 levels of negative-polarity gray scale voltages and outputs it to each of the drain signal lines (D). FIG. 6 is a block diagram for explaining the constitution of the drain driver 130 shown in FIG. 5 focusing on the constitution of the output circuit 157.

In FIG. 6, reference numeral 53 designates the shift register circuit in the control circuit 152 shown in FIG. 5, reference numeral 156 designates the level shift circuit shown in FIG. 5, a data latch circuit 265 represents the input register circuit 154 and the storage register circuit 155 shown in FIG. 5. And the output circuit 157 shown in FIG. 5 is constituted with a decoder portion (gray scale voltage selecting circuit) 261, amplifier pairs 263 and a switch circuit (2) 264 for switching outputs from the amplifier pairs 263. In this case, a switch circuit (1) 262 and the switch circuit (2) 264 are controlled based on a control signal for AC driving (M).

Notations Y1, Y2, Y3, Y4, Y5 and Y6 respectively designate first, second, third, fourth, fifth and sixth drain signal lines (D), respectively.

In the drain driver 130 shown in FIG. 6, the switch circuit (1) 262 switches the data input control signals such that, first, one of two signals for two respective adjacent drain lines for displaying the same color is inputted into one of a predetermined pair of latch circuits 265 (more specifically, in the input register 154 shown in FIG. 5) and the other of the two signals is inputted into the other of the latch circuits 265, and then the one of the two signals is inputted into the other of the latch circuits 265 and the other of the two signals is inputted into the one of the latch circuits 265. The decoder portion 261 is constituted with a high-voltage decoder circuit 278 for selecting a positive-polarity gray scale voltage in correspondence with display data outputted from each of the data latch circuit 265 (more specifically, the storage register 155 shown in FIG. 5) from among 64 levels of positive-polarity gray scale voltages outputted from the gray scale voltage generating circuit 151*a* via the voltage bus line 158 and a low-voltage decoder circuit 279 for selecting a negative-polarity gray scale voltage in correspondence with display data outputted from each data latch circuit 265 from among 64 levels of negative-polarity gray scale voltages outputted from the gray scale voltage generating circuit 151*b* via the voltage bus line 158*b*.

The high-voltage decoder circuit 278 or the low-voltage decoder circuit 279 is installed into one piece of the data latch circuit 265.

The amplifier circuit pair 263 is constituted with a high-voltage amplifier circuit 271 and a low-voltage amplifier circuit 272.

The high-voltage amplifier circuit 271 is supplied with a positive-polarity gray scale voltage generated by the high-voltage decoder circuit 278 and the high-voltage amplifier circuit 271 outputs a positive-polarity gray scale voltage.

The low-voltage amplifier circuit 272 is supplied with a negative-polarity gray scale voltage generated by the low-voltage decoder circuit 279 and the low-voltage amplifier circuit 272 outputs a negative-polarity gray scale voltage.

In the dot-inversion drive method, the polarities of the gray scale voltages applied to the two adjacent drain signal lines (D) (Y1, Y4, for example) for displaying the same color, respectively, are opposite from each other.

Besides, arrangement of the high-voltage amplifier circuits 271 and the low-voltage amplifier circuits 272 of the amplifier pairs 263, is in the order of the high-voltage amplifier circuit 271→the low-voltage amplifier circuit 272→the high-voltage amplifier circuit 271→the low-voltage amplifier circuit 272. Accordingly, by switching data input control signals inputted to the data latch circuit 265 by the switch circuit (1) 262, one of two display data inputted to the adjacent drain lines (Y1, Y4, for example) respectively for displaying the same color, for example, the data of the drain line Y1 is inputted to the data latch circuit 265 connected to the high-voltage amplifier circuit 271. Meanwhile, for example, the data of the other drain line Y4 is inputted to the data latch circuit 265 connected to the low-voltage amplifier circuit 272 allowing output voltages outputted from the data latch circuits 265 to be switched by the switch circuit (2) 264 and outputted to the drain signal lines (D) in correspondence with the two display data or the first drain signal line (Y1) and the fourth drain signal line (Y4) by which a positive-polarity or a negative-polarity gray scale voltage can be outputted to the respective drain signal lines (D).

Figure 7:
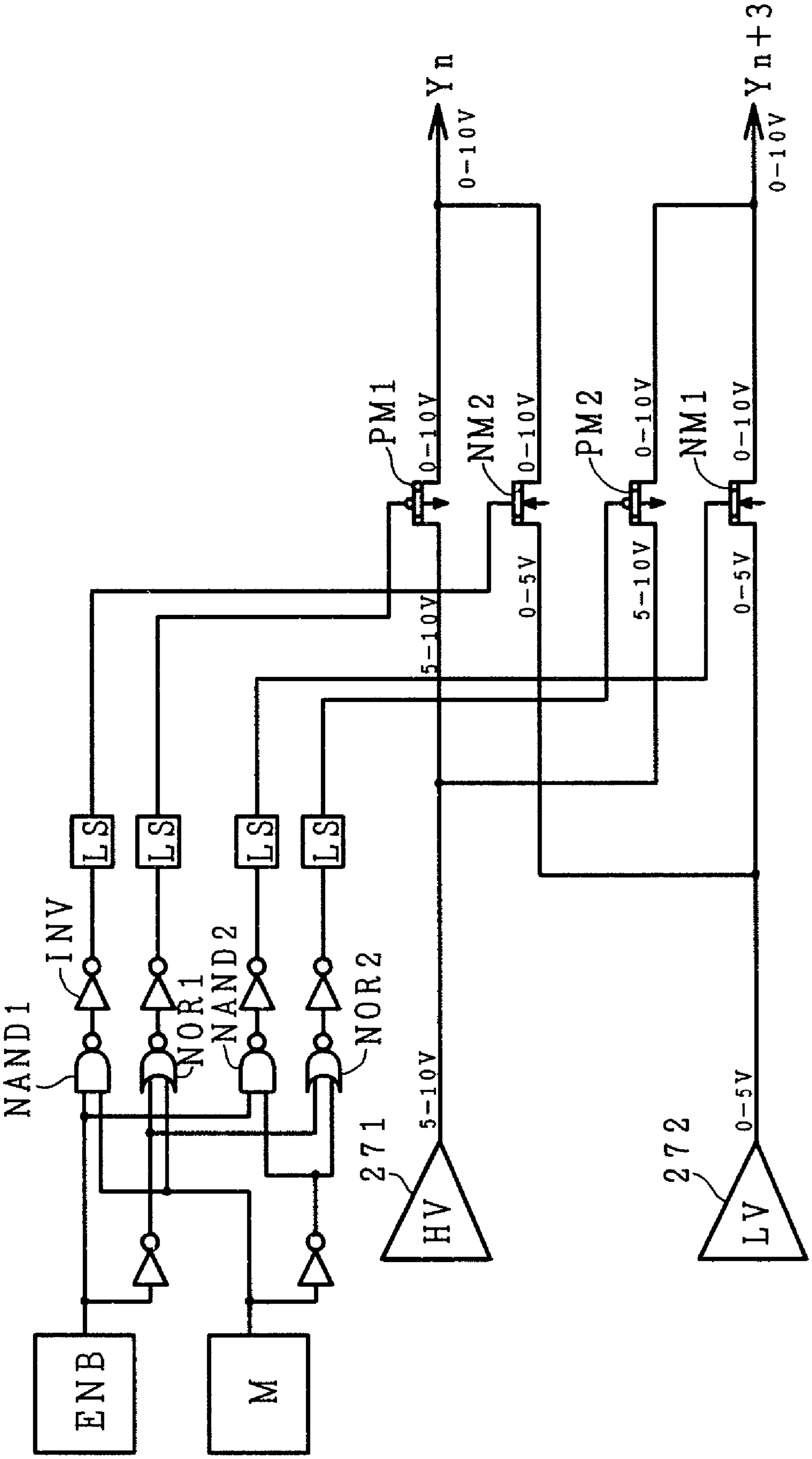
FIG. 7 is a circuit diagram showing a circuit constitution of a switching circuit (2) shown in FIG. 6.

FIG. 7 is a circuit diagram showing a circuit constitution of one switch circuit of the switch circuit (2) 264 shown in FIG. 6.

As shown in FIG. 7, one switch circuit of the switch circuit (2) 264 shown in FIG. 6 includes a PMOS transistor (PM1) connected between the high-voltage amplifier circuit 271 and an N-th drain signal (Yn), a PMOS transistor (PM2) connected between the high-voltage amplifier circuit 271 and a (n+3)-th drain signal (Yn+3), an NMOS transistor (NM1) connected between the low-voltage amplifier circuit 272 and the (n+3)-th drain signal (Yn+3) and an NMOS transistor (NM2) connected between the low-voltage amplifier circuit 272 and the N-th drain signal (Yn).

The gate electrode of the PMOS transistor (PM1) is supplied with an output from an NOR circuit (NOR1) inverted by an inverter (INV) and the gate electrode of the PMOS transistor (PM2) is supplied with an output from an NOR circuit (NOR2) inverted by an inverter (INV) after having been level shifted respectively by level shift circuits (LS).

Similarly, the gate electrode of the NMOS transistor (NM1) is supplied with an output from an NAND circuit (NAND2) inverted by an inverter (INV) and the gate electrode of the NMOS transistor (NM2) is supplied with an output from an NAND circuit (NAND1) inverted by an inverter (INV) after having been level shifted respectively by level shift circuits (LS).

In this case, the NAND circuit (NAND1) and the NOR circuit (NOR1) are supplied with the control signal for AC driving (M) and the NAND circuit (NAND2) and the NOR circuit (NOR2) are supplied with the control signal for AC driving (M) inverted by inverters (INV). Further, NAND circuits (NAND1, NAND2) are supplied with an output enabling signal (ENB) and the NOR circuits (NOR1, NOR2) are supplied with the output enabling signal (ENB) inverted by the inverter (INV).

TABLE 1

| ENB | M | NOR1 | PM1 | NAND2 | NM1 | NAND1 | PM2 | NOR2 | NM2 |
|---|---|---|---|---|---|---|---|---|---|
| L | * | L | OFF | H | OFF | H | OFF | L | OFF |
| H | H | L | OFF | H | OFF | L | ON | H | ON |
| | L | ‘H | ON | L | ON | H | OFF | L‘ | OFF |

note:
* indicates that the control signal (M) for AC driving is irrelevant.

As is known from Table 1, when the output enabling signal (ENB) is at a Low level (hereinafter, L level), the NAND circuits (NAND1, NAND2) become a High level (hereinafter, H level), the NOR circuits (NOR1, NOR2) are brought into the L level and the respective MOS transistors (PM1, PM2, NM1, NM2) are put into an OFF state.

At the time of switching from one scanning line to its succeeding scanning line, both of the high-voltage amplifier circuit 271 and the low-voltage amplifier circuit 272 are brought into an unstable state.

The output enabling signal (ENB) is provided to prevent outputs from the respective amplifier circuits (271, 272) from being outputted to the respective drain signal lines (D) during transition from one horizontal scanning line to its succeeding line.

It should be noted that, although in to this embodiment, an inverted signal of the clock (CL1) is used as the output enabling signal (ENB), END can also be generated at inside by counting the clock (CL2) or the like.

As is known from Table 1, when the output enabling signal (ENB) is at the H level, in accordance with the H level or the L level of the control signal for AC driving (M), the respective NAND circuits (NAND1, NAND2) are brought into the H level or the L level and the respective NOR circuits (NOR1) are brought into the H level or the L level.

Therefore, the PMOS transistor (PM1) and the NMOS transistor (NM1) are made OFF or ON, and the PMOS transistor (PM2) and the NMOS transistor (NM2) are made ON or OFF, the output from the high-voltage amplifier circuit 271 is outputted to the drain signal line (Yn+3), the output from the low-voltage amplifier circuit 272 is outputted to the drain signal line (Yn), or the output from the high-voltage amplifier circuit 271 is outputted to the drain signal line (Yn) and the output from the low-voltage amplifier circuit 272 is outputted to the drain signal line (Yn+3).

In the liquid crystal display module (LCM) of the present embodiment, gray scale voltages applied to liquid crystal layers of the respective pixels are in a range of 0 to 5 volts of negative polarity and 5 to 10 volts of positive polarity and accordingly, a negative-polarity gray scale voltage of 0 through 5 volts is outputted from the low-voltage amplifier circuit 272 and a positive-polarity gray scale voltage of 5 through 10 volts is outputted from the high-voltage amplifier circuit 271.

In this case, for example, when the PMOS transistor (PM1) is turned OFF and the NMOS transistor (NM2) is turned ON, the voltage of 10V at maximum is applied between the source and the drain of the PMOS transistor (PM1).

Therefore, high breakdown voltage MOS transistors having a breakdown voltage of 10 volts between the source and the drain are used for the respective MOS transistors (PM1, PM2, NM1, NM2).

In recent years, in a liquid crystal display device of a liquid crystal display module of a TFT type or the like, a larger screen size and a higher display resolution of the liquid crystal display panel 10 is in progress, the display screen size of the liquid crystal display panel 10 tends to become large, and also an increase in the number of steps of gray scales is in progress from 64 gray scale display to 256 gray scale display.

In accordance therewith, a high-speed charging property in respect of a thin film transistor (TFT) is requested in the drain driver 130 and it becomes difficult to satisfy the request in the drain driver 130 by a method of simply selecting gray scale voltage and outputting it directly to the drain signal (D).

Therefore, a method of installing an amplifier circuit at a final stage of the drain driver 130 and outputting gray scale voltage to the drain signal line (D) via the amplifier circuit has become the mainstream. The high-voltage amplifier circuit 271 and the low-voltage amplifier circuit 272 shown in FIG. 6 are installed for the above-described reason and in the related art constitutions, each of the high-voltage amplifier circuit 271 and the low-voltage amplifier circuit 272 are constituted with a voltage follower circuit in which an inverting input terminal (−) and an output terminal of an op-amp (OP) are directly connected and an input terminal thereof is constituted with a noninverting input terminal thereof as shown in, for example, FIG. 8. Further, an op-amp (OP) used in the low-voltage amplifier circuit 272 is constituted with a differential amplifier shown in, for example, FIG. 9 and an op-amp (OP) used in the high-voltage amplifier circuit 271 is constituted with a differential amplifier shown in, for example, FIG. 10.

However, generally, the above-described op-amps (OP) include offset voltages (Voff).

Figure 9:
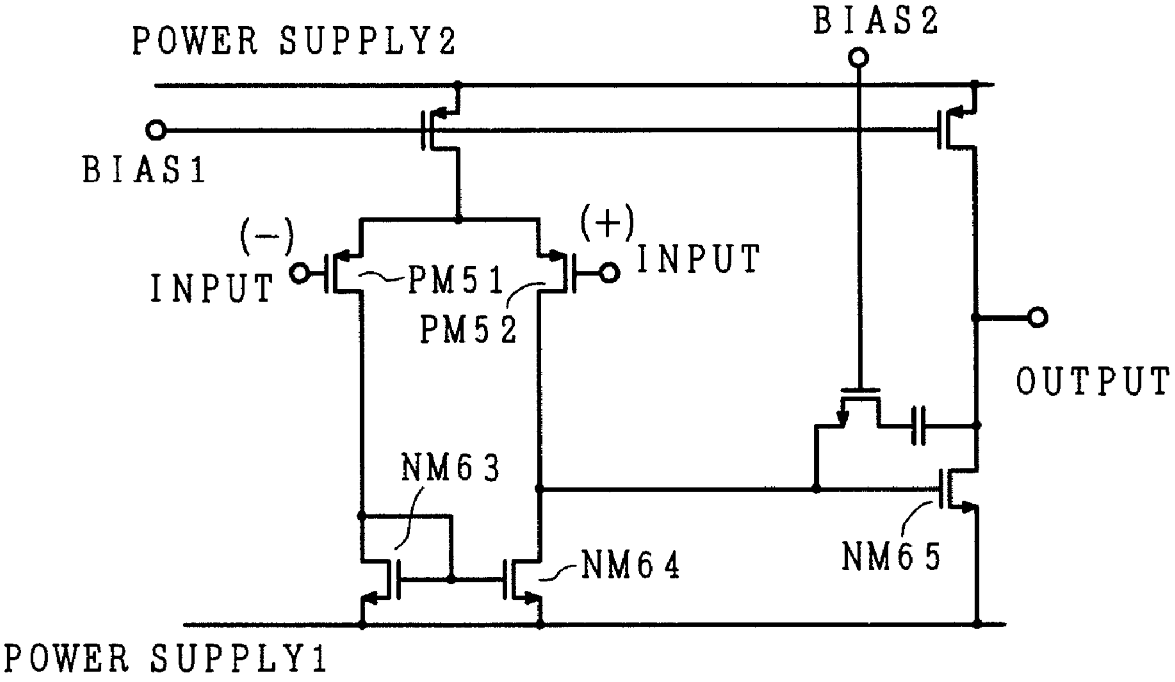
FIG. 9 is a circuit diagram showing an example of a differential amplifier constituting an op-amp used in the low-voltage amplifier circuit shown in FIG. 6.
Figure 10:
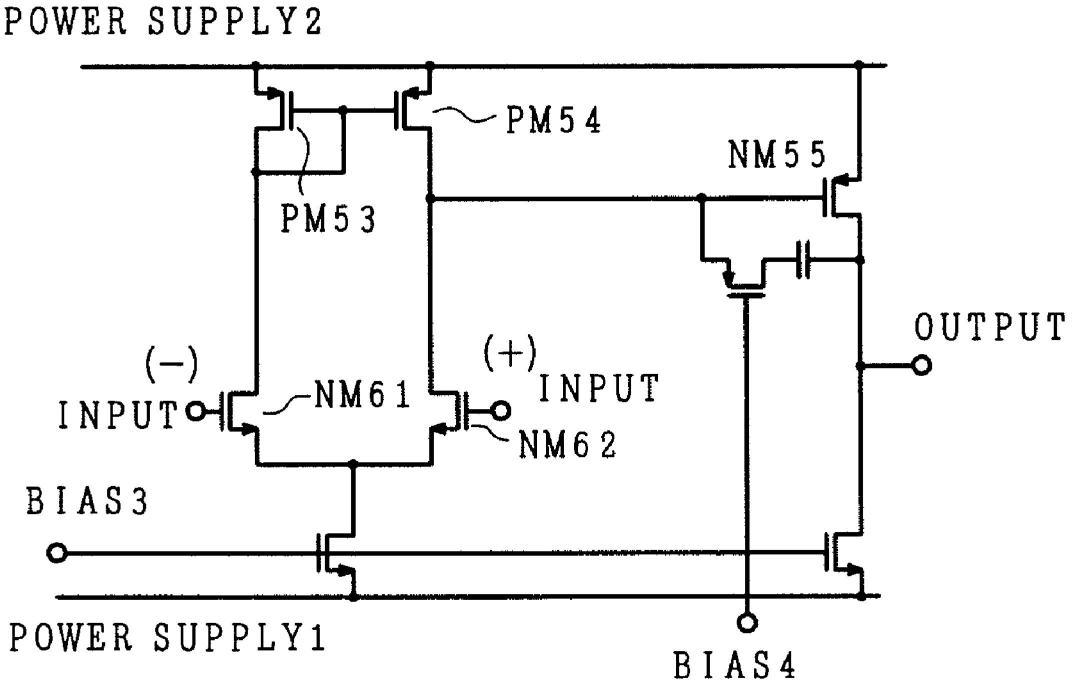
FIG. 10 is a circuit diagram showing an example of a differential amplifier constituting an op-amp used in the high-voltage amplifier circuit shown in FIG. 6.

When a basic amplifier circuit of the above-described op-amp (OP) is constituted with the differential amplifier shown in, for example, FIG. 9 or FIG. 10, the offset voltage (Voff) is generated due to slight deviations from perfect symmetry in a pair of PMOS transistors (PM51, PM52) or a pair of NMOS transistors (NM61, NM62) in the input stage, or in a pair of NMOS transistors (NM63, NM64) or a pair of PMOS transistors (PM53, PM54) constituting the active load circuit in the differential amplifier shown in FIG. 9 or FIG. 10.

The slight deviations from perfect symmetry are caused by variations in a threshold value voltage (Vth) of the MOS transistor, or a ratio (W/L) of (gate width W)/(gate length L) of the MOS transistor or the like owing to variations in an ion implantation step or a photolithography step in fabrication steps. However, even if the process control is made much more severely, it is impossible to nullify the offset voltage (Voff).

In case that the op-amp (OP) is an ideal op-amp having no offset voltage (Voff), the input voltage (Vin) becomes equal to the output voltage (Vout) (Vin=Vout). On the other hand, when the op-amp (OP) is not free from the offset voltage (Voff), the input voltage (Vin) is not equal to the output voltage (Vout) and the output voltage (Vout) becomes equal to the input voltage (Vin) with the offset voltage (Voff) added (Vout=Vin+Voff).

Figure 11:
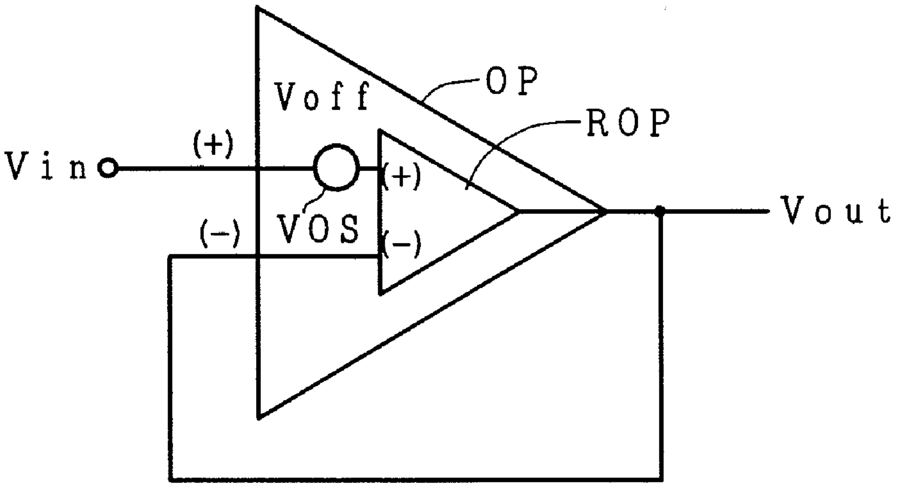
FIG. 11 is a diagram showing an equivalent circuit of an op-amp in consideration of an offset voltage (Voff)

FIG. 11 is a diagram showing an equivalent circuit of an op-amp in consideration of the offset voltage (Voff) and in FIG. 11, reference character ROP designates an ideal op-amp causing no offset voltage (Voff) and reference character VOS designates voltage supply for generating a voltage value, equal to the offset voltage (Voff).

Figure 8:
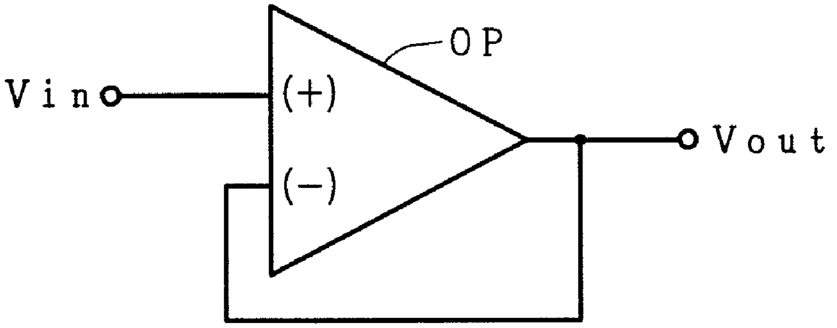
FIG. 8 is a circuit diagram showing a voltage follower circuit used in a high-voltage amplifier circuit and a low-voltage amplifier circuit shown in FIG. 6.

Therefore, in the related art liquid display module using the voltage follower circuit shown in FIG. 8 as the high-voltage amplifier circuit (271 shown in FIG. 6) or the low-voltage amplifier circuit (272 shown in FIG. 6) of the output circuit of the drain driver (157 shown in FIG. 5), the input voltage and the output voltage of the voltage follower circuit do not coincide with each other and the liquid crystal drive voltage outputted from the voltage follower circuit to the drain signal line (D) becomes gray scale voltage inputted to the voltage follower circuit with the offset voltage of the op-amp added.

Thereby, there is posed a problem in that, in the prior art liquid crystal display module, black or white spurious-signal vertical lines appeared on a display screen, thus significantly deteriorating display quality in a display screen displayed in the liquid crystal display panel.

Hereinafter, detailed explanation will be given reasons of generating black or white vertical lines.

Figure 12:
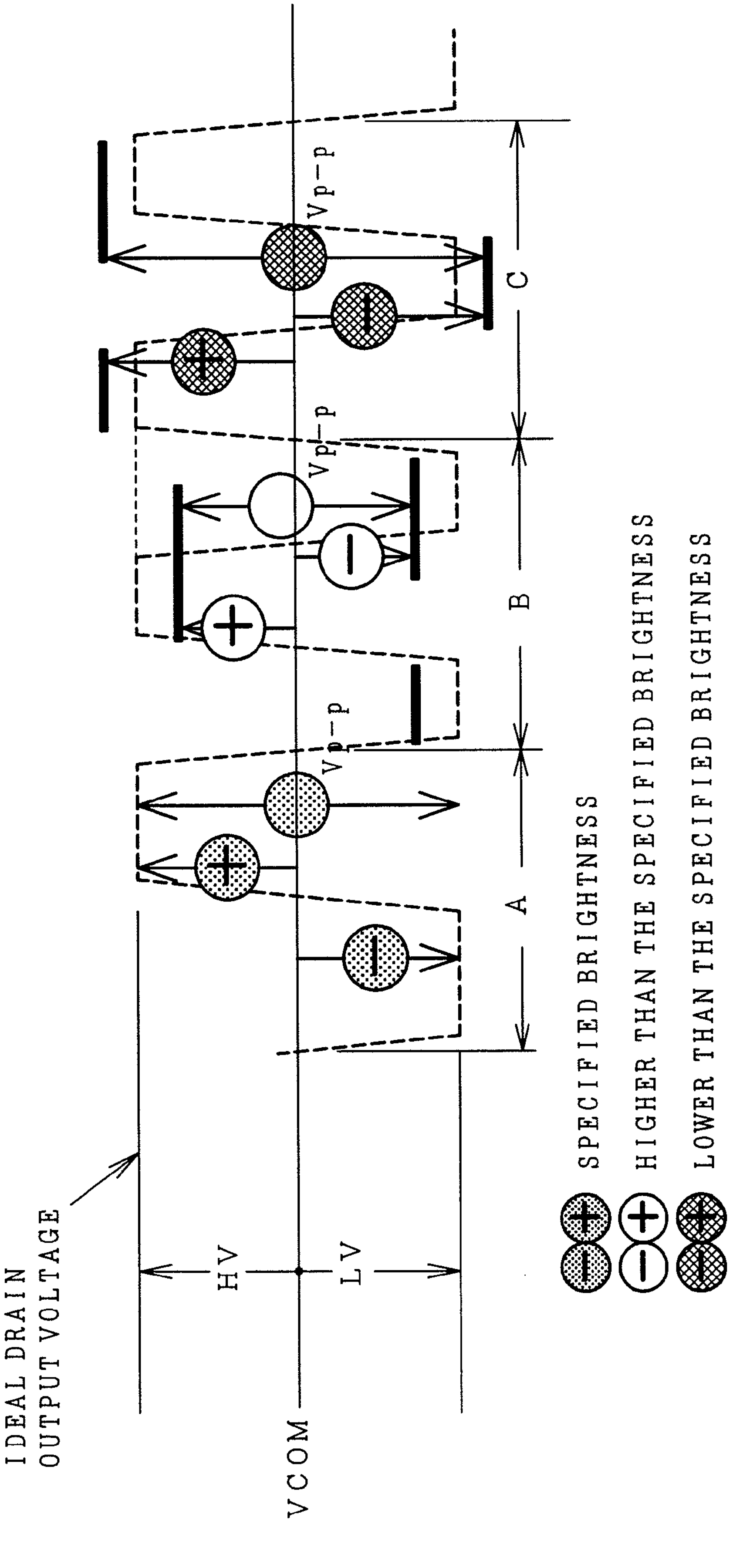
FIG. 12 is a diagram for explaining a liquid crystal drive voltage applied to a drain signal line (D) when there is the offset voltage (Voff) or when there is no offset voltage (Voff)

FIG. 12 is a view for explaining liquid crystal drive voltages applied to the drain signal line (D) (or pixel electrode (ITO1)) when the offset voltage (Voff) is present and when the offset voltage (Voff) is absent. In a state A shown in FIG. 12, a positive-polarity and a negative-polarity liquid crystal drive voltage applied to the drain signal line (D) are shown when the offset voltage (Voff) is absent and in this case, the brightness of the pixel becomes a specified brightness in correspondence with gray scale voltage.

Further, in a state B shown in FIG. 12, there is shown a case in which an output from the high-voltage amplifier circuit is on a minus side of an ideal output and an output from the low-voltage amplifier circuit is, on a plus side of an ideal output. In this case, a drive voltage applied to the pixel is lowered by an amount of the offset voltage (Voff) and accordingly, when the liquid crystal display panel is a normally white type liquid crystal display panel, the brightness of the pixel becomes brighter than the specified brightness in correspondence with a gray scale voltage. Further, in a state C shown in FIG. 12, there is shown a case in which the output from the high-voltage amplifier circuit is on the plus side of the ideal output and the output from the low-voltage amplifier circuit is on the minus side of the ideal output. In this case, the drive voltage applied to the pixel becomes higher by an amount of the offset voltage (Voff), and accordingly, when the liquid crystal display panel is the normally white type liquid crystal display panel, the brightness of the pixel becomes darker than the specified brightness in correspondence with the gray scale voltage.

At this occasion, assume a case in which in the drain driver 130 shown in FIG. 6, the high-voltage amplifier circuit 271 connected to the drain signal lines (D) Y1 and Y4 has a positive offset voltage (Vofh), the low-voltage amplifier circuit 272 connected to the drain signal lines (D) Y1 and Y4 has a negative offset voltage (Vofl) and both of the high-voltage amplifier circuit 271 and the low-voltage amplifier circuit 272 connected to the drain signal lines (D) Y2 and Y5 as well as the high-voltage amplifier circuit 271 and the low-voltage amplifier circuit 272 connected to the drain signal lines (D) Y3 and Y6 are free from offset voltages Voff. Further, assume that the same gray scale voltage is applied to the drain signal lines (D) of Y1 through Y4, the brightnesses of pixels connected to the drain signal lines (D) of Y1 through Y4 become as shown in FIG. 13A and in the case of the normally white type liquid crystal display panel, black vertical lines appear in the display image of the liquid crystal display panel.

Further, as can easily be understood, under the above-described conditions, when the high-voltage amplifier circuit 271 connected to the drain signal lines (D) Y1 and Y4 has the negative (−) offset voltage (Vofh) and the low-voltage amplifier circuit 272 connected to the drain signal lines (D) Y1 and Y4 has the positive (+) offset voltage (Vofl), white vertical lines appear in the display image of the liquid crystal display panel.

Figure 13B:
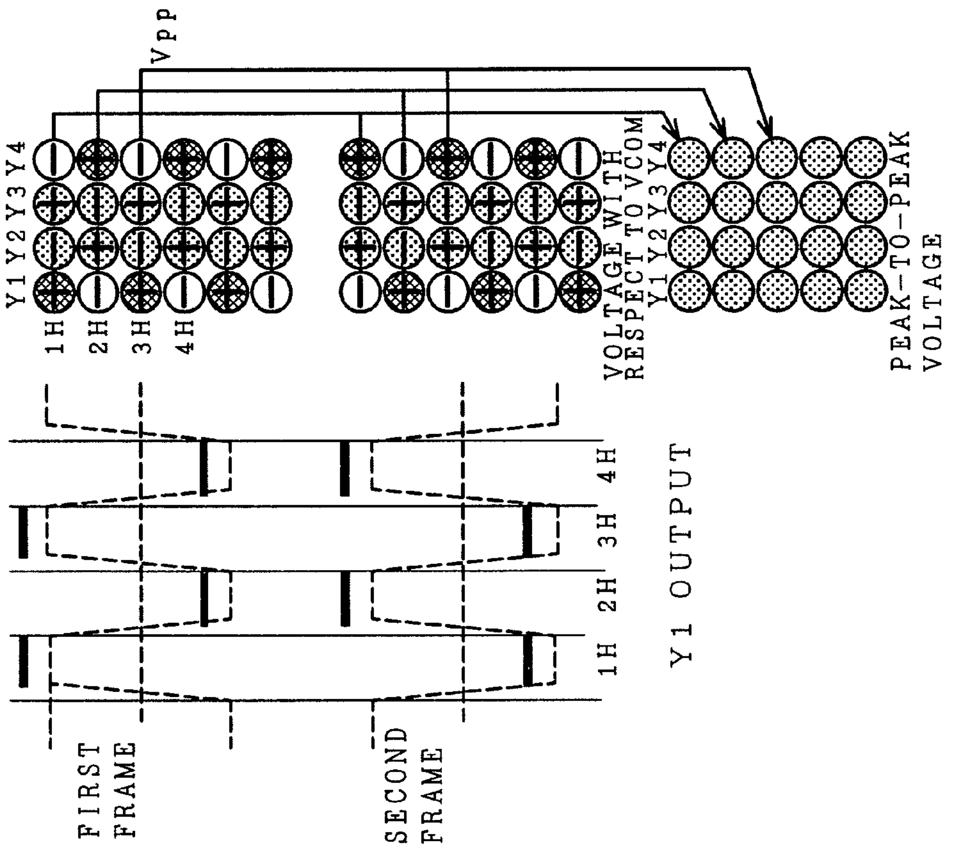
Figure 13A:
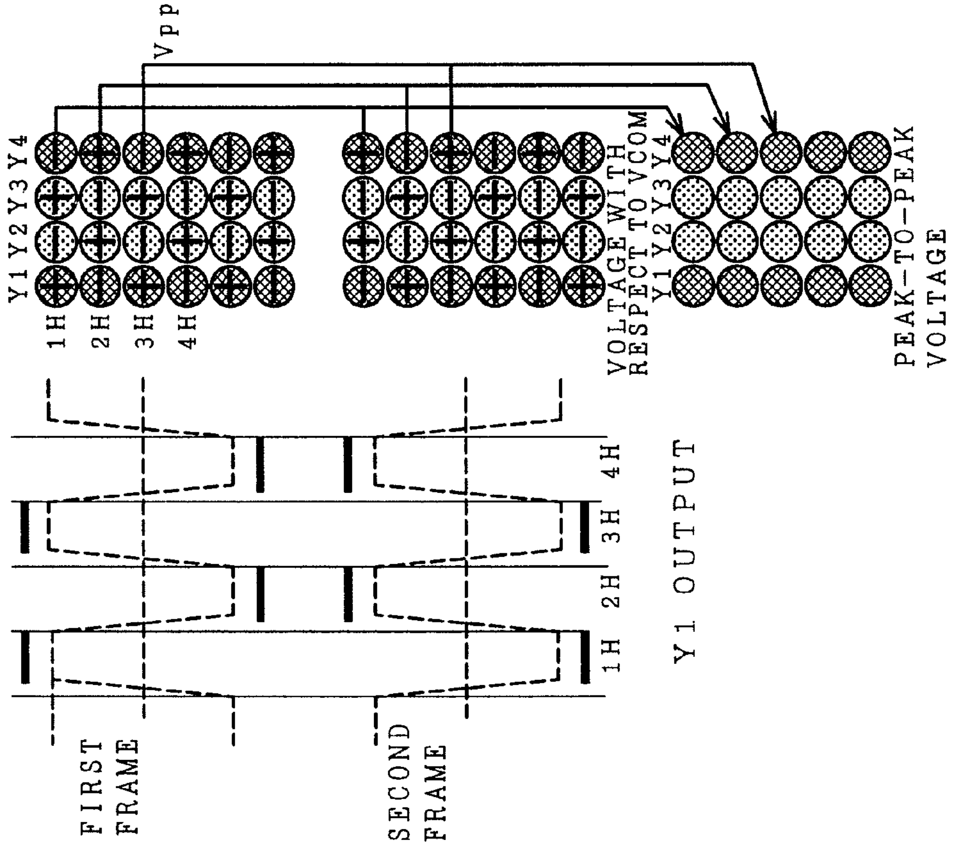

At this occasion, when both of the high-voltage amplifier circuit 271 and the low-voltage amplifier circuit 272 connected to the drain signal lines (D) Y1 and Y4 have the offset voltage (Vofh, Vofl) having the same polarity and the same value, as shown in FIG. 13B, in the first frame, pixels connected to the drain signal lines (D) YI and Y4 become darker than the specified brightness in correspondence with the gray scale voltage and in the second frame, they become whiter than the specified brightness in correspondence with the gray scale voltage.

Thereby, deviations from the specified brightness of the pixels connected to the drain signal lines (D) YI and Y4 are compensated at intervals of two frame periods and accordingly, white or black vertical lines become inconspicuous in the display image of the liquid crystal display panel.

However, since the offset voltage (Voff) of an op-amp is generated at random for each op-amp, it is extremely rare that the offset voltage (Vofh, Vofl) of two op-amps becomes the same and the offset voltage (Vofh, Vofl) of two op-amps cannot normally be the same. In this way, in the prior art liquid crystal display module, there has been posed a problem in that white or black vertical lines are generated in the display screen of the liquid crystal display panel by the offset voltage (Voff) of an amplifier circuit connected to each of the drain signal lines (D).

Further, although there has been known an offset canceler circuit, the offset canceler circuit uses a switched-capacitor circuit, and accordingly, there is posed a problem of feedthrough errors in gray scale voltages, an increase in chip size due to formation of capacitors and a restriction on high-speed operation due to an increase in capacitance charging time period.

Figure 14:
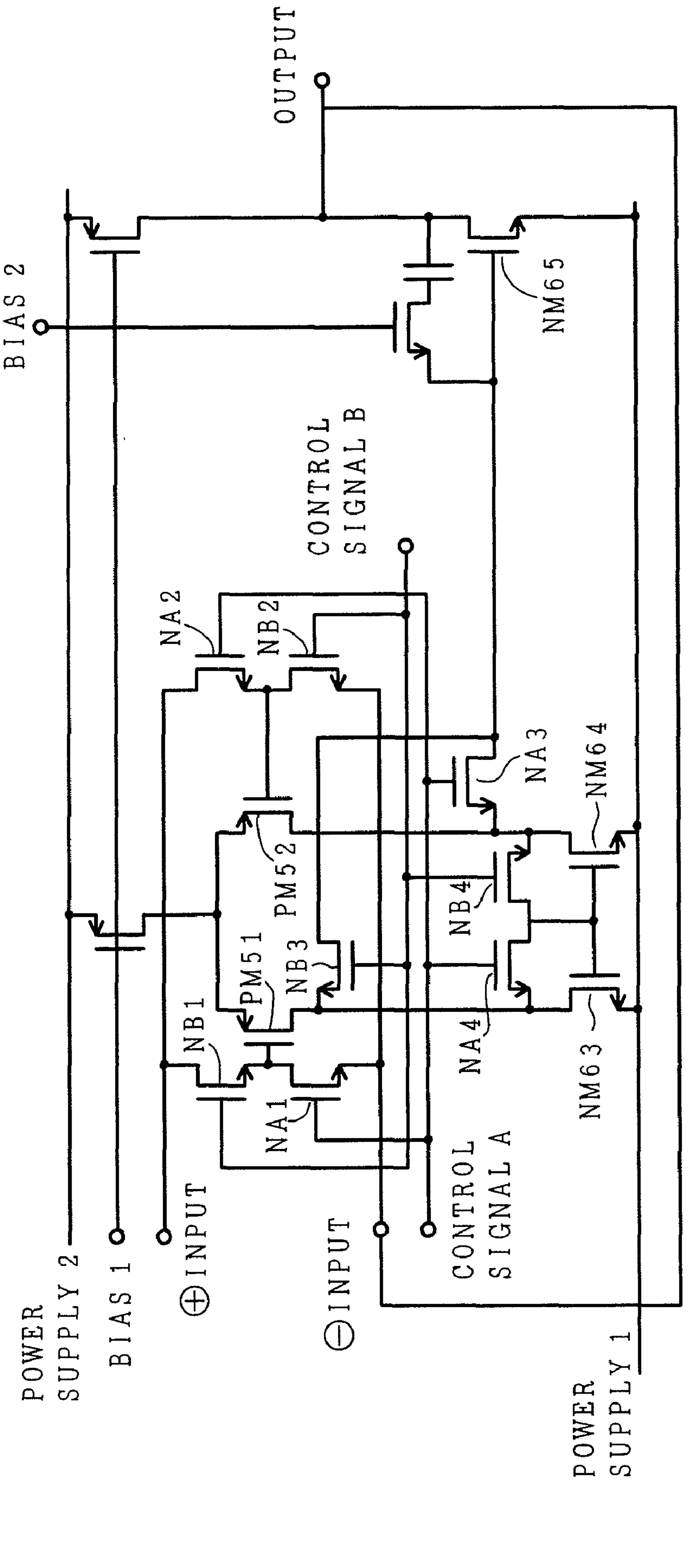
FIG. 14 is a circuit diagram showing a circuit constitution of the low-voltage amplifier circuit according to Embodiment 1.
Figure 15:
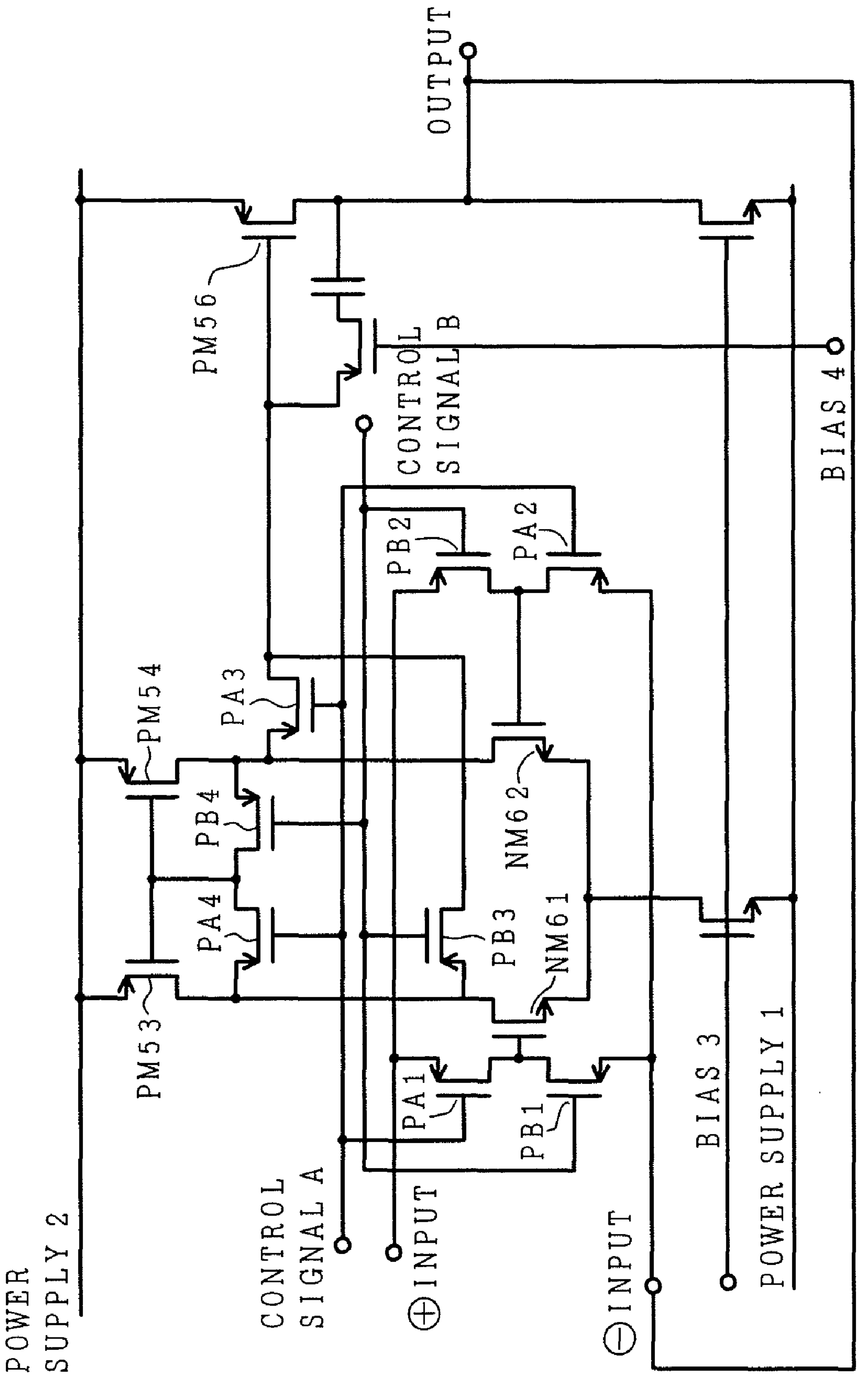
FIG. 15 is a circuit diagram showing a circuit constitution of the high-voltage amplifier circuit according to Embodiment 1.

FIG. 14 is a circuit diagram showing a basic circuit constitution of the low-voltage amplifier circuit 272 in the drain driver 130 according to the present embodiment and FIG. 15 is a circuit diagram showing a basic circuit constitution of the high-voltage amplifier circuit 271 in the drain driver 130 according to the present embodiment.

In the low-voltage amplifier circuit 272 of the embodiment shown in FIG. 14, to the differential amplifier shown in FIG. 9 there is added switching transistors (NA1, NB1) for connecting the gate electrode (control electrode) of the PMOS transistor (PM51) at the input stage to a positive input terminal (+) or a negative input terminal (−) switching transistors (NA2, NB2) for connecting the gate electrode of the PMOS transistor (PM52) at the input stage to the positive input terminal (+) or the negative input terminal (−) switching transistors (NA3, NB3) for connecting the gate electrode of the NMOS transistor (NM65) at the output stage to the drain electrode of the PMOS transistor (PM51) at the input stage or the drain electrode of the PMOS transistor (PM52) at the input stage, and switching transistors (NA4, NB4) for connecting the gate electrodes of the NMOS transistors (NM63, NM64) constituting the active load circuit to the drain electrode of the PMOS transistor (PM51) at the input stage or the drain electrode of the PMOS transistor (PM52) at the input stage.

In the high-voltage amplifier circuit 271 of the present embodiment shown in FIG. 15, similar to the low-voltage amplifier circuit 272 shown in FIG. 14, to the differential amplifier shown in FIG. 10, added is switching transistors (PAI through PA4, PB1 through PB4). In this case, the gate electrodes of the switching transistors (NA1 through NA4, PAI through PA4) are supplied with a control signal A and the gate electrodes of the switching transistors (NB1 through NB4, PB1 through PB4) are supplied with a control signal B.

Figure 16B:
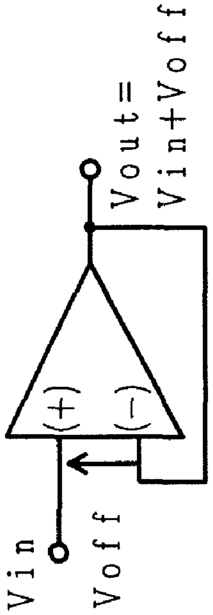
FIG. 16A is a circuit diagram showing the circuit constitution when a control signal (A) is at H level in the low-voltage amplifier circuit according to Embodiment 1 and FIG. 16B is a diagram showing the circuit indicated by a symbol of op-amp.
Figure 16A:
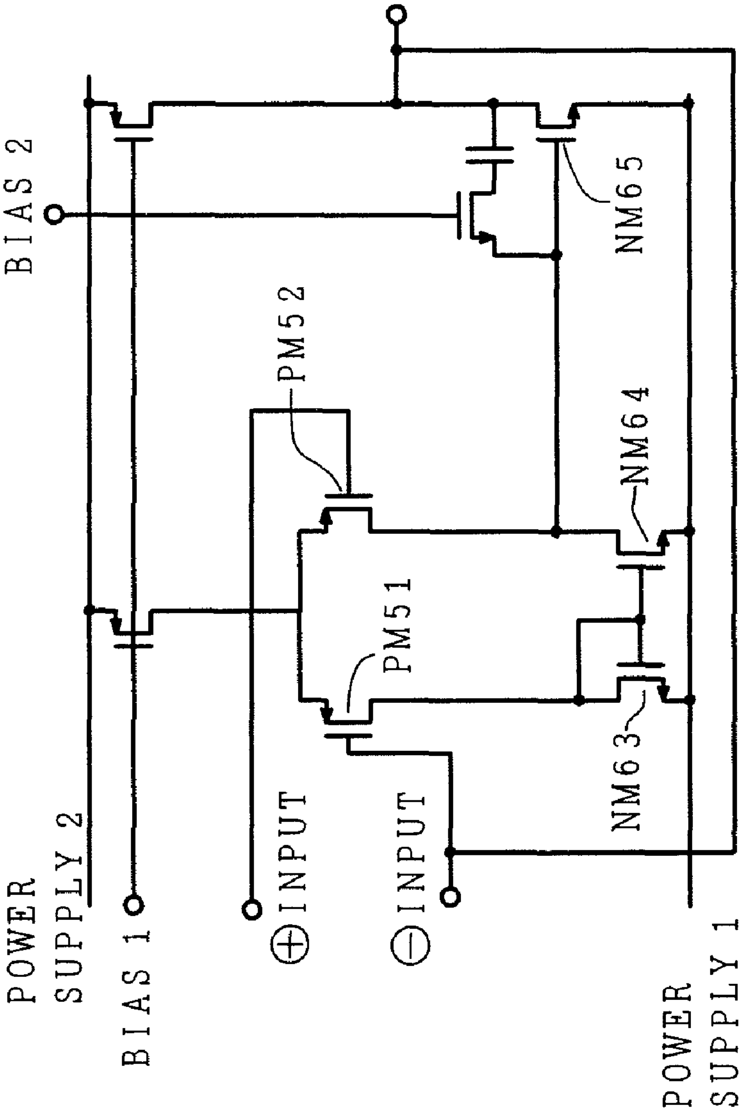
Figure 17A:
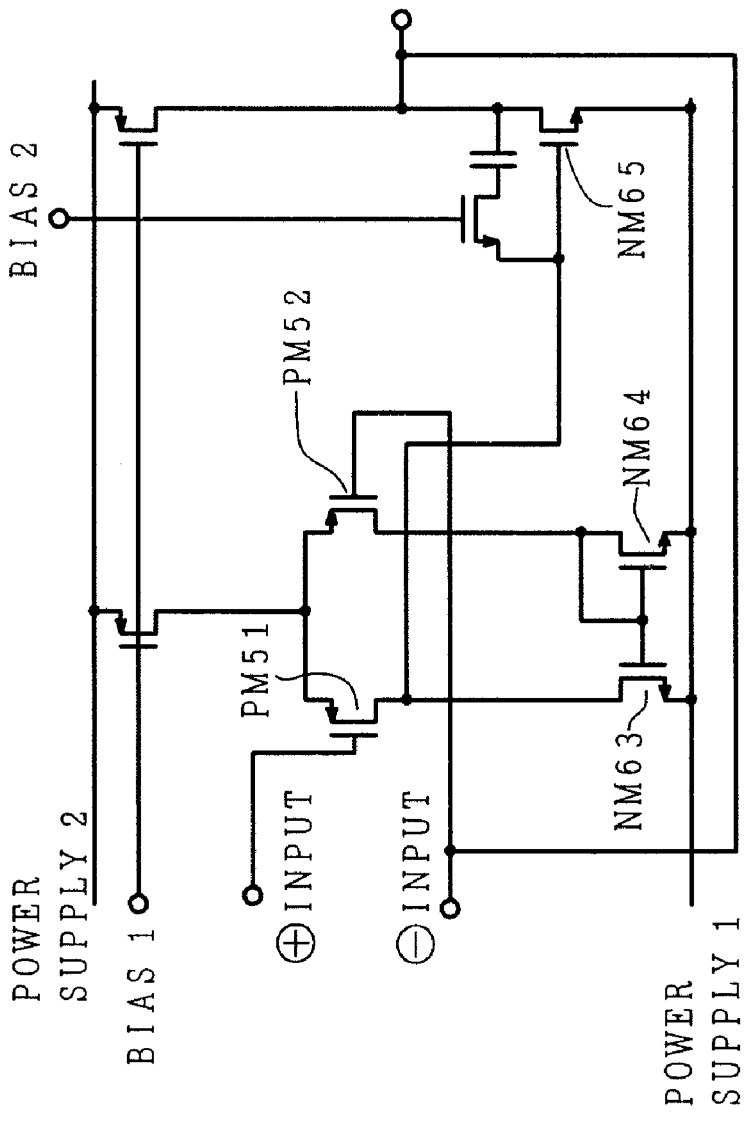
FIG. 17A is a circuit diagram showing a circuit constitution when a control signal (B) is at H level in the low-voltage amplifier circuit according to Embodiment 1 and FIG. 17B shows the circuit by a symbol of op-amp.
Figure 17B:
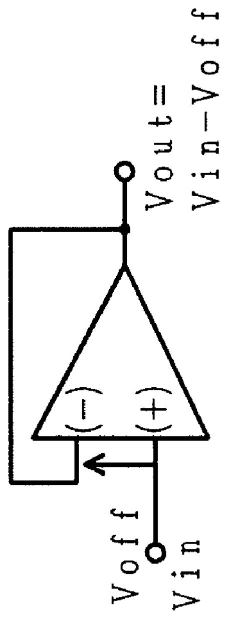

In the low-voltage amplifier circuit 272 according to the present embodiment shown in FIG. 14, a circuit constitution in the case in which the control signal (A) is at the H level and the control signal (B) is at the L level is shown in FIGS. 16A and 16B and a circuit constitution in the case in which the control signal (A) is at the L level and the control signal (B) is at the H level is shown in FIGS. 17A and 17B.

Further, FIG. 16B and FIG. 17B illustrate circuit constitutions when the amplifier circuits shown in FIG. 16A and FIG. 17A are expressed by using general operational amplifier symbols.

As can be understood from FIGS. 16A and 16B and FIGS. 17A and 17B, in the low-voltage amplifier circuit 272 of the embodiment, an input voltage vin and an output voltage fed back are supplied to alternate ones of the two input stages MOS transistors, respectively.

Thereby, in the circuit constitution of FIGS. 16A and 16B, as shown in the following Equation (1), the output voltage (Vout) is equal to the input voltage (Vin) with the offset voltage (Voff) added.

(Equation 1)

$$Vout=Vin-Voff \quad (1)$$

Further, in the circuit constitution of FIGS. 17A and 17B, as shown in the following equation (2), the output voltage (Vout) is equal to the input voltage (yin) with the offset voltage (Voff) subtracted therefrom.

(Equation 2)

$$Vout=Vin-Voff \quad (2)$$

Figure 18:
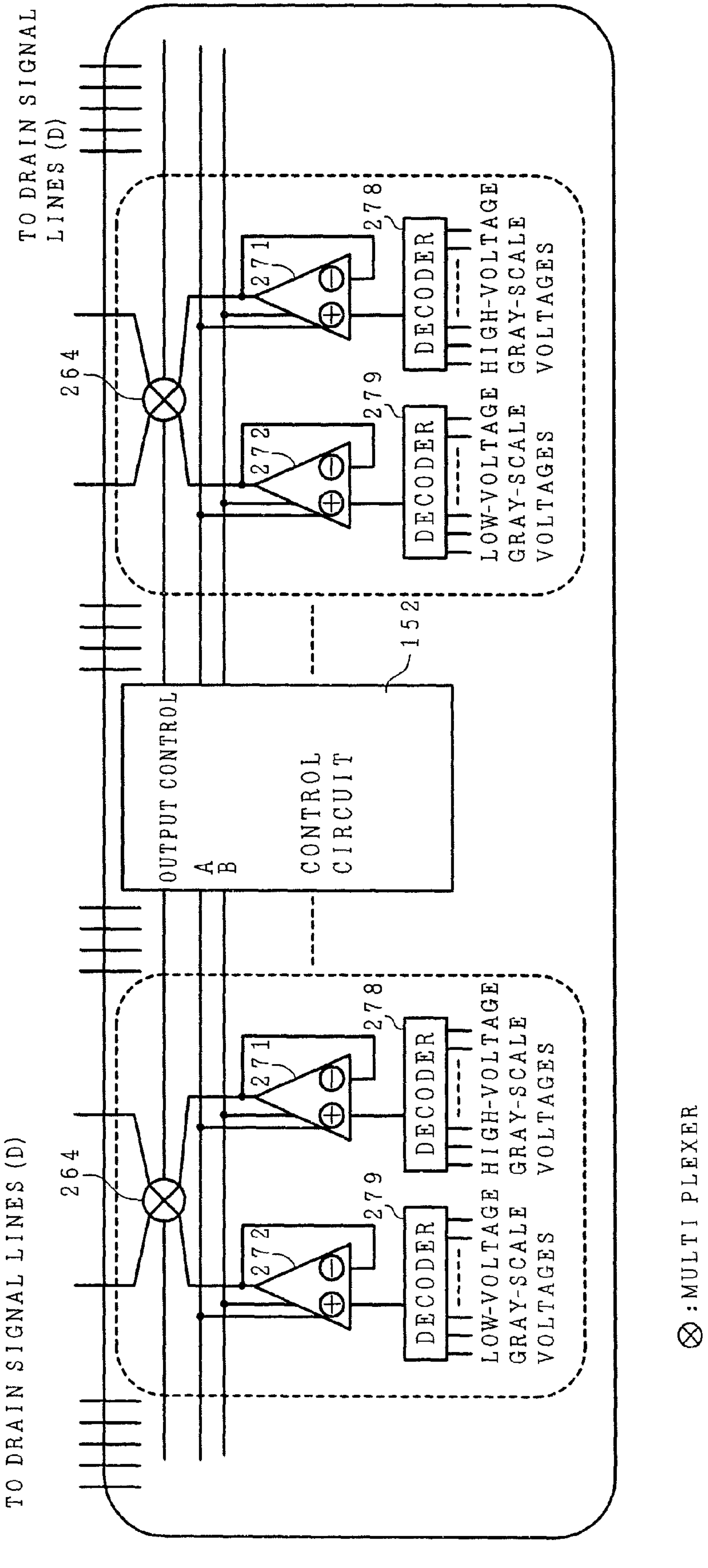
FIG. 18 is a diagram showing a constitution of an output stage of a drain driver according to Embodiment 1.
Figure 19:
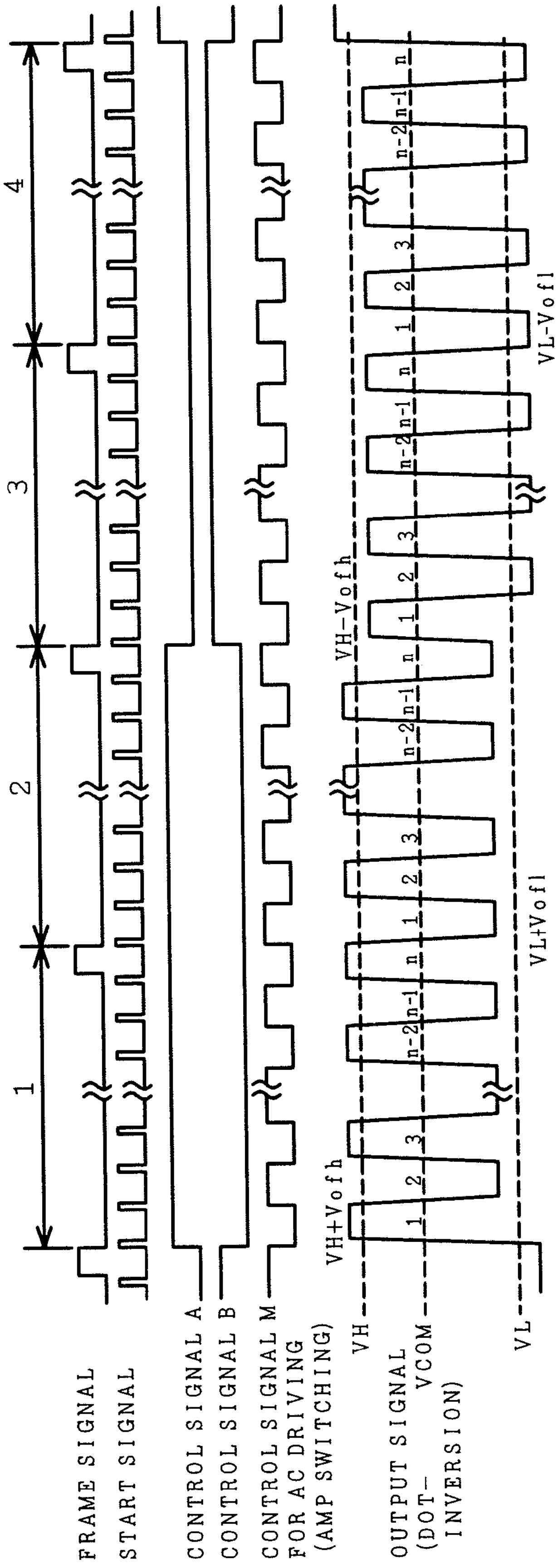
FIG. 19 illustrates timing charts for explaining operation of the drain driver according to Embodiment 1.

FIG. 18 is a diagram showing a constitution of the output stage of the drain driver 130 according to the present embodiment and FIG. 19 illustrates timing charts for explaining operation of the drain driver 130 according to the present embodiment.

Output voltages shown in FIG. 19 indicate output voltages outputted from the high-voltage amplifier circuit 271 and the low-voltage amplifier circuit 272 to the drain signal lines (D) connected to the high voltage amplifier circuit 271 having the offset voltage of Vofh and the low-voltage amplifier circuit 272 having the offset voltage of Vofl and in the output voltages, notation VH designates a specified gray scale voltage outputted from the high-voltage amplifier circuit 271 when the high-voltage amplifier circuit 271 is free from with the offset voltage and notation VL designates a specified gray scale voltage outputted from the low-voltage amplifier circuit 272 when the low-voltage amplifier circuit 272 is free from the offset voltage.

Further, as shown in time charts of FIG. 19, 15 according to the control signal (A) and the control signal (B) outputted from the control circuit 152 shown in FIG. 18, their phases are reversed at intervals of two frame periods.

Accordingly, as shown in FIG. 19, although at the first line of the first frame, a voltage of (VH+Vofh) is outputted from the high-voltage amplifier circuit 271 to the drain signal lines (D) connected to the high-voltage amplifier circuit 271 having the offset voltage of Vofh, also connected to the low-voltage amplifier circuit 272 having the offset voltage of Vofl, at the first line of the third frame, a voltage of (VH−Vofh) is outputted from the high-voltage amplifier circuit 271, and accordingly, in a corresponding pixel, an increase and a decrease of brightness caused by the offset voltage (Vofh) of the high-voltage amplifier circuit 271 are compensated by each other.

Further, although at the first line of the second frame, a voltage of (VL+Vofl) is outputted from the low-voltage amplifier circuit 272, at the first line of the fourth frame, a voltage of (VL−Vofl) is outputted from the low-voltage amplifier circuit 272. Accordingly, in a corresponding pixel, an increase and a decrease of brightness caused by the offset voltage (Vofl) of the low-voltage amplifier circuit 272 are canceled by each other.

Figure 20:
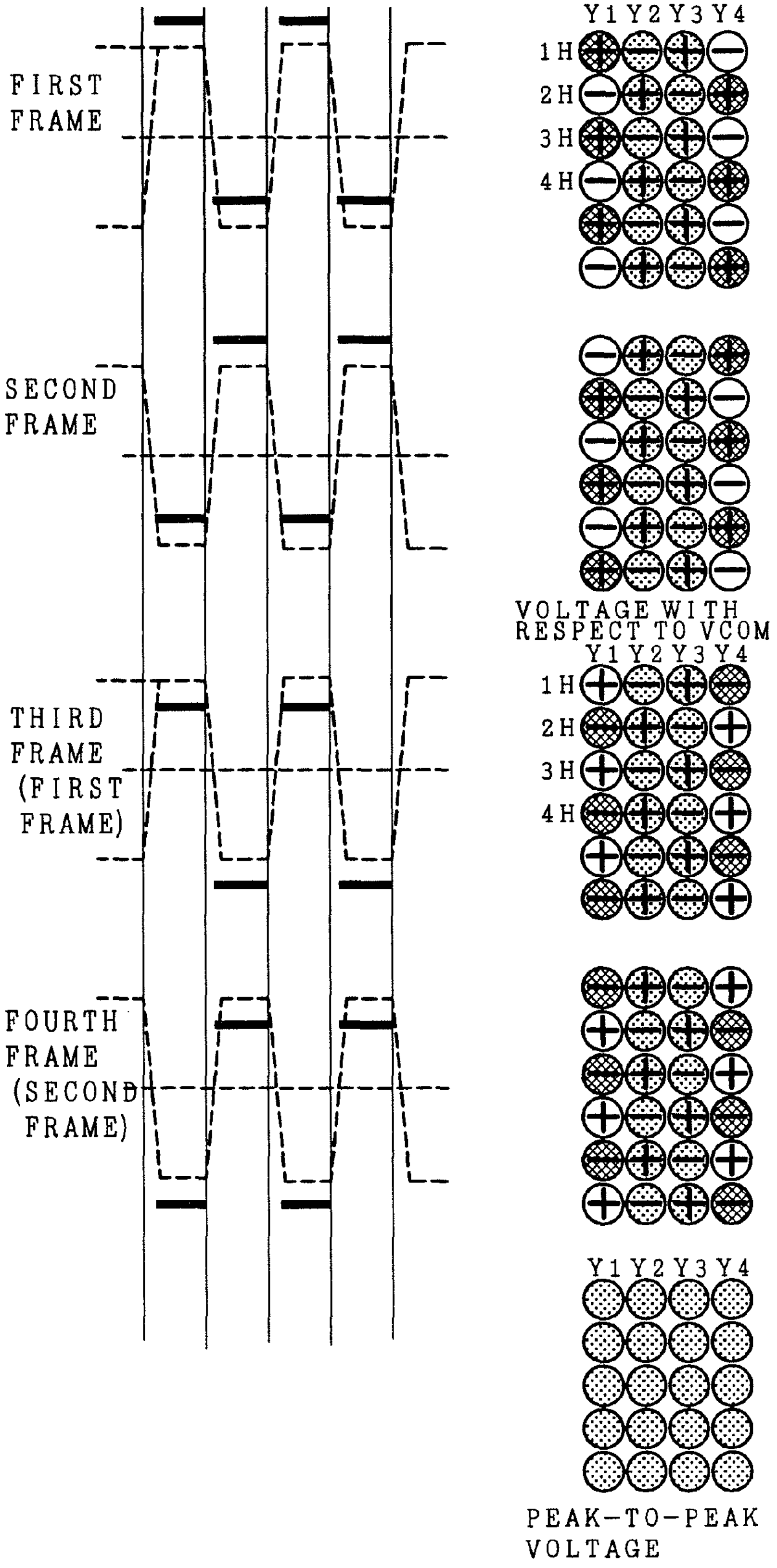
FIG. 20 is a diagram for explaining reasons for which horizontal lines caused in a liquid crystal display panel due to the offset voltage (Voff) are made inconspicuous according to Embodiment 1.

Thereby, as shown in FIG. 20, increases and decreases of brightness caused by the offset voltages (Vofh, Vofl) of the high-voltage amplifier circuit 271 and the low-voltage amplifier circuit 272 respectively are compensated by each other at intervals of four frame periods and accordingly, the brightness of the pixel supplied with the output voltage as shown in FIG. 19 becomes the specified brightness in correspondence with the gray scale voltage.

Although in the time charts shown in FIG. 19, phases of the control signal (A) and (B) are reversed at intervals of two frame periods, their phases of the control signal (A) and (B) can be reversed at intervals of two horizontal scanning lines within each frame period and at intervals of two frame periods at the same time. The brightness of a pixel in this case is shown in FIG. 21 and FIG. 22.

Figure 21:
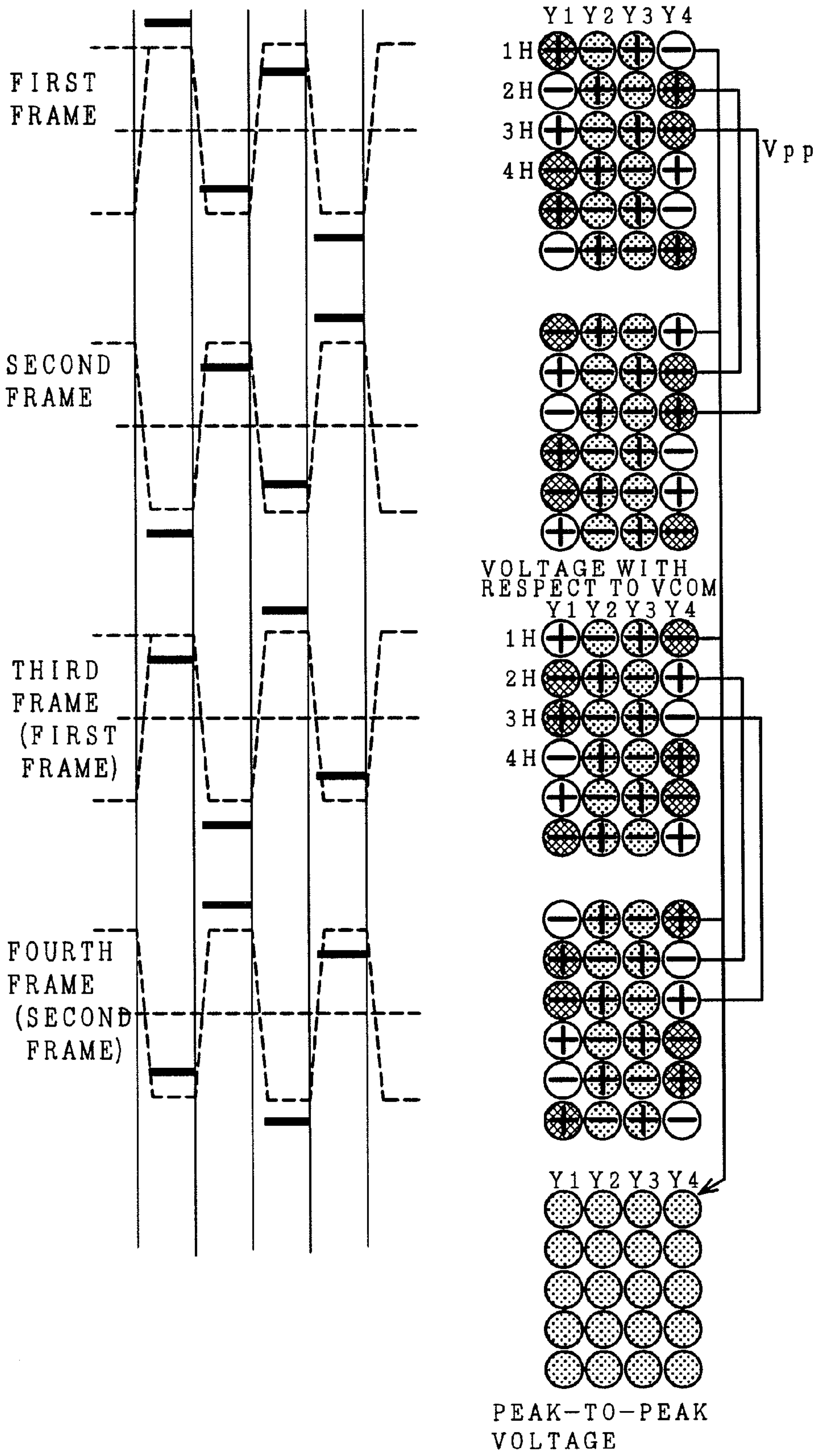
FIG. 21 is a diagram for explaining reasons for which horizontal lines caused in a liquid crystal display panel by the offset voltage (Voff) are made inconspicuous according to Embodiment 1.
Figure 22:
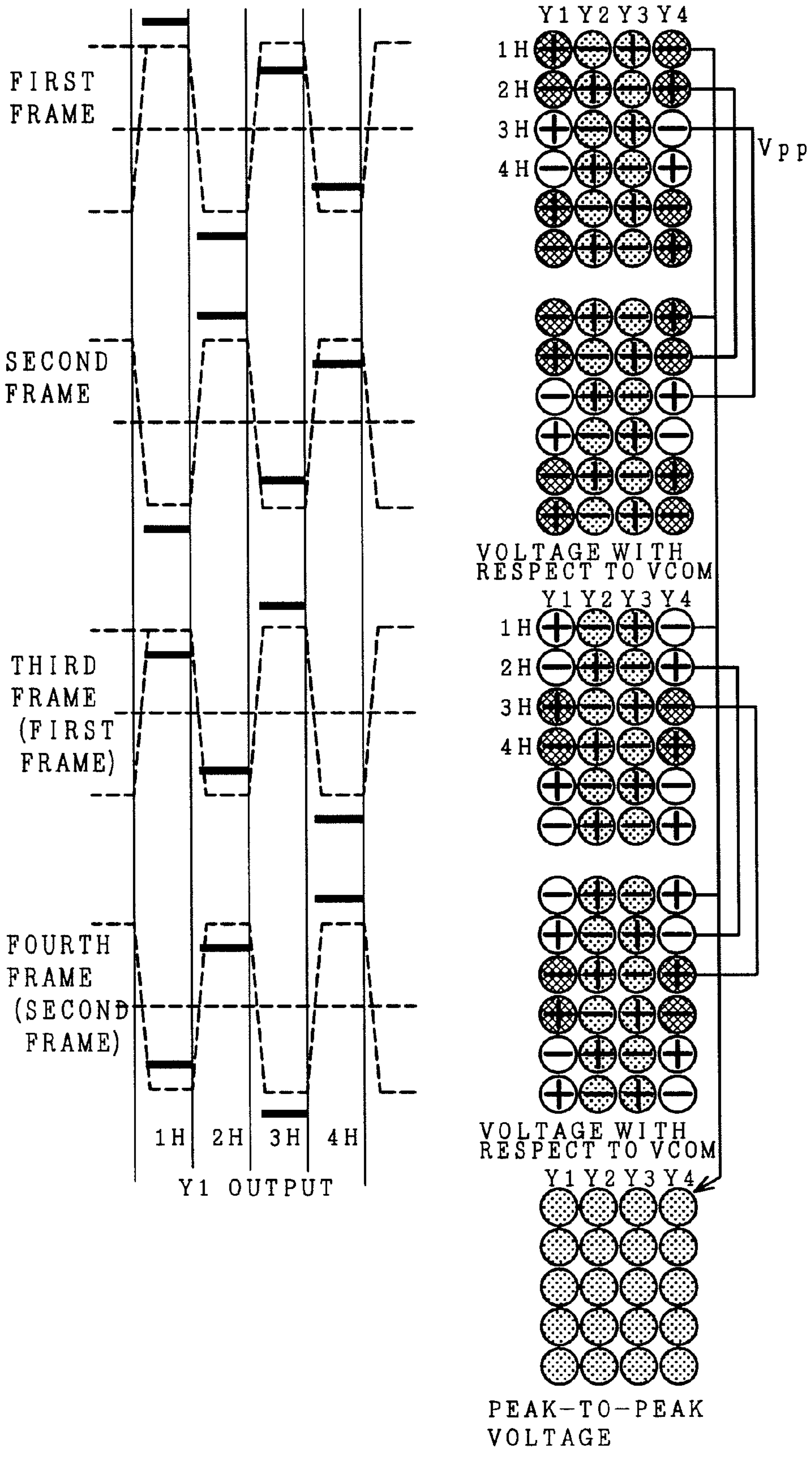
FIG. 22 is a diagram for explaining reasons for which horizontal lines caused in a liquid crystal display panel by the offset voltage (Voff) are made inconspicuous according to Embodiment 1.

FIG. 21 shows a case in which when the control signal (A) is at the H level, the high-voltage amplifier circuit 271 has the positive (+) offset voltage (Vofh) and the low-voltage amplifier circuit 272 has the positive (+) offset voltage (Vofl) and FIG. 22 shows a case in which when the control signal (A) is at the H level, the high-voltage amplifier circuit 271 has the positive (+) offset voltage (Vofh) and the low-voltage amplifier circuit 272 has the negative (−) offset voltage (Vofl).

In both cases, increases and decreases in the brightness caused by the offset voltages (Vofh, Vofl) of the high-voltage amplifier circuit 271 and the low-voltage amplifier circuit 272 are compensated by each other at intervals of four frame periods and accordingly, the brightness of a pixel becomes a specified brightness in correspondence with the gray scale voltage.

By reversing the phases of the control signal (A) and (B) at intervals of two lines in each frame, as shown in FIG. 21 and FIG. 22, the brightness in a pixel in the column direction is changed as black→white (or white→black) at intervals of two lines. Accordingly, vertical lines are made inconspicuous in the display screen displayed by the liquid crystal display panel 10.

Figure 23:
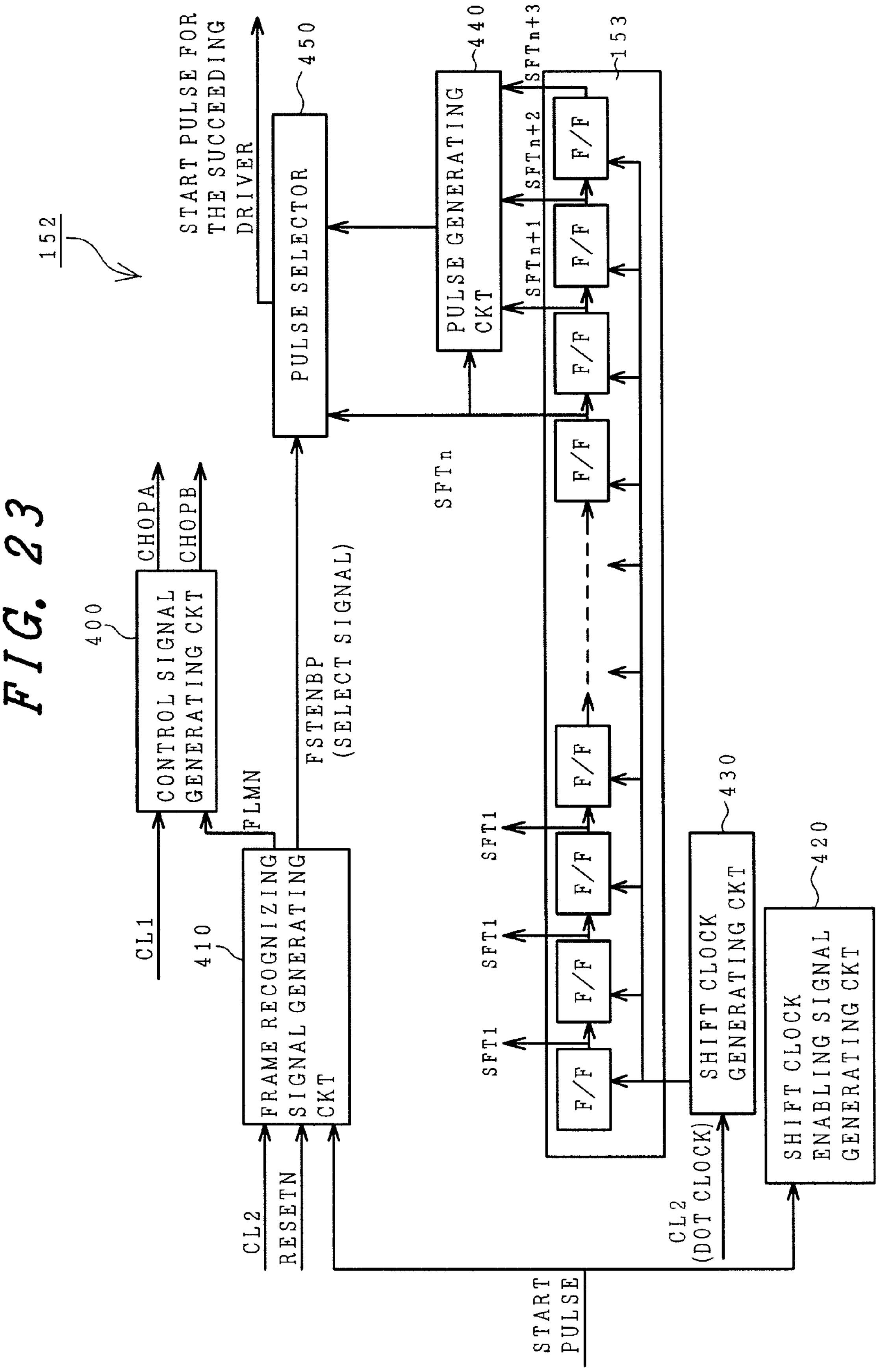
FIG. 23 is a block diagram showing a constitution of essential circuits of a control circuit in the drain driver according to Embodiment 1.
Figure 24:
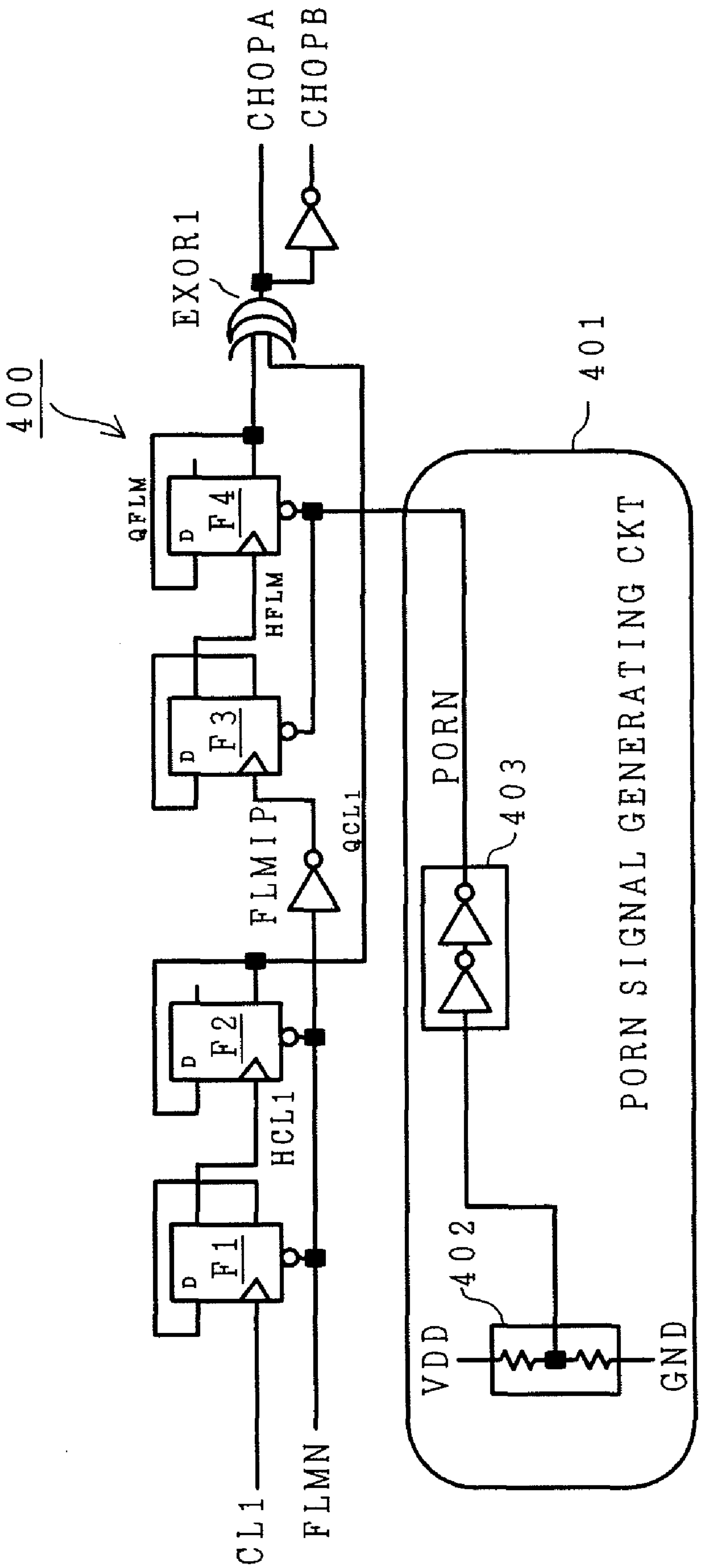
FIG. 24 is a circuit diagram showing a circuit constitution of a control signal generating circuit shown in FIG. 23.
Figure 25:
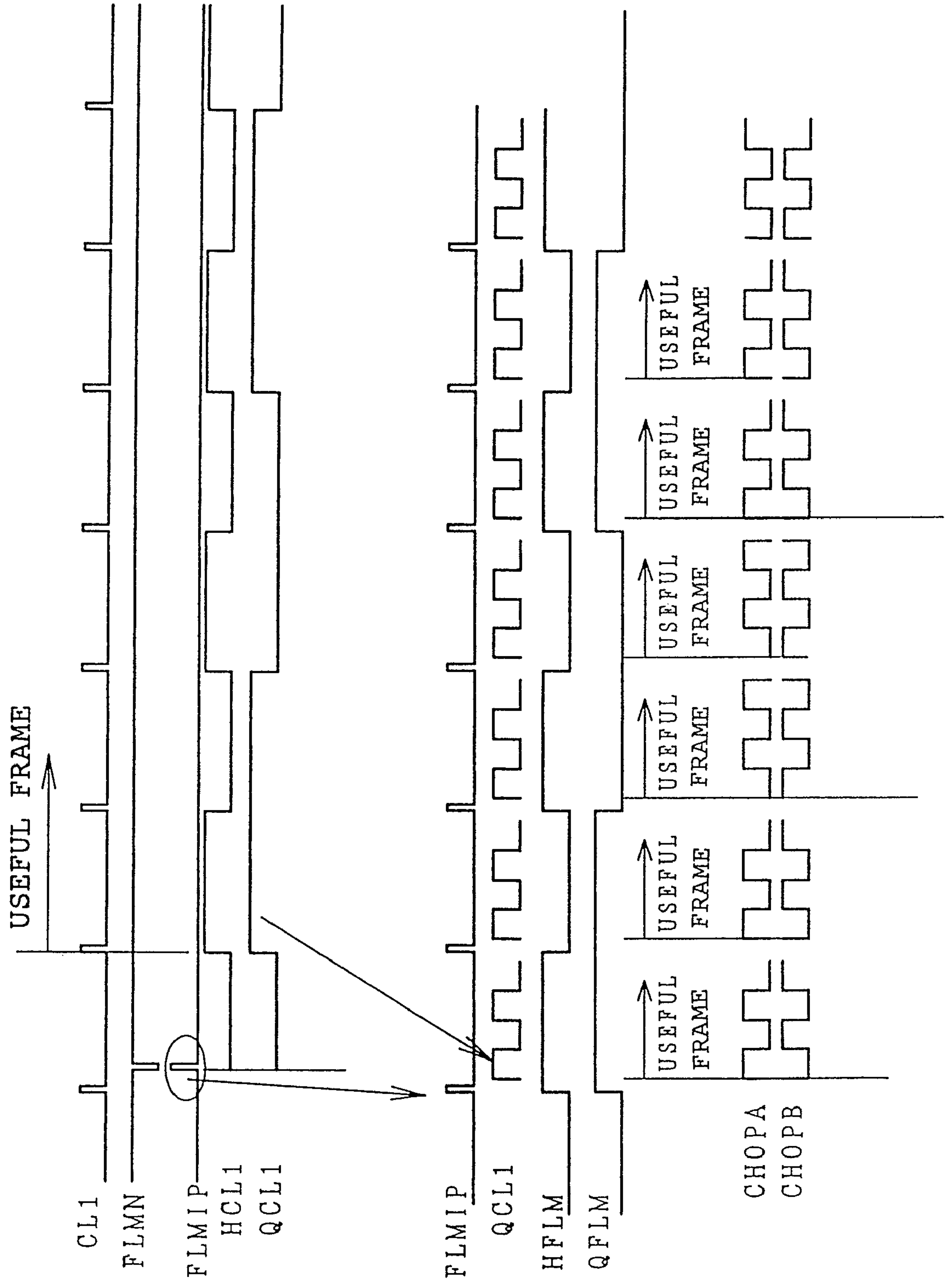
FIG. 25 illustrates timing charts for explaining operation of the control signal generating circuit shown in FIG. 24.

FIG. 24 is a circuit diagram showing a circuit constitution of the control signal generating circuit 400 shown in FIG. 23 and FIG. 25 illustrates time charts for explaining the operation of the control signal generating circuit 400 shown in FIG. 24.

The control signal generating circuit 400 is supplied with the clock (CL1). As shown in FIG. 24, the clock (CL1) is divided in two by a D flip-flop circuit (FI) to constitute a clock (HCL1), further, the clock (HCL1) is divided in two by a D flip-flop circuit (F2) to constitute a clock (QCL1) produced by dividing the clock (CL1) in four.

Further, the control signal generating circuit 400 is supplied with a frame recognizing signal (FLMN) for recognizing each frame. Incidentally, a description will be given later, of a method of generating the frame recognizing signal (FLMN).

The frame recognizing signal (FLMN) is reversed by an inverter (INV) to constitute a signal (FLMIP). As shown in FIG. 24, the signal (FLMIP) is divided in two by a D flip-flop circuit (F3) to constitute a signal (HCL1), further, the signal (HCL1) is divided in two by a D flip-flop circuit (F4) to constitute a signal (QFLM) produced by dividing the frame recognizing signal (FLMN) in four.

Further, the clock (QCL1) and the signal (QFLM) are inputted to an exclusive-OR circuit (EXOR1), a signal (CHOPA) is outputted from the exclusive-OR circuit (EXOR1) and a signal (CHOPB) is generated by reversing the signal (CHOPA) by an inverter (INV).

Levels of the signals (CHOPA, CHOPB) are shifted by a level shift circuit to thereby constitute the control signal (A) and the control signal (B).

Thereby, the phases of the control signal (A) and the control signal (B) can be reversed at intervals of two lines in each frame and at intervals of two frame periods.

In addition, when the phases of the control signal (A) and the control signal (B) are reversed at intervals of two frame periods, the signal (CHOPA) is constituted by the signal (QFLM) produced by dividing the frame recognizing signal (FLMN) in four and the signal (CHOPB) may be constituted by reversing the signal (CHOPA) by the inverter (INV).

In this case, in the control signal generating circuit 400 shown in FIG. 24, the D flip-flop circuits (F1, F2) and the exclusive-OR circuit (EXOR1) are not needed.

Further, in the control signal generating circuit 400, the D flip-flop circuits (F1, F2) are initialized by the frame recognizing signal (FLMN). Meanwhile, the D flip-flop circuits (F3, F4) are initialized by a signal (PORN) from a PORN signal generating circuit 401.

The PORN signal generating circuit 401 is constituted by a voltage dividing circuit 402 for dividing a high supply voltage (VDD) and a group of inverter circuits 403 supplied with the output from the voltage dividing circuit 402.

The power supply voltage (VDD) is a voltage generated by a DC/DC converter (not illustrated) in the power supply circuit 120 shown in FIG. 1 and the power source voltage (VDD) rises after a while from a time point at which the liquid crystal display module is switched on. Accordingly, since, after turning on the power of the liquid crystal display module, the signal (PORN) of the PORN signal generating circuit 401 remains at L level for a while, the D flip-flop circuits (F3, F4) are firmly initialized when power is inputted to the liquid crystal display module.

Next, an explanation will be given of a method of generating the frame recognizing signal (FLMN) according to the embodiment. A signal for recognizing switching between frames is needed to generate the frame recognizing signal (FLMN).

Further, since a frame start instruction signal is outputted from the display control circuit 110 to the gate driver 140 when the frame start instruction signal is inputted also to the drain driver 130, the frame recognizing signal (FLMN) can be generated easily.

However, for this method, the number of input pins of a semiconductor integrated circuit (semiconductor chip) for constituting the drain driver 130 needs to be increased by which a wiring pattern of a printed wiring board needs to be changed.

Further, in accordance with the change of the wiring pattern of the printed wiring board, characteristic of high-frequency noise emitted by the liquid crystal display module may be changed and immunity against electromagnetic interference may be deteriorated.

Further, an increase of the number of input pins of a semiconductor integrated circuit nullifies compatibility of the input pins.

Therefore, according to the embodiment, a pulse width of a start pulse outputted from the display control circuit 110 to the drain driver 130 is made to differ at each frame such that the first start pulse within a frame (hereinafter referred to as a frame start pulse) differs from start pulses (hereinafter referred to as an in-frame start pulse) other than the first start pulse so that switching between frames is recognized and the frame recognizing signal (FLMN) is generated.

Figure 26:
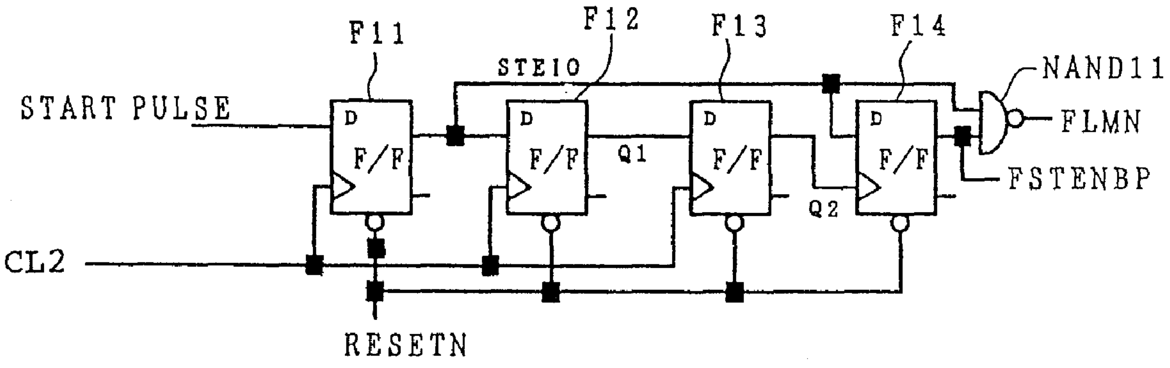
FIG. 26 is a circuit diagram showing a circuit constitution of a frame recognizing signal generating circuit shown in FIG. 23.
Figure 27A:
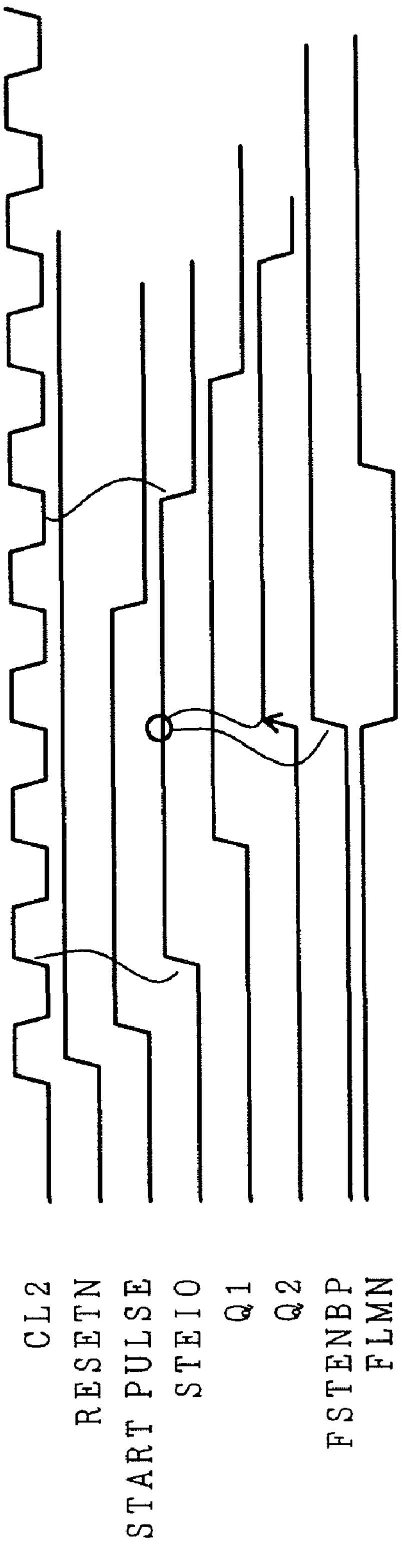
FIGS. 27A, 27B illustrate timing charts for explaining operation of the frame recognizing signal generating circuit shown in FIG. 26 in which FIG. 27A explains generation of an FLMN output by a frame start pulse and FIG. 27B explains generation of the FLMN output by an in-frame start pulse.
Figure 27B:
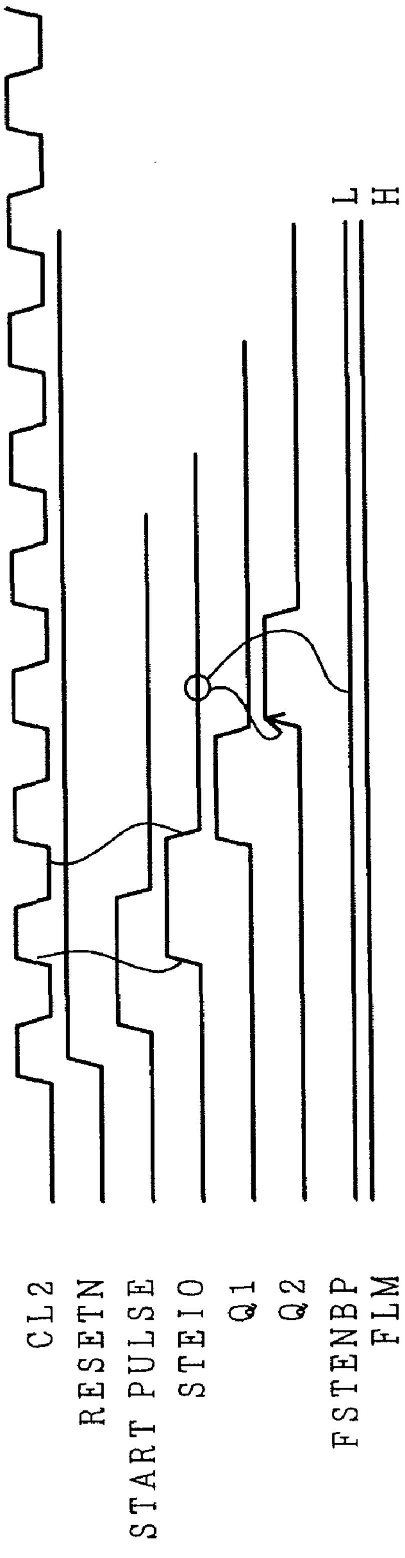

FIG. 26 is a circuit diagram showing a circuit constitution of the frame recognizing signal generating circuit 410 shown in FIG. 23, FIGS. 27A and 27B illustrate time charts for explaining the operation of the frame recognizing signal generating circuit 410 shown in FIG. 26, FIG. 27A explains generation of the FLMN output by the frame start pulse and FIG. 27B explains generation of the FLMN output by the in-frame start pulse.

According to the embodiment, the frame start pulse has a pulse width of 4 periods of the clock signal (CL2) and the in-frame start pulse has a pulse width of 1 period of the clock signal (CL2).

In FIG. 26, D flip-flop circuits (F11 through F13) are supplied with the clock (CL2) at clock signal input terminals.

Accordingly, the start pulse is latched by the D flip-flop circuit (F11) in synchronism with the clock (CL2) to constitute a signal (STEIO).

The signal (STEIO) is latched by the D flip-flop circuit (F12) in synchronism with the clock (CL2) to constitute a signal (Q1), further, the signal (Q1) is latched by the D flip-flop circuit (F13) in synchronism with the clock (CL2) to constitute a signal (Q2).

The signal (Q2) is inputted to the clock signal input terminals of the D flip-flop circuit (F14), further, a data input terminal (D) of the D flip-flop circuit (F14) is supplied with the signal (STEIO).

Accordingly, when, the start pulse is the frame start pulse having the pulse width of four time periods of the clock signal (CL2), Q output of the D flip-flop circuit (F14) becomes the H level.

In this case, since the Q output from the D flip-flop circuit (F14) becomes a start pulse selecting signal (FSTENBP) for a succeeding drain driver, the start pulse selecting signal (FSTENBP) becomes the H level.

Further, the Q output from the D flip-flop circuit (F14) and the signal (STEIO) are inputted to an NAND circuit (NAND 11) and output from the NAND circuit (NAND 11) becomes the frame recognizing signal (FLMN), therefore, the frame recognizing signal (FLMN) becomes the L level for two periods of the clock (CL2).

Meanwhile, when the start pulse is the in-frame start pulse having the pulse width of 1 period of the clock signal (CL2), the Q output from the D flip-flop circuit (F14) becomes the L level.

Thereby, the start pulse selecting signal (FSTENBP) becomes the L level and the frame recognizing signal (FLMN) keeps the H level.

In addition, each D flip-flop circuit (F11 through F14) is initialized by a signal (RESETN).

According to the embodiment, as the signal (RESETN), a signal produced by reversing the clock (CL1) is used.

Further, although in this embodiment, an explanation has been given to a case in which the frame start pulse has the pulse width of 4 periods of the clock signal (CL2), the invention is not limited thereto but the pulse width of the frame start pulse can arbitrarily be set so far as the frame recognizing signal (FLMN) constituting the L level for a predetermined period of time can be generated only when the frame start pulse is inputted.

According to the embodiment, a first one of the drain drivers 130 is supplied with the frame start pulse and the in-frame start pulse from the display control circuit 110 and the above-described operation is carried out.

However, in a second one and succeeding ones of the drain drivers 130, since the frame start pulse and the in-frame start pulse are not inputted from the display control circuit 110, in order to carry out the above-described operation even in the second one and the succeeding ones of the drain drivers 130, a pulse having the same pulse width as that of the inputted start pulse needs to be output to the succeeding drain driver 130 as a start pulse.

Therefore, according to the embodiment, in the pulse generating circuit 440 shown in FIG. 23, the frame start pulse having the pulse width of 4 periods of the clock signal (CL2) is generated and when the inputted start pulse is the frame start pulse, the frame start pulse generated by the pulse generating circuit 440 is transmitted to the succeeding drain driver 130. An explanation will be given of a method of generating the frame start pulse and the in-frame start pulse in the drain driver 130.

Figure 28:
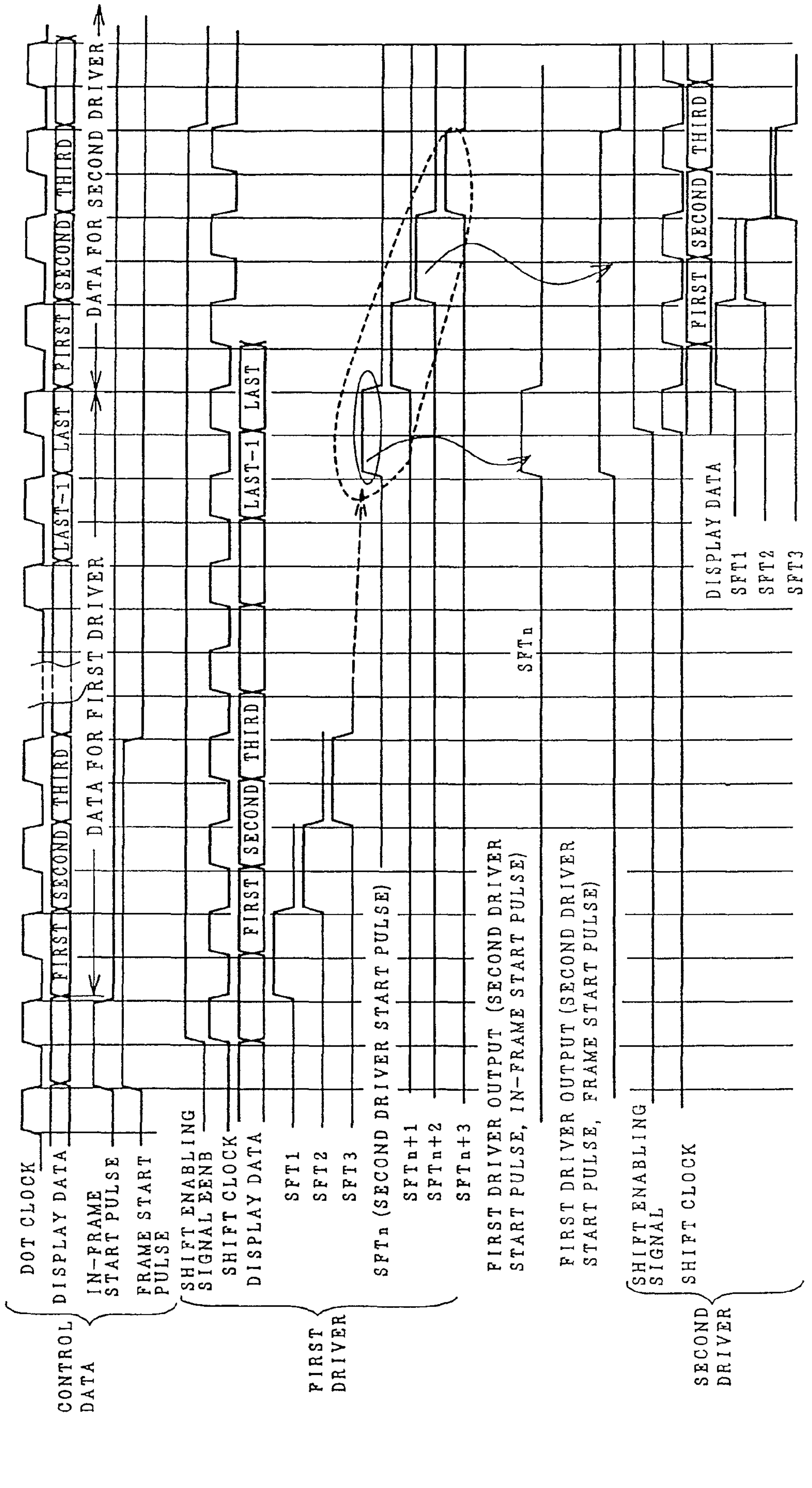
FIG. 28 illustrates timing charts for explaining operation of a control circuit according to Embodiment 1.

FIG. 28 illustrates time charts for explaining the operation of the control circuit 152 in the drain driver 130 according to the embodiment shown in FIG. 23.

As shown in FIG. 28, when the start pulse is inputted, the shift clock enabling signal generating circuit 420 outputs the enabling signal (EENB) at the H level to the shift clock generating circuit 430. Thereby, the shift clock generating circuit 430 generates the shift clock in synchronism with the clock (CL2) and outputs it to the shift register circuit 153.

Each flip-flop circuit in the shift register circuit 153 successively outputs data input control signals (SFT1 through SFTn+3) by which display data is latched to the input register 154.

Further, the data input control signal SFTn constitutes the in-frame start pulse of a succeeding stage of the drain drivers 130 having the pulse width of 1 period of the clock (CL2).

In this case, although the data input control signals of SFT1 through SFTn are used for latching a first one through an N-th one of display data to the input register 154, the data input control signals of SFTn+1 through SFTn+3 are not used for latching the display data to the input register 154.

The data input control signals of SFTn+1 through SFTn+3 are used for generating the frame start pulse of the succeeding stage of the drain driver 130. That is, as shown in FIG. 28, the clock generating circuit 450 generates the frame start pulse having the pulse width of 4 periods of the clock (CL2) based on the data input signals of SFTn through SFTn+3.

As mentioned above, when the start pulse is the in-frame start pulse, the start pulse generating signal (FSTENBP) becomes the L level and accordingly, the pulse selecting circuit 450 selects the in-frame start pulse (that is, the data input control signal SFTn) and outputs it to the succeeding drain drivers 130.

Meanwhile, when the start pulse is the frame start pulse, the start pulse selecting signal (FSTENBP) becomes the H level and accordingly, the pulse selecting circuit 450 selects the frame start pulse and outputs it to the succeeding drain driver 130.

Figure 29:
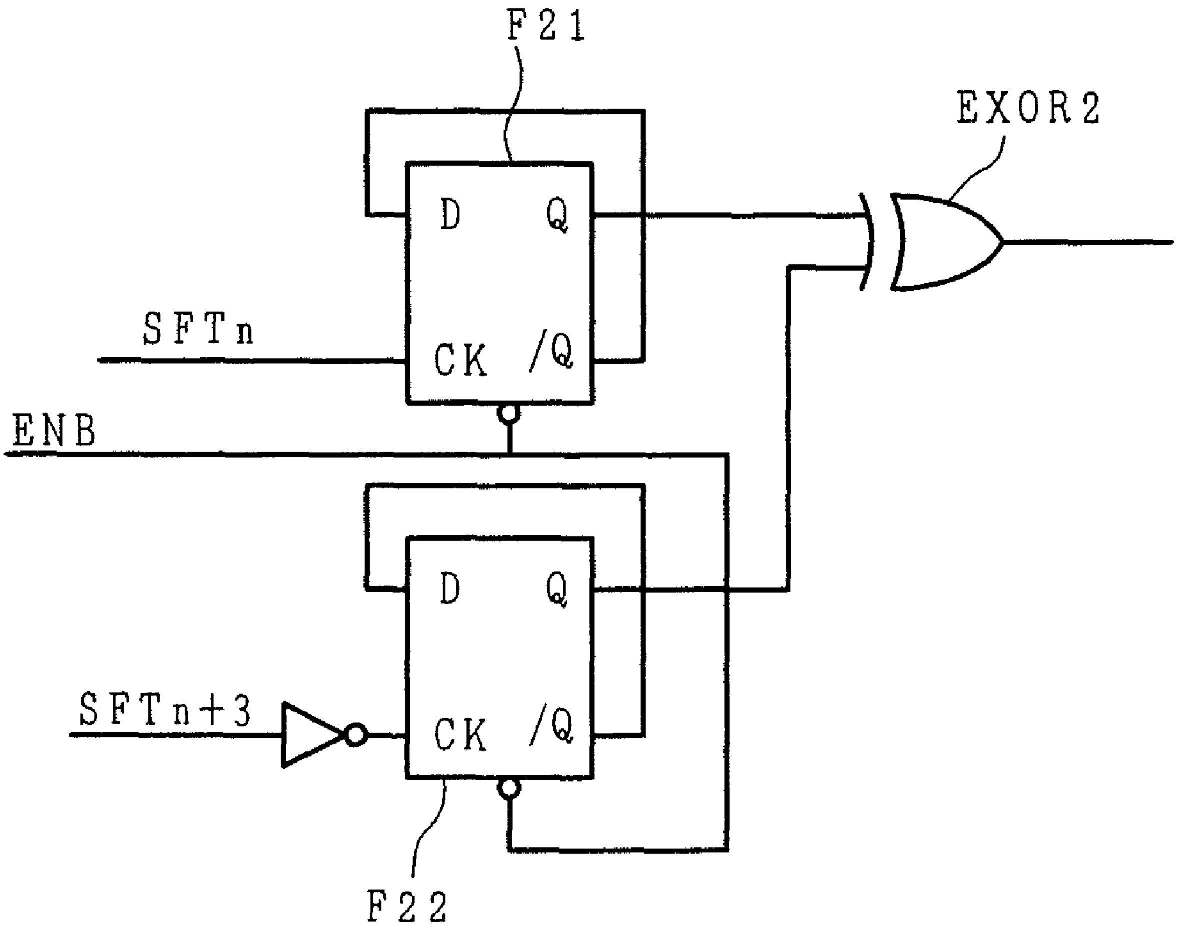
FIG. 29 is a circuit diagram showing an example of a clock generating circuit shown in FIG. 28.

In this case, as the clock generating circuit 450, a circuit shown by, for example, FIG. 29 can be used.

The clock generating circuit 450 shown in FIG. 29 reverses Q output from a D flip-flop circuit (F21) based on the data input control signal SFTn and reverses Q output from a D flip-flop circuit (F22) based on the data input signal SFTn+3 reversed by an inverter (INV).

Further, Q outputs from the flip-flop circuits F21 and F22 are inputted to an exclusive-OR circuit (EXOR2) and the frame start pulse having the pulse width of 4 periods of the clock (CL2) is generated from the exclusive-OR circuit (EXOR2).

In this way, according to the embodiment, in each of the drain drivers 130, the frame start pulse and the in-frame start pulse are generated, whereby, the number of input pins of the semiconductor integrated circuit constituting the drain driver 130 is not increased and while maintaining the compatibility of the input pins, in the respective drain drivers 130, switching between frames can be recognized.

Figure 30:
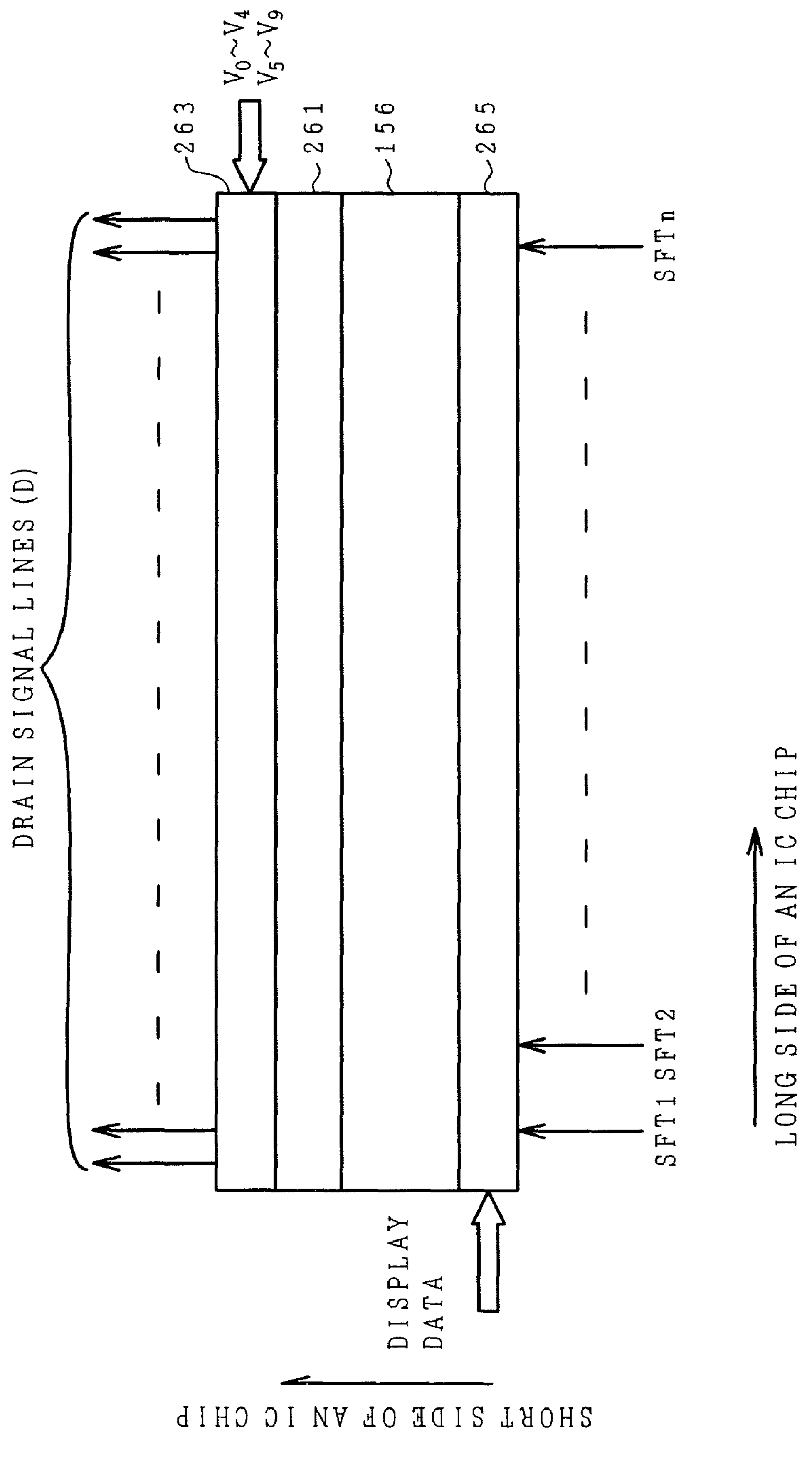
FIG. 30 is a layout view of essential portions showing arrangement of respective portions in a semiconductor integrated circuit for constituting the drain driver according to Embodiment 1.

FIG. 30 is a layout view of essential portions showing arrangement of respective portions in the semiconductor integrated circuit constituting the drain driver 130 according to the embodiment.

As shown in FIG. 30, the semiconductor integrated circuit constituting the drain driver 130 according to the embodiment, is provided with a terminal portion connected to the drain signal lines (D) on a long side of a semiconductor IC chip, and is provided with the data latch portion 265, the level shift circuit 156, the decoder circuit 261 and the amplifier pair 263 on its short side.

Figure 31:
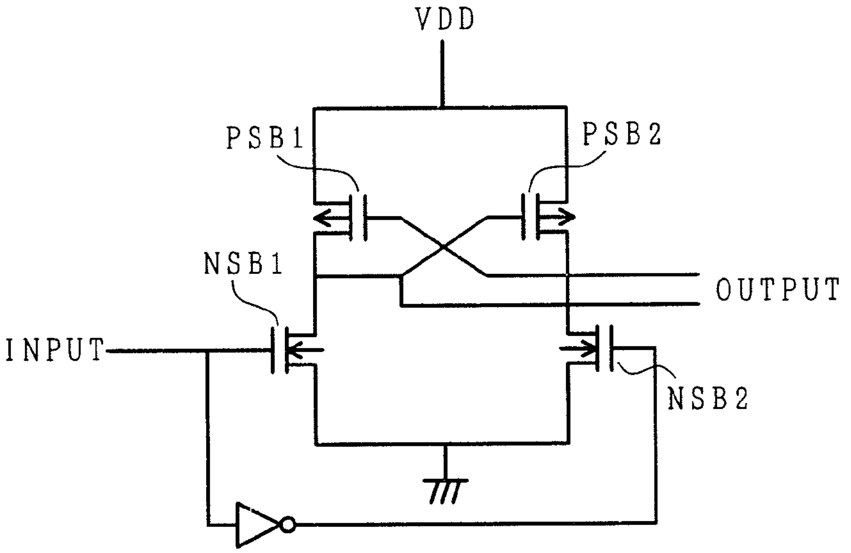
FIG. 31 is a circuit diagram showing a circuit constitution of a conventional level shift circuit.

In the level shift circuit 156, conventionally, a circuit constitution as shown in FIG. 31 has been used.

In this case, in the level shift circuit 156, input voltages of 0V through 5V need to be converted to voltages of 0V through 10V and be output, therefore, in the level shift circuit shown in FIG. 31, high-voltage-rating MOS transistors having, a source-drain breakdown voltage of 10 volts (PSB1, PSB2, NSB1, NSB2) need to be used.

In the high-voltage-rating MOS transistors compared with low-voltage-rating MOS transistors having a source-drain breakdown voltage of 5 volts, the gate length is longer and the gate width is also enlarged since the current value needs to be increased.

Therefore, when the level shift circuit using the high-voltage-rating MOS transistors (PSB1, PSB2, NSB1, NSB2) having a source-drain breakdown voltage of 10 volts is used as the level shift circuit 156, there poses a problem in that an area of a portion of the level shift circuit 156 in the semiconductor integrated circuit constituting the drain driver 130 is enlarged, at the same time, the chip size of the short sides of semiconductor IC chips constituting the drain driver 130 is enlarged, the chip unit cost cannot be lowered and a reduction of the border areas of the liquid crystal display panel cannot be achieved.

Figure 32:
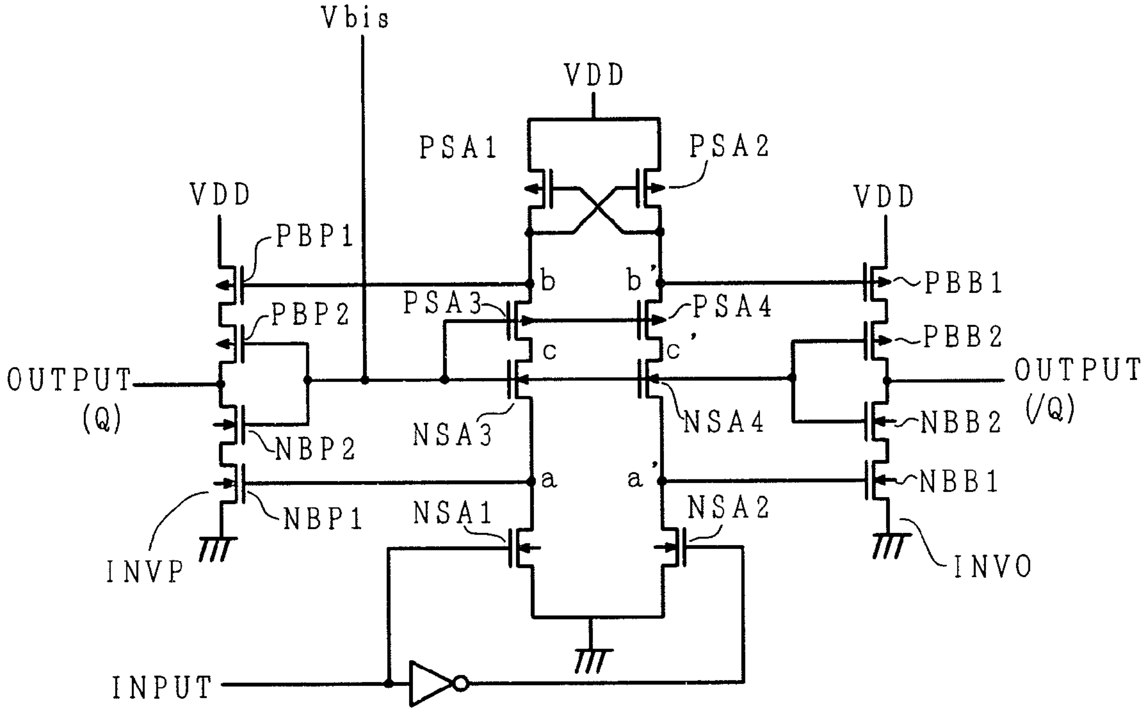
FIG. 32 is a circuit diagram showing a circuit constitution of a level shift circuit according to Embodiment 1.

FIG. 32 is a circuit diagram showing a constitution of a level shift circuit used in the level shifter 156 according to the embodiment.

The level shift circuit shown in FIG. 32 differs from the level shift circuit shown in FIG. 31 in that a series circuit of a PMOS transistor (PSA3) and an NMOS transistor (NSA3) for producing a voltage drop is inserted between a PMOS transistor (PSA1) and an NMOS transistor (NSA1) and a series circuit of a PMOS transistor (PSA4) and an NMOS transistor (NSA4) for producing a voltage drop is inserted between a PMOS transistor (PSA4) and an NMOS transistor (N5A4).

In this case, the gate electrodes of the PMOS transistors (PSA3, PSA4) and the NMOS transistors (NSA3, NSA4) are supplied with a bias potential (Vbis) which is an intermediate voltage between the power supply voltage VDD and a reference voltage (GND).

Figure 33:
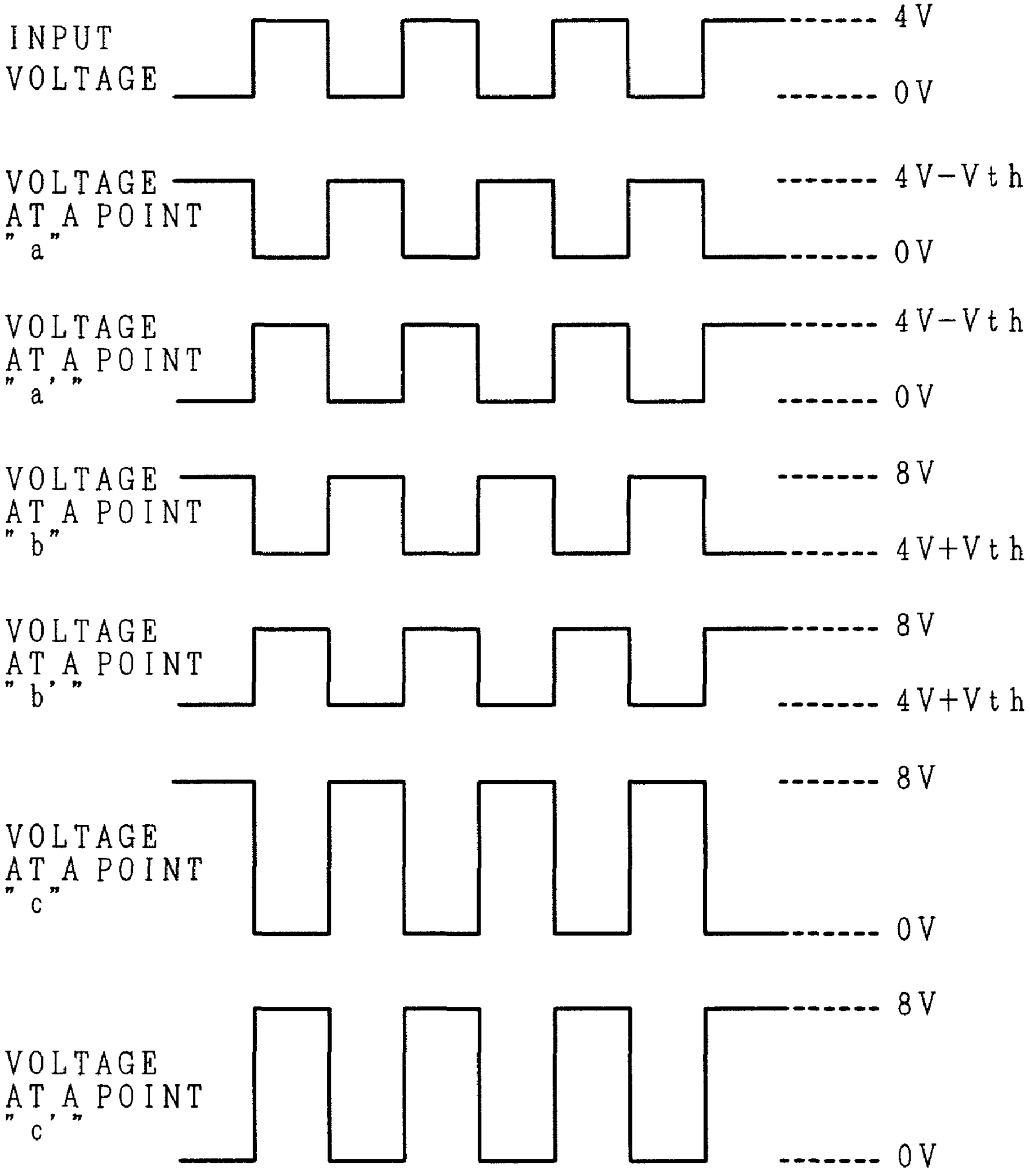
FIG. 33 is a diagram showing voltage waveforms of respective portions shown in FIG. 32.

FIG. 33 is a drawing showing voltage waveforms of respective portions of the level shift circuit shown in FIG. 32 and FIG. 33 is a diagram showing waveforms of respective portions in the case in which the power supply potential (VDD) is 8V, the bias potential (Vbis) is 4V and an input voltage is 0V through 4V.

An explanation will be given of the operation of the level shift circuit shown in FIG. 32 in reference to FIG. 33.

Now, in the case in which the input voltage is at H level of 4V, 4V is applied to the gate electrode of the NMOS transistor (NSA1) and 0V (input voltage reversed by an inverter) is applied to the gate electrode of the NMOS transistor (NSA2) and accordingly, the NMOS transistor (NSA1) is made ON and the NMOS transistor (NSA2) is made OFF.

Accordingly, a potential of point (a) shown in FIG. 32 becomes 0V and since the gate electrode of the NMOS transistor (NSA3) is supplied with bias a potential (Vbis) of 4V, the NMOS transistor (NSA3) is made ON and a potential at point (c) shown in FIG. 32 also becomes 0V.

Further, when the potential of point (c) shown in 62 FIG. 32 becomes 0V, since the gate electrode of the PMOS transistor (PSA3) is supplied with the bias potential (Vbis), the source potential of a source electrode of the PMOS transistor (PSA3) is dropped.

The source potential of the PMOS transistor (PSA3) is applied to the gate electrode of a PMOS transistor (PSA2), the PMOS transistor (PSA2) is made ON and the potential of point (b') shown in FIG. 32 becomes 8V.

When the potential of point (b') shown in FIG. 32 becomes 8V, the PMOS transistor (PSA1) having its gate electrode supplied with the potential of point (b') is made OFF.

Further, when the PMOS transistor (PSA1) is made OFF, since no current flows in the series circuits of transistors comprising the PMOS transistors (PSA1, PSA3) and the NMOS transistors (NSA1, NSA3), the source potential (VPS) of the source electrode of the PMOS transistor (PSA3) is expressed by the following equation (3).

(Equation 3)

$$VPGS+VPth=0$$

$$VPG-VPS+VPth=0$$

$$VPS=VPG+VPth \quad (3)$$

where VPGS designates a voltage between the gate and the source of the PMOS transistor (PSA3), VPG designates the gate potential of the PMOS transistor (PSA3) and VPth designates a threshold voltage. Therefore, the potential at point (b) shown in FIG. 32, that is, the source potential (VPS) of the PMOS transistor (PSA3) becomes a voltage of the gate potential (VPG) with the threshold voltage (VPth) added and the source potential (VPS) of the PMOS transistor (PSA3) becomes substantially equal to the gate potential (VPG) (=4V).

The source voltage (VPS) of the PMOS transistor (PSA3) is equal to a drain voltage (VPD) of the drain electrode of the PMOS transistor (PSA1) and accordingly, as the PMOS transistor (PSA1) and the PMOS transistor (PSA3), low-voltage-rating PMOS transistors having a source-drain breakdown voltage of 5 volts can be used.

Further, by making ON the PMOS transistor (PSA2), the PMOS transistor (PSA4) is made ON and the potential of point (c') shown in FIG. 32 becomes 8V.

Further, the NMOS transistor (NSA2) is made OFF, no current flows in the series circuits of transistors comprising the PMOS transistors (PSA2, PSA4) and the NMOS transistors (NSA2, NSA4) and accordingly, the source potential (VNS) of the source electrode of the NMOS transistor (NSA4) is expressed by the following equation (4).

$$VNES-VNth=0$$

$$VNG-VMS-VNth=0$$

$$VNS=VNG-VNth \quad (4)$$

where VNGS designates a voltage between the gate and the source of the NMOS transistor (NSA4), VNG designates the gate voltage of the NMOS transistor (NSA4) and VNth designates a threshold voltage.

Accordingly, the potential of point (a') shown in FIG. 32, that is, the source potential (VNS) of the NMOS transistor (NSA4) becomes a voltage of the gate potential (VNG) with the threshold value potential (VNth) subtracted therefrom, and the source potential (VNS) of the NMOS transistor (NSA4) becomes substantially equal to the gate potential (VNG) (4V).

The source voltage (VNS) of the NMOS transistor (NSA4) is equal to the drain potential (VND) of the drain electrode of the NMOS transistor (NSA2) and accordingly, as the NMOS transistor (NSA2) and the NMOS transistor (NSA4), low-voltage-rating NMOS transistors having a source-drain breakdown voltage of 5 volts can be used. Further, when a point (a) shown in FIG. 32 is at 0V and a point (b) is at 4V, a PMOS transistor (PBP1) of an inverter circuit (INVP) is made ON and an NMOS transistor (NBP1) is made OFF.

Further, a series circuit of a PMOS transistor (PBP2) and an NMOS transistor (NBP2) is inserted between the PMOS transistor (PBP1) of an inverter circuit (INVP) and the NMOS transistor (NBP1) and the gate electrodes of the PMOS resistors (PBP2, NBP2) are supplied with the bias potential (Vbis) of 4V and accordingly, an output (Q) becomes 8V.

In this case, as mentioned above, the source potential of the NMOS transistor (NBP2) becomes substantially equal to the gate potential and accordingly, as the NMOS transistor (NBP1) and the NMOS transistor (NBP2), low-voltage-rating NMOS transistors having a source-drain breakdown voltage of 5V can be used.

Similarly, when the PMOS transistor (PBP1) of the inverter circuit (INVP) is made OFF and the NMOS transistor (NBP1) is made ON, the source potential of the PMOS transistor (PBP2) becomes substantially equal to its gate potential and therefore, as the PMOS transistor (PBP1) and the NMOS transistor (PBP2), low-voltage-rating PMOS transistors having a source-drain breakage voltage of 5V can be used.

Thereby, according to the embodiment, an area occupied by the level shift circuit 156 can be reduced in the semiconductor integrated circuit comprising the drain driver 130 and the length of the short sides of the semiconductor IC chips can be made small.

Figure 34A:
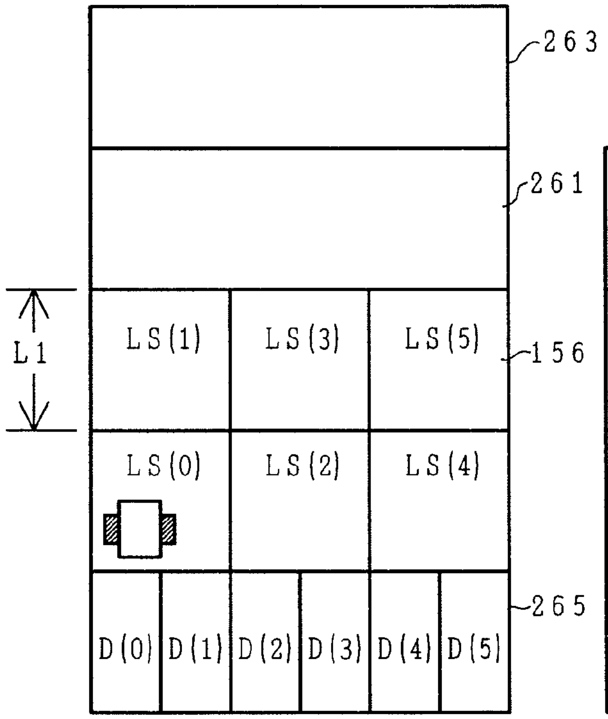
FIG. 34A (PRIOR ART)
FIGS. 34A, 34B are diagrams for explaining an area occupied by the level shift circuit in a semiconductor integrated circuit constituting the drain driver according to Embodiment 1 in which FIG. 34A explains the conventional level, shift circuit and FIG. 34B explains the level shift circuit according to Embodiment 1.
Figure 34B:
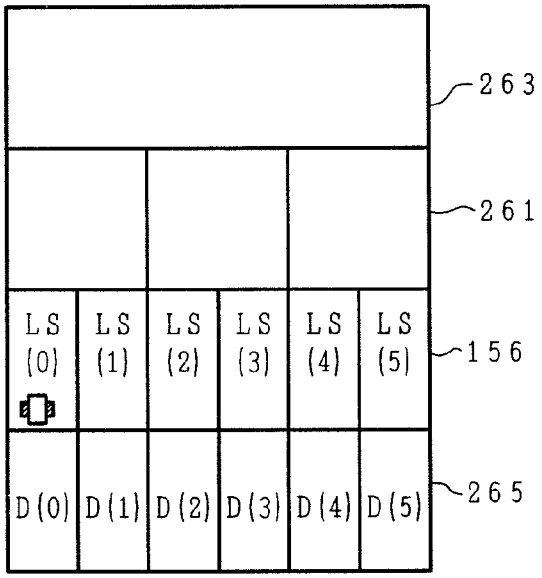

FIG. 34A explains the conventional level shift circuit and FIG. 34B explains the level shift circuit according to the embodiment.

FIG. 34B is a schematic diagram for explaining the area occupied by the level shift circuit 156 in the semiconductor integrated circuit comprising the drain driver 130 according to the embodiment.

In FIG. 34B, notations D(0) through D(5) designate latch circuits in the data latch portion 265 for latching respective bit values of display data and notations LS(0) through LS(5) designate level shift circuits in the level shift circuit 156 installed for the respective latch circuits (D(0) through D(5)).

As shown in FIG. 34A, when the conventional level shift circuit is adopted, high-voltage-rating MOS transistors having a source-drain breakdown voltage of 8V need to be used, the area of the level shift circuit is enlarged and two of the level shift circuits need to be arranged to be overlapped for every two of the latch circuits in the data latch portion 265. However, in the level shift circuit of the embodiment, low-voltage-rating MOS transistors having a source-drain breakdown voltage of 5 volts can be used and accordingly, the area of the level shift circuit can be reduced such that two level shift circuits can be arranged in an area occupied by one conventional level shift circuit in the semiconductor integrated circuit. Therefore, as shown in FIG. 34B, one level shift circuit can be arranged for each of the latch circuits in the data latch portion 265 according to the embodiment.

Therefore, according to the embodiment, compared with the conventional example, the length of the short sides of semiconductor IC chips comprising the drain driver 130 can be shortened by a length (LI) shown in FIG. 34A and the reduction of the border areas can be dealt with.

Figure 35:
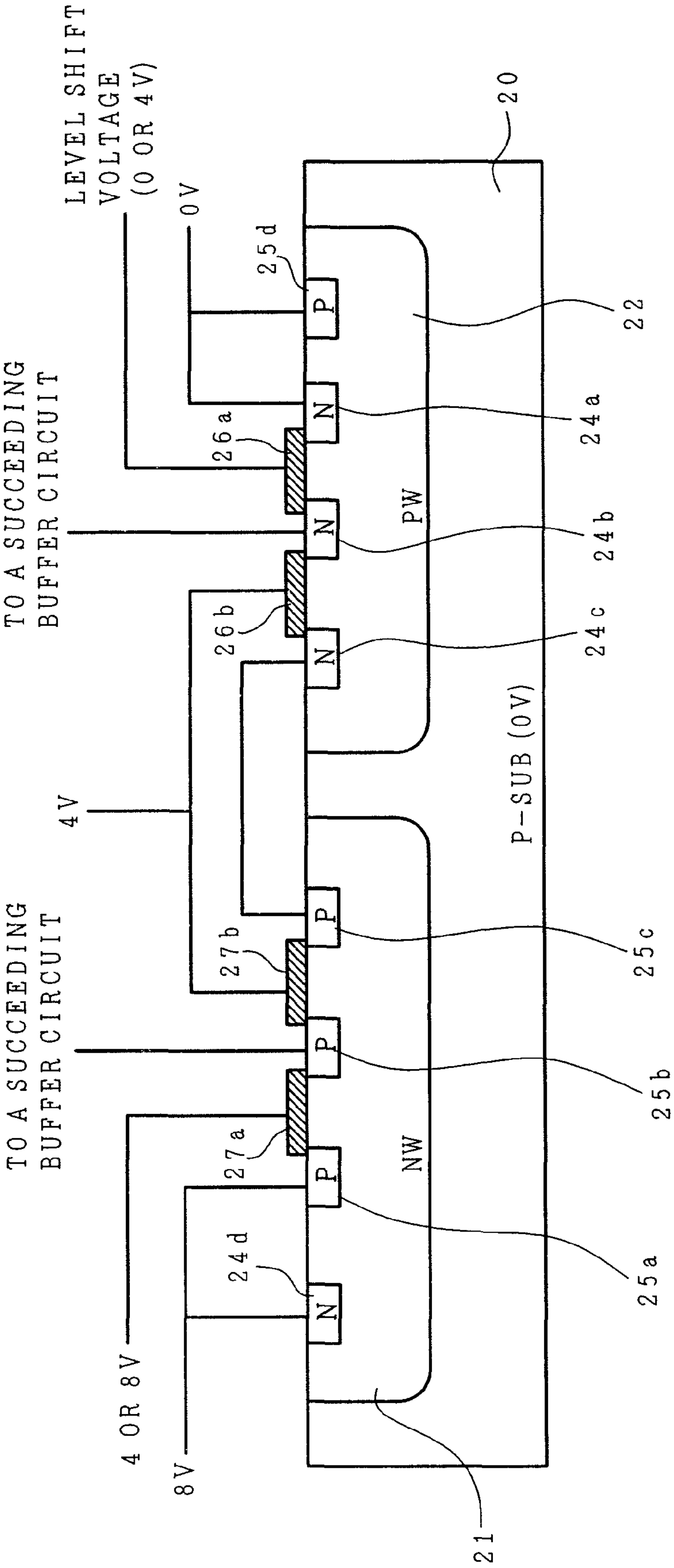
FIG. 35 is a sectional view of essential portions showing sectional structures of PMOS (P-channel Metal Oxide Semiconductor) transistors (PSA1, PSA3) and NMOS (N-channel Metal Oxide Semiconductor) transistors (NSA1, NSA3) shown in FIG. 32.

FIG. 35 is a sectional view of essential portions showing sectional structures of the PMOS transistors (PSA1, PSA3) and the NMOS transistors (NSA1, NSA3) shown in FIG. 32.

As shown in FIG. 35, an n-well region 21 is formed in a p-type semiconductor substrate 20 and the PMOS transistors (PSA1, PSA3) are constituted by respective p-type semiconductor regions (25*a*, 25*b*, 25*c*) formed in the n-well region 21 and gate electrodes (27*a*, 27*b*).

In this case, the p-type semiconductor region (25*b*) serves as the drain region of the PMOS transistor (PSA1) and the source region of the PMOS transistor (PSA3).

Further, a p-well region 22 is formed in the p-type semiconductor substrate 20 and the NMOS transistors (NSA1, NSA3) are constituted by respective n-type semiconductor regions (24*a*, 24*b*, 24*c*) formed in the p-well region 22 and gate electrodes (26*a*, 26*b*).

In this case, the n-type semiconductor region (24*b*) serves as the drain region of the NMOS transistor (NSA1) and the source region of the NMOS transistor (NSA3). In this case, a voltage of 0V is applied to the p-type semiconductor substrate 20, a voltage of 0V is applied to the p-well region 22 and a voltage of 8V is applied to the n-well region 21.

Therefore, a maximum of 8V of reverse voltage is applied between the n-type semiconductor region (24*c*) and the p-well region 22 and between the p-type semiconductor region (25*c*) and the n-well region 21 and accordingly, when a breakdown voltage is not sufficiently high at the portion, the breakdown voltage of the portion needs to be promoted by a double-drain structure (DDD) or the like.

Embodiment 2

A liquid crystal display module according to Embodiment 2 of the invention differs from the liquid crystal display module according to Embodiment 1 in that a number of transistors for constituting the high-voltage decoder circuit 278 or the low-voltage decoder circuit 279 in the drain driver 130 is reduced.

An explanation will be given of the drain driver 130 according to the embodiment centering on a point of difference from that in Embodiment 1.

Figure 36:
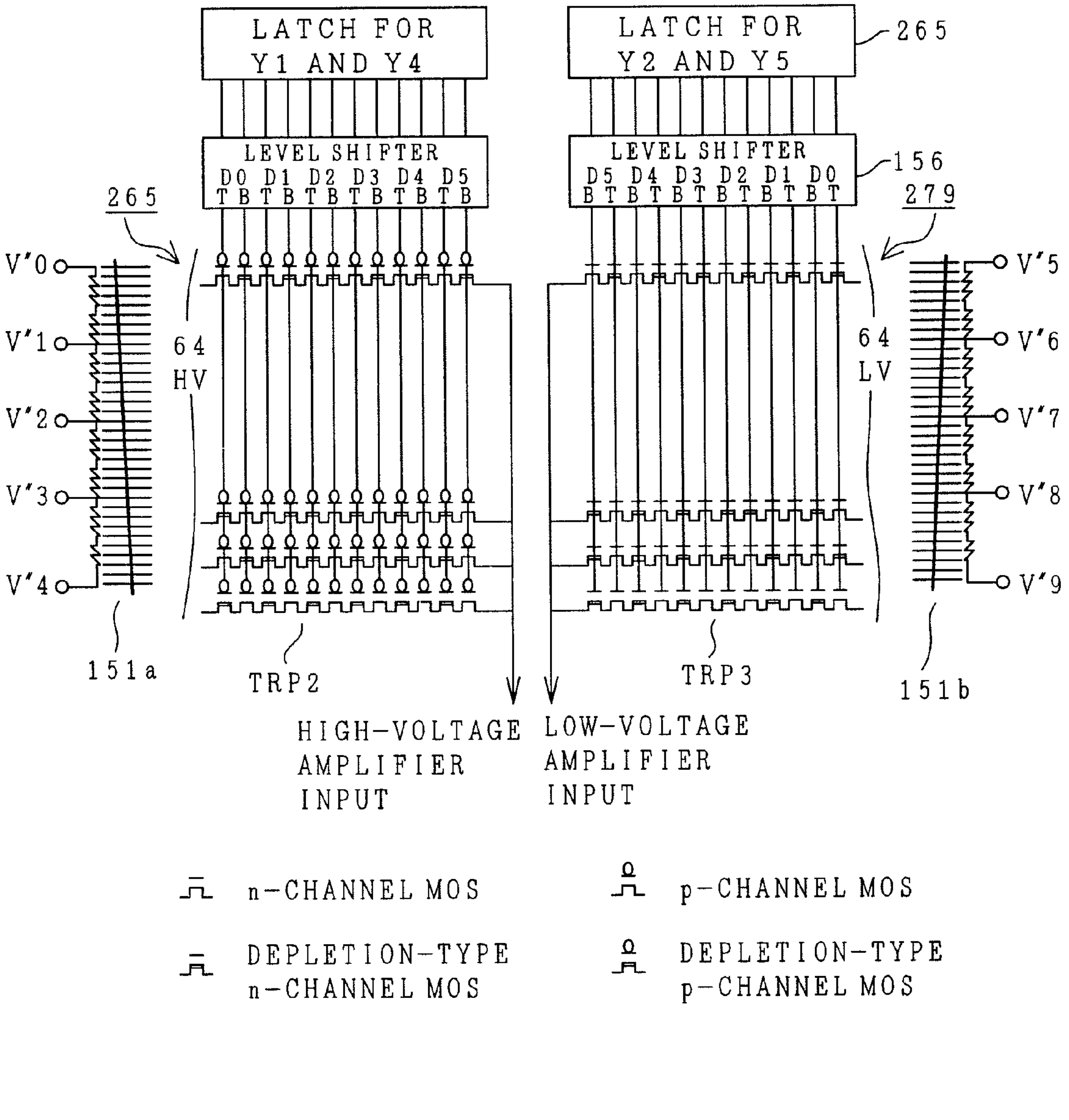
FIG. 36 is a circuit diagram showing circuit constitutions of a high-voltage decoder circuit and a low-voltage decoder circuit in the drain driver according to Embodiment 1.

FIG. 36 is a circuit diagram showing a circuit constitution of the high-voltage decoder circuit 278 and the low-voltage decoder circuit 279 in the drain driver 130 according to Embodiment 1.

It should be noted that FIG. 36 also illustrates an outline circuit constitution of the positive-polarity gray-scale voltage generating circuit 151*a* and the negative-polarity gray-scale voltage generating circuit 151*b*.

The high-voltage decoder circuit 278 is provided with 64 rows of transistors (TRP2) each constituted by connecting in series 6 high-voltage-rating PMOS transistors and 6 high-voltage-rating depletion-type PMOS transistors and connected to output terminals and terminals opposite from the output terminals of the respective rows of transistors (TRP2) are supplied with 64 levels of gray scale voltages of positive-polarity outputted from the positive-polarity gray-scale voltage generating circuit 151*a* via the voltage bus line 158*a* (refer to FIG. 5).

Further, respective gate electrodes of the 6 high-voltage-rating PMOS transistors and the 6 high-voltage-rating depletion-type PMOS transistors constituting each of the rows of transistors (TRP2), are selectively supplied with respective bit values (T) or inverted bit values (B) thereof of 6 bits display data outputted from the level shift circuit 156 based on predetermined combinations.

The low-voltage decoder circuit 279 is provided with 64 rows of transistors (TRP3) each constituted by connecting in series 6 high-voltage-rating NMOS transistors and 6 high-voltage-rating depletion-type NMOS transistors and connected to output terminals and terminals opposite from the output terminals of the respective rows of transistors (TRP3) are supplied with 64 levels of gray scale voltages of negative-polarity outputted from the gray scale voltage generating circuit 151*b* via the voltage bus line 158*b* (refer to FIG. 5).

Further, respective gate electrodes of the 6 high-voltage-rating NMOS transistors and the 6 high-voltage-rating depletion-type NMOS transistors constituting each of the rows of transistors (TRP3), are selectively supplied with respective bit values (T) or inverted bit values (B) thereof of 6 bits display data outputted from the level shift circuit 156 based on predetermined combinations.

In this way, the high-voltage decoder circuit 278 and the low-voltage decoder circuit 279 according to Embodiment 1, are provided with constitutions in which 12 MOS transistors are continuously connected for each gray scale. Therefore, a total number of MOS transistors per each drain signal line (D) is 768 (64×12).

In recent years, in a liquid, crystal display device, an increase in the number of steps of gray scales is in progress from 64 gray scale display to 256 gray scale display. However, when 256 gray scale display is carried out by using conventional ones of the high-voltage decoder circuit 278 and the low-voltage decoder circuit 279, a total number of MOS transistors per each drain signal line (D) is 4096 (256×16).

Therefore, there poses a problem in that an area occupied by the decoder portion 261 is increased and the chip size of the semiconductor integrated circuit (IC chip) constituting the drain driver 130 is enlarged.

Figure 37:
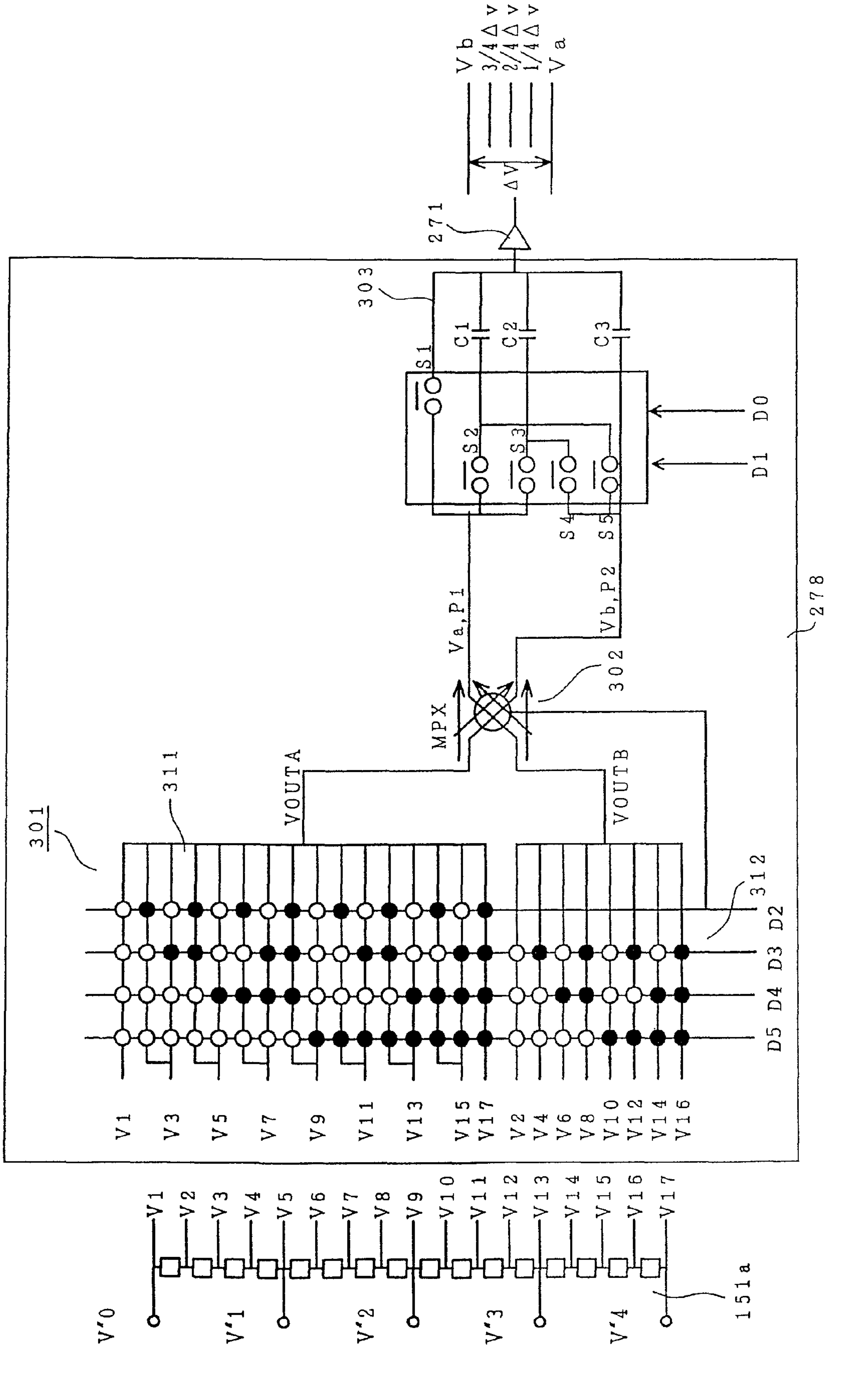
FIG. 37 is a circuit diagram showing a circuit constitution of an example of a high-voltage decoder circuit in a drain driver according to Embodiment 2.

FIG. 37 is a circuit diagram showing circuit constitutions of the high-voltage decoder circuit 278 and the positive-polarity gray scale voltage generating circuit 151*a* in the drain driver 130 according to Embodiment 2.

As shown in FIG. 37, the positive-polarity gray scale voltage generating circuit 51*a* does not generate 64 levels of gray scale voltages as in Embodiment 1 (refer to FIG. 36) but generates primary 17 levels of positive-polarity gray scale voltages based on 5 levels of positive polarity, reference gray scale voltages (V"0-V"4) inputted from the positive voltage generating circuit 121.

In this case, each resistance in the voltage-dividing resistor circuit is weighted to reflect the relationship between light transmission through the liquid crystal layer and a voltage applied across it.

The high-voltage decoder circuit 278 includes a decoder circuit 301 for selecting two successive levels among the 17 levels of the primary gray scale voltages and outputting them as primary gray scale voltages VOUTA and VOUTAB, respectively, a multiplexer 302 for outputting the primary gray scale voltage VOUTA to the terminal P1 and the primary gray scale voltage VOUTB to the terminal P2, or outputting the primary gray scale voltage VOUTA to the terminal P2 and the primary gray scale voltage VOUTB to the terminal P1, and a secondary gray scale voltage generating circuit 303 for dividing a voltage difference Δ between the primary gray scale voltages VOUTA and VOUTB and generating Va, V+(I/4)Δ, Va+(2/4)Δ, Va+(3/4)Δ and Va+(I/4)Δ.

The decoder circuit 301 is constituted by a first decoder 311 for selecting primary gray scale voltages in correspondence with higher-order four bits (D2-D5) of 6 bits display data among the odd-numbered primary gray scale voltages and a second decoder 312 for selecting primary gray scale voltages in correspondence with higher-order three bits (D3-D5) of 6 bits display data among the even-numbered primary gray scale voltages.

The first decoder 311 is configured such that the higher-order four bits (D2-D5) of a six-bit display data select the first and seventeenth primary gray scale voltages V1 and V17 once, and select the third to fifteenth primary gray scale voltages V3 to V15 two times. The second decoder 312 is configured such that the higher-order three bits (D3-D5) of a six-bit display data select the second primary gray scale voltage (V2) to the sixteenth primary gray scale voltage (V16) once.

It should be noted that in FIG. 37, notation ○ designates a switch element (for example, PMOS transistor) which is made ON with data bit at L level and notation designates a switch element (for example, NMOS transistor) which is made ON with data bit at H level.

In this case, V"0<V"1<V"2<V"3<V"4 and therefore, when the bit value of the third bit (D2) of display data is at L level, as the gray scale voltage VOUTA, a gray scale voltage at a potential lower than that of the gray scale voltage of VOUTB is outputted, further, when the bit value of the third bit (D2) of display data is at H level, as the gray scale voltage VOUTA, a gray scale voltage at a potential higher than that of the gray scale voltage of VOUTB is outputted.

Accordingly, the multiplexer 302 is switched in accordance with H level and L level of the bit value of the third bit (D2) of display data, when the bit value of the third bit (D2) of display data is at L level, the gray scale voltage of VOUTA is outputted to the terminal (P1), the gray scale voltage of VOUTB is outputted to the terminal (P2), further, when the bit value of the third bit (D2) of display data is at H level, the gray scale voltage of VOUTB is outputted to the terminal (P1) and the gray scale voltage of VOUTA is outputted to the terminal (P2).

Thereby, when the gray scale voltage of the terminal (P1) is designated by (Va) and the gray scale voltage of the terminal (P2) is designated by (Vb), Va<Vb can always be established and the design of the second gray scale voltage generating circuit 303 is simplified.

The secondary gray scale voltage generating circuit 303 is constituted by a switch element (S1) connected between the terminal (P1) and an input terminal of the high-voltage amplifier circuit 271, a condenser (CI) one end of which is connected to the input terminal of the high-voltage amplifier circuit 271 and other end of which is connected to the terminal (P1) via a switch element (S2) and connected to the terminal (P2) via a switch element (S5), a condenser (C2) one end of which is connected to the input terminal of the high-voltage amplifier circuit 271 and other end of which is connected to the terminal (P1) via a switch element (S3) and connected to the terminal (P2) via a switch element (S4) and a condenser (C3) connected between the terminal (P2) and the input terminal of the high-voltage amplifier circuit 271.

In this case, capacitance values of the condenser (CI) and the condenser (C3) are set to the same value and a capacitance value of the condenser (C2) is set to a capacitance value twice as much as the capacitance values of the condenser (C1) and the condenser (C3).

In addition, the respective switch elements (S1-S5) are made ON and, OFF in accordance with the bit values of lower-order two bits (D0, D1) of display data as shown in FIG. 38A.

FIG. 38A illustrates values of gray scale voltages outputted from the secondary gray scale voltage generating circuit 303 in accordance with bit values of the lower-order two bits (D0, D1) of display data and FIGS. 38B-38E illustrate circuit constitutions of the secondary gray scale voltage generating circuit 303 in accordance with the bit values of the lower-order two bits (D0, DI) of display data.

It should be noted that also the low-voltage decoder circuit 279 can be constituted similar to the high-voltage decoder circuit 278 and in this case, the low-voltage decoder circuit 279 selects primary 17 levels of negative-polarity gray scale voltages generated by the negative-polarity gray scale voltage generating circuit 151*b*.

Further, the negative-polarity gray scale voltage generating circuit 151*b* generates the primary 17 levels of negative-polarity gray scale voltages based on 5 levels of negative-polarity reference gray scale voltages (V"5-V"9) inputted from the negative voltage generating circuit 122, further, each resistance in the voltage dividing resistor in the voltage-dividing resistor circuit constituting the negative-polarity gray scale voltage generating circuit 151*b* is weighted to reflect the relationship between light transmission through the liquid crystal layer and a voltage applied across it.

In the low-voltage decoder circuit 279, V"5>V"6>V"7>V"8>V"9 and therefore, when the gray scale voltage of the terminal (P1) is designated by (Va) and the gray scale voltage of the terminal (P2) is designated by (Vb), Va>Vb is always established.

Figure 39:
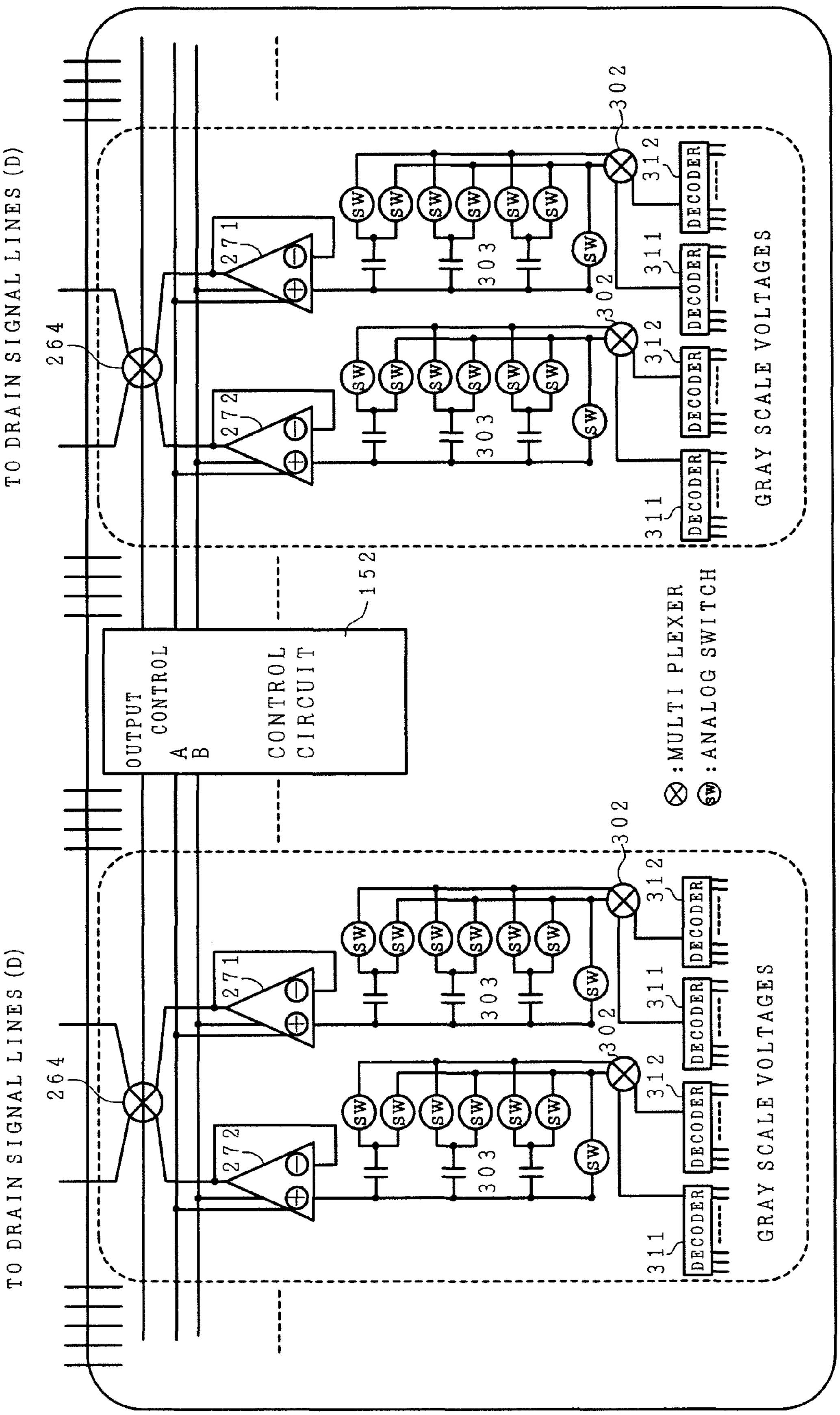
FIG. 39 is a diagram showing a constitution of an output stage of the drain driver according to Embodiment 2.

FIG. 39 is a diagram showing an outline constitution of an output stage of the drain driver 130 in the liquid crystal display module according to Embodiment 2 in the case of using the high-voltage decoder circuit 278 shown in FIG. 37 and the low-voltage decoder circuit 279 having a circuit constitution similar to that of the high-voltage decoder circuit 278 shown in FIG. 37.

In FIG. 39, an amplifier circuit having the circuit constitution shown in FIG. 15 is used in the high-voltage amplifier circuit 271 and an amplifier circuit having the circuit constitution shown in FIG. 14 is used in the low-voltage amplifier circuit 272.

In this way, according to the embodiment, in respect of a number of switching elements constituting the decoder circuit, the number is 64 ((9+7)×4) in the first decoder circuit 311, the number is 24 (=3×8) in the second decoder circuit 312 and accordingly, a total number of the switching elements (MOS transistor) constituting the decoder circuit per each drain signal line (D) is 88 and the number can considerably be reduced in comparison with the total number of 768 of the MOS transistors per each drain signal line (D) in Embodiment 1.

Moreover, by reducing the number of switching elements, inner current of the drain driver 130 can be reduced and accordingly, power consumption of a total of the liquid crystal display module (LCM) can be reduced by which reliability of the liquid crystal display module (LCM) can be promoted.

Figure 40:
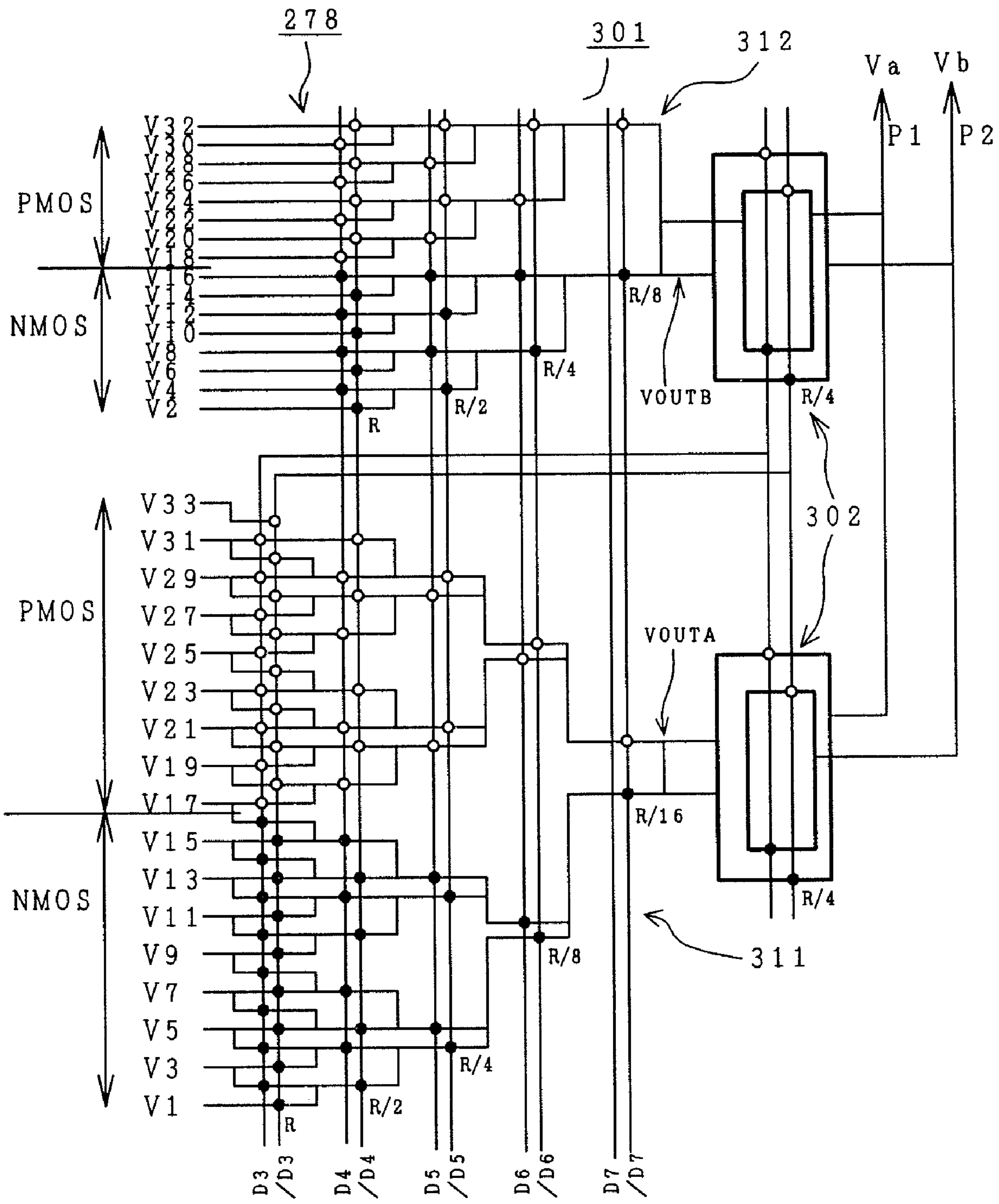
FIG. 40 is a circuit diagram showing a circuit constitution of other example of a high-voltage decoder circuit in the drain driver according to Embodiment 2.

FIG. 40 is a circuit diagram showing a circuit constitution of other example of the high-voltage decoder circuit 278 in the drain driver 130 according to the embodiment and in FIG. 40, notation ○ designates a PMOS transistor and • designates an NMOS transistor.

It should be noted that FIG. 40 shows an example of a circuit constitution in the case of generating 256 gray scale voltages and therefore, respective bit values and inverted values thereof of 8 bits display data of (D0-D7) are applied to the gate electrodes of the respective PMOS transistors based on predetermined combinations.

In the high-voltage decoder circuit 278 shown in FIG. 37, in respect of the MOS transistors the gate electrodes of which are supplied with the same voltage for each decoder row, the higher the order of the display data, the more continuously the transistors are arranged.

Therefore, even when the MOS transistors the gate electrodes of which are supplied with the same voltage for each digit and which are continuous at each decoder row, are replaced by one MOS transistor, no problem is posed in view of function.

In the high-voltage decoder circuit 278 shown in FIG. 40, MOS transistors electrodes of which are supplied with the same voltage at each digit and which are continuous at each decode row, are replaced by one MOS transistor.

In addition, in the high-voltage decoder circuit 278 shown in FIG. 40, when the gate width of the gate electrode of a smallest-sized MOS transistor is designated by notation W, a second MOS transistor of the next higher-order to the smallest-sized MOS transistor is set to 2 W, further, the gate width of the gate electrode of a third MOS transistor of the next higher-order to the second MOS transistor is 4 W and in this way, the gate width of the gate electrode of the MOS transistor in correspondence with a higher-order bit of display data is the gate width of the gate electrode of the smallest-sized MOS transistor multiplied by the (m−j)th power of 2 where notation m designates bit number of display data and notation j designates bit number of a highest-order bit among bits constituted by the smallest-sized MOS transistor.

In the high-voltage decoder circuit 278 shown in FIG. 40, when resistance of the smallest-sized MOS transistor is designated by notation R, synthesized resistance of MOS transistors at each decode row is about 2 R (≈R+R/2+R/4+R/8+R/16) in the decoder circuit 311 and about 2 R (≈R+R/2+R/4+R/8) in the decoder circuit 312.

It should be noted that FIG. 40 also illustrates resistances of MOS transistors at respective digits when the resistance of the smallest-sized MOS transistor is designated by notation R.

Therefore, the synthesized resistance of MOS transistors at the respective decode rows can be reduced in the high-voltage decoder circuit 278 shown in FIG. 40, in redistributing electric charge to the respective condensers constituting the secondary gray scale voltage generating circuit 303, large current can be charged and discharged and accordingly, not only high-speed operation of the decoder circuit can be achieved but also the synthesized resistance values of the decoder circuit 311 and the decoder circuit 312 can be made equivalent to each other and therefore, there can be reduced a difference between speeds of two gray scales generated.

Further, generally, in a MOS transistor, by a substrate-source voltage ($V_{BS}$), the threshold voltage (Vth) is changed in the positive direction by which drain current ($I_{DS}$) is reduced. That is, resistance of the MOS transistor is increased.

Therefore, in the high-voltage decoder circuit 278 shown in FIG. 40, the circuit is separated into a PMOS transistor region and an NMOS transistor region with a boundary of gray scale voltage at which the substrate-source voltages ($V_{BS}$) become equivalent (in FIG. 40, gray scale voltages of V16 (or V18), V15 (or V17)).

Thereby, in the high-voltage decoder circuit 278 shown in FIG. 40, an increase in resistance caused by the substrate bias effect in MOS transistors constituting the decoder circuit can be restrained.

Figure 41:
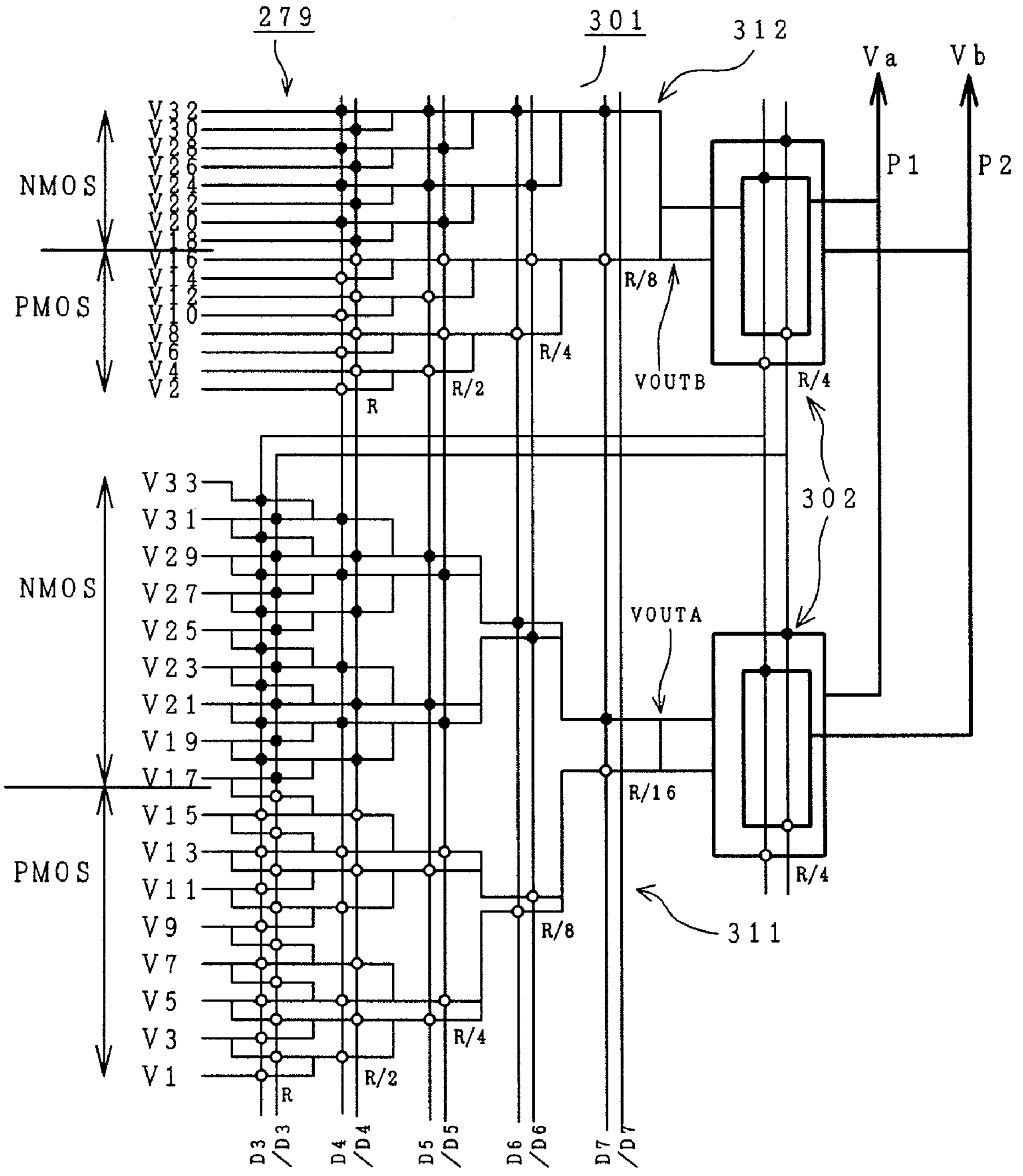
FIG. 41 is a circuit diagram showing a circuit constitution of other example of a low-voltage decoder circuit in the drain driver according to Embodiment 2.

FIG. 41 is a circuit diagram showing a circuit constitution of other example of the low-voltage decoder circuit 279 in the drain driver 130 according to the embodiment.

The low-voltage decoder circuit 279 shown in FIG. 41 is provided with a circuit constitution similar to that of the high-voltage decoder circuit 278 shown in FIG. 40.

However, in the low-voltage decoder circuit 279, in separating a PMOS transistor region and an NMOS transistor region with the boundary of the gray scale voltage where substrate-source voltages ($V_{BS}$) are equivalent (in FIG. 40, gray scale voltages of V16 (or V18), V15 (or V17)), positions of the PMOS transistor region and the NMOS transistor region are reversed to those in the high-voltage decoder circuit 278.

It should be noted that the respective voltages are set to V1>V2>V3 . . . >V32>V33.

In the above-described embodiments, each MOS transistor constituting the decode circuit 301 is constituted by a high-voltage-rating MOS transistor or a MOS transistor in which only the gate electrode portion is constructed by a high-voltage-rating structure.

Further, as MOS transistors of the lower-order bits of the decode circuit 301, there can be used lower source-drain voltage rating MOS transistors and in this case, the size of the decoder circuit 301 portion can further be reduced.

Figure 42:
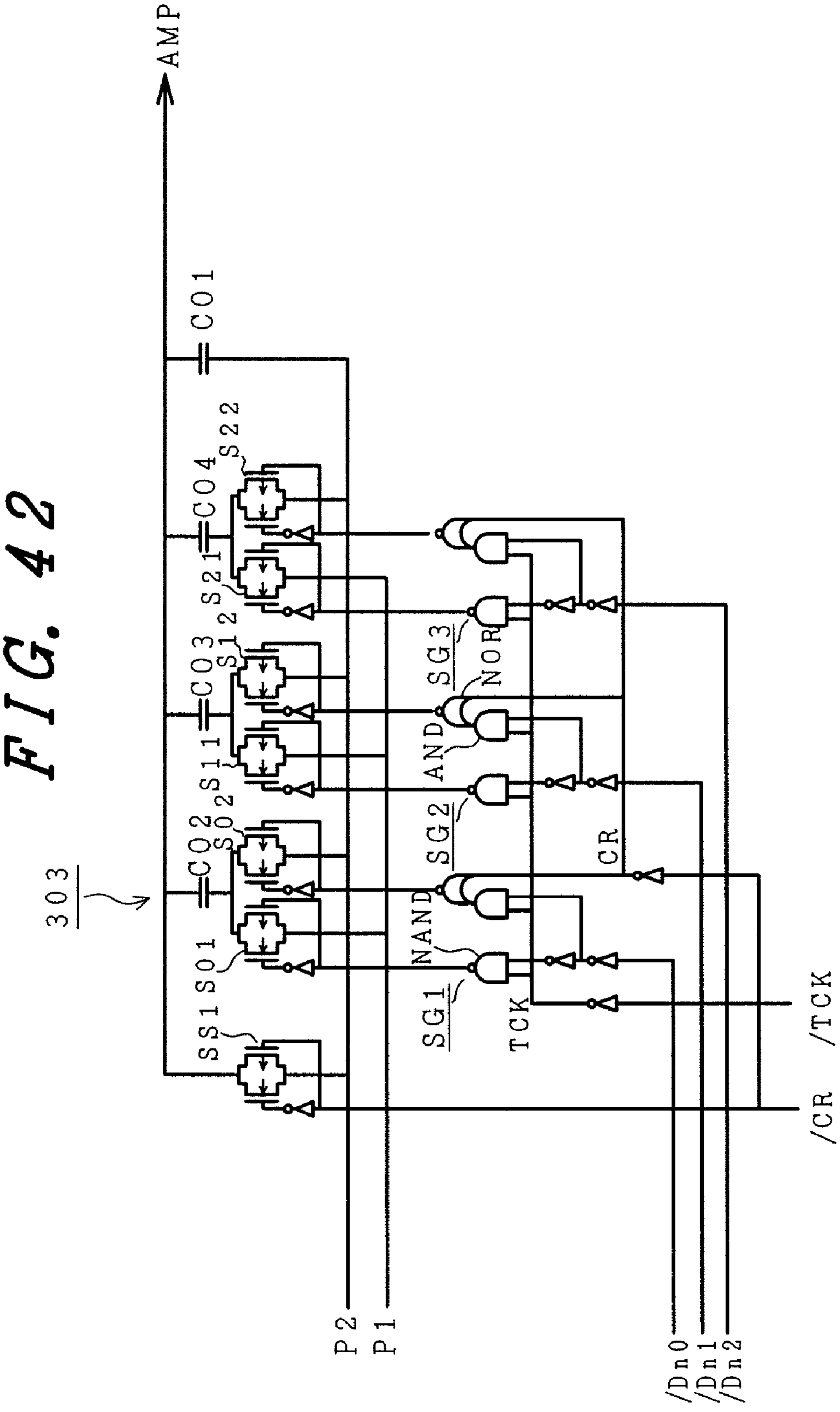
FIG. 42 is a diagram showing an example of a secondary gray scale voltage generating circuit used in the high-voltage decoder circuit shown in FIG. 40 or the low-voltage decoder circuit shown in FIG. 41.

FIG. 42 is a circuit diagram showing an example of a circuit constitution of the secondary gray scale voltage generating circuit 303 used in the high-voltage decoder circuit 278 shown in FIG. 40.

In the secondary gray scale voltage generating circuit 303 shown in FIG. 42, capacitance values of a condenser (Co1) and a condenser (Co2) are the same, a capacitance value of a condenser (Co3) is a capacitance value twice as much as the capacitance value of the condenser (Co1) and a capacitance value of a condenser (Co4) is a capacitance value four times as much as the capacitance value of the condenser (CoI).

Additionally, respective switch control circuits (SG1-SG3) each provided with an NAND circuit (NAND), an AND circuit (AND) and a NOR circuit (NOR). Table 2 shows a truth table of the NAND circuit (NAND), the AND circuit (AND) and the NOR circuit (NOR).

TABLE 2

| /CR | /TCK | ID | NAND | AND | NOR | Sn1 | Sn2 |
|---|---|---|---|---|---|---|---|
| L | H | * | H | L | L | OFF | ON |
| H | H | * | H | L | H | OFF | OFF |
| | L | H | L | L | H | ON | OFF |
| | | L | H | H | L | OFF | ON |

* indicates that display data are irrelevant.

When a reset pulse (/CR) is at L level, a switch element (SS1) is made ON, and an output from the NOR circuit (NOR) becomes L level and respective switch elements (S02, S12, S22) are made ON.

In this case, a timing pulse (/TCK) is at H level, an output from the NAND circuit (NAND) becomes H level and the respective switch elements (S01, S11, S21) are made OFF. Thereby, both terminals of the respective condensers (CoI-Co4) are connected to the terminal (P2) and accordingly, the respective condensers (CoI-Co4) are charged or discharged and the potential difference is brought into a state of 0 volt.

Next, when the reset pulse (/CR) becomes H level and the timing pulse (/TCK) becomes L level, the respective switch elements (S01, S02, S11, S12, S21, S22) are made ON or OFF in accordance with respective bit values of the lower-order 3 bits (D0-D2) of display data.

Thereby, when the gray scale voltage of the terminal (P1) is designated by (Va) and the gray scale voltage of the terminal (P2) is designated by (Vb), gray scale voltages of Va+(I18)Δ, Va+(2/8)Δ, . . . Vb{Va+(8/8)Δ} are outputted from the secondary gray scale generating circuit 302.

Further, although resistors can be used in place of the condensers in the secondary gray scale voltage generating circuit 303, in this case, resistors having high resistance values need to be used and the ratios between resistance values are reciprocal to the ratios between the capacitances.

For example, when resistors are used in place of the condensers in the secondary voltage generating circuit 303 shown in FIG. 37, resistance values of the resistors for replacing the condenser (CI) and the condenser (C3) need to be a resistance value twice as much as a resistance value of a resistor for replacing the condenser (C2).

Embodiment 3

A liquid crystal display module according to Embodiment 3 of the invention differs from the liquid crystal display module according to Embodiment 2 in that inverting amplifiers are used as the high-voltage amplifier circuit 271 and the low-voltage amplifier circuit 272 in the drain driver 130.

An explanation will be given of the drain driver 130 according to the embodiment centering on difference from Embodiment 2.

Figure 43:
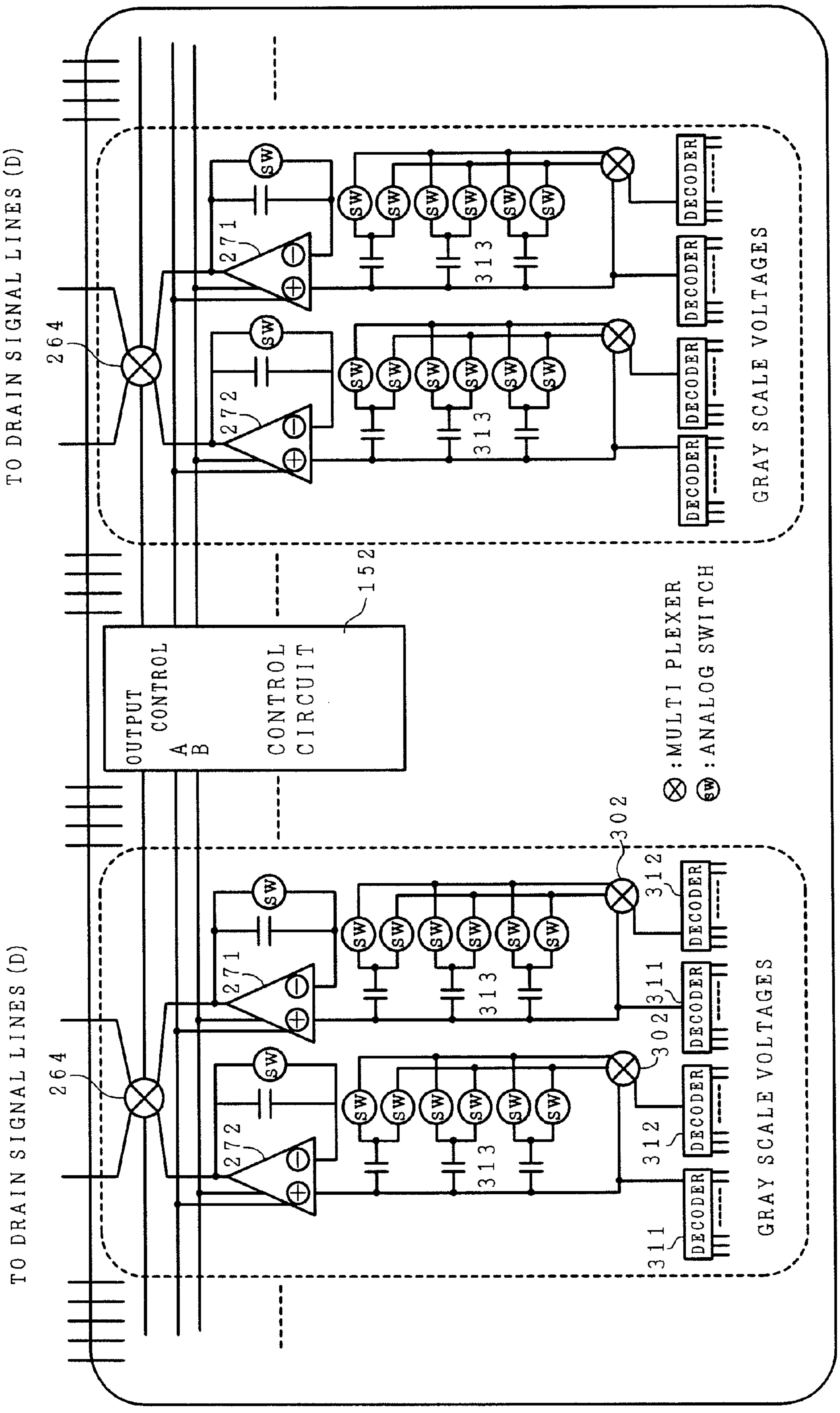
FIG. 43 is a diagram showing a constitution of an output stage of a drain driver according to Embodiment 3.

FIG. 43 is a diagram showing an outline constitution of the output stage of the drain driver 130 of the liquid crystal display module according to Embodiment 3 when the high-voltage decoder circuit 278 shown in FIG. 37 and the low-voltage decoder circuit 279 having a circuit constitution similar to that of the high-voltage decoder circuit 278 shown in FIG. 37 are used.

In FIG. 43, the differential amplifier shown in FIG. 15 is used in the high-voltage amplifier circuit 271 and the differential amplifier shown in FIG. 14 is used in the low-voltage amplifier circuit 272.

Figure 44:
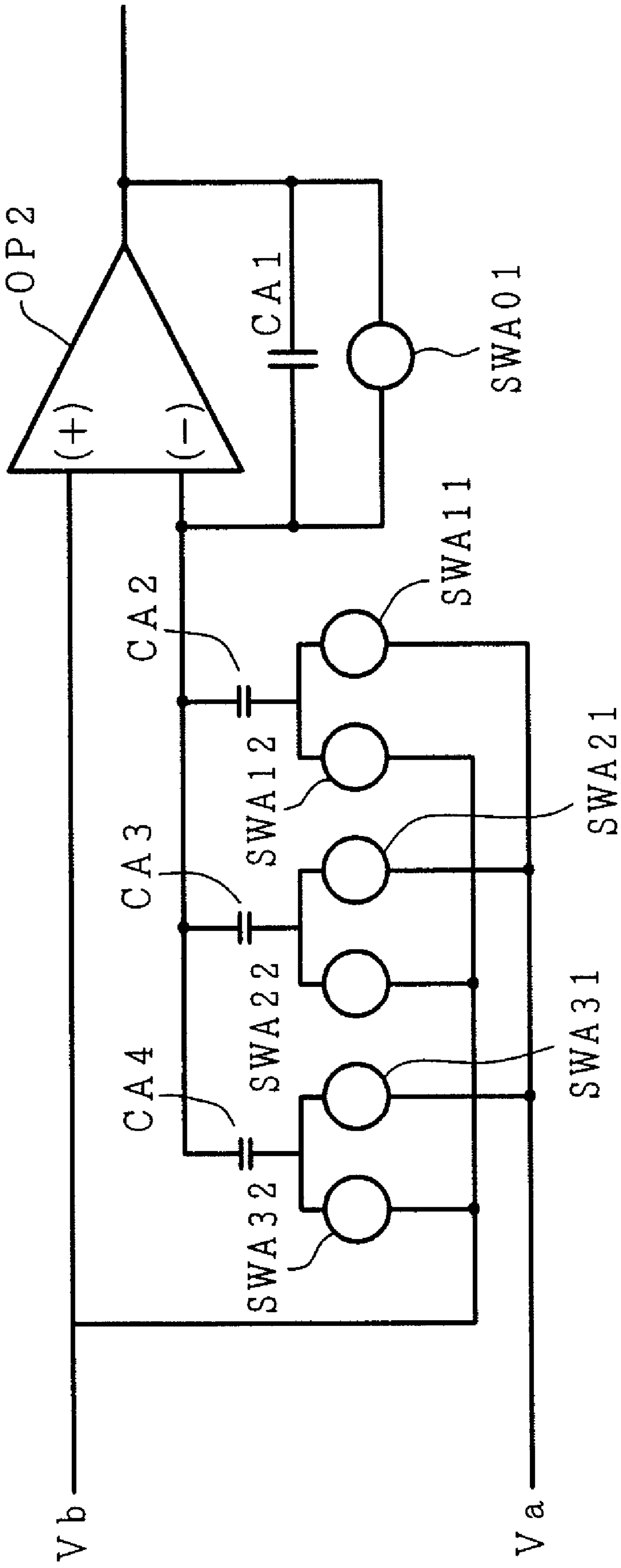
FIG. 44 is a diagram showing one of amplifier circuits for high voltage or for low voltage and a switched capacitor connected to an input stage of the one, shown in FIG. 43.

FIG. 44 is a diagram showing one of the high-voltage amplifier circuit 271 and the low-voltage amplifier circuit 272, and a switched capacitor 313 connected to an input stage of the one, shown in FIG. 43. As shown in FIG. 44, a parallel circuit of a switch circuit (SWA01) and a condenser (CA1) is connected between an inverting input terminal (−) and an output terminal of an op-amp (OP2) and the inverting input terminal (−) of the op-amp (OP2) is connected with one terminal of each of respective condensers (CA2, CA3, CA4).

The other terminals of the respective condensers (CA2, CA3, CA4) are supplied with one of two successive levels of the primary gray scale voltages, that is, the primary gray scale voltage (Va) outputted to the terminal (P1) shown in FIG. 37 via respective switch circuits (SWA11, SWA21, SWA31). The other of two successive levels of the primary gray scale voltages, that is, the primary gray scale voltage (Vb) outputted to the terminal (P2) shown in FIG. 37 is applied to a noninverting terminal (+) of the op-amp (OP2) and the other terminals of the respective condensers (CA2, CA3, CA4) via respective switch circuits (SWA12, SWA22, SWA32).

In this case, capacitance values of the condenser (CA2) and the condenser (CA4) are the same, a capacitance value of the condenser (CA3) is twice as much as the capacitance value of the condenser (CA2) and a capacitance value of the condenser (CAI) is four times as much as the capacitance value of the condenser (CA2).

In the inverting amplifier, in a resetting operation, the switch circuit (SWAO1) and the switch circuits (SwAII, SWA21, SWA31) are made ON and the switch circuits (SWA12, SWA22, SWA32) are made OFF.

In this state, the condenser (CAI) is reset, the op-amp (OP2) constitutes a voltage follower circuit, the output terminal and the inverting input terminal (−) of the op-amp (OP2) become at a potential of the primary gray scale voltage (Vb) and accordingly, the respective condensers (CA2-CA4) are charged to a voltage of (Vb−5 Va=ΔV).

Furthermore, in a normal state, the switch circuit (SWA01) is made OFF, and the switch circuits (SWA11, SWA21, SWA31) and the switch circuits (SWA12, SWA22, SWA32) are made ON or OFF as predetermined.

Thereby, the primary gray scale voltage of Va is inverted and amplified with the primary gray scale voltage (Vb) as, a reference and voltages of Vb+Va, Vb+Va+(1/4)ΔV, Vb+Va+(I/2)ΔV, Vb+Va+(3/4)ΔV are outputted from the output terminal of the op-amp (0P2).

Embodiment 4

A liquid crystal display module according to Embodiment 4 of the invention differs from the liquid crystal display module according to Embodiment 1 in that negative-polarity gray scale reference voltages (V"5-V"9) are outputted from the power supply circuit 120 to the drain driver 130, and in the drain driver 130, 32 levels of negative-polarity gray scale voltages are generated from the negative-polarity gray scale reference voltages (V"5-V"9), further, an inverting amplifier is used as the high-voltage amplifier circuit 271 and the negative-polarity gray scale voltages are inverted and amplified by the inverting amplifier and positive-polarity gray scale voltages are applied to the drain signal lines (D).

An explanation will be given of the drain driver 130 according to the embodiment centering on difference from Embodiment 1.

Figure 45:
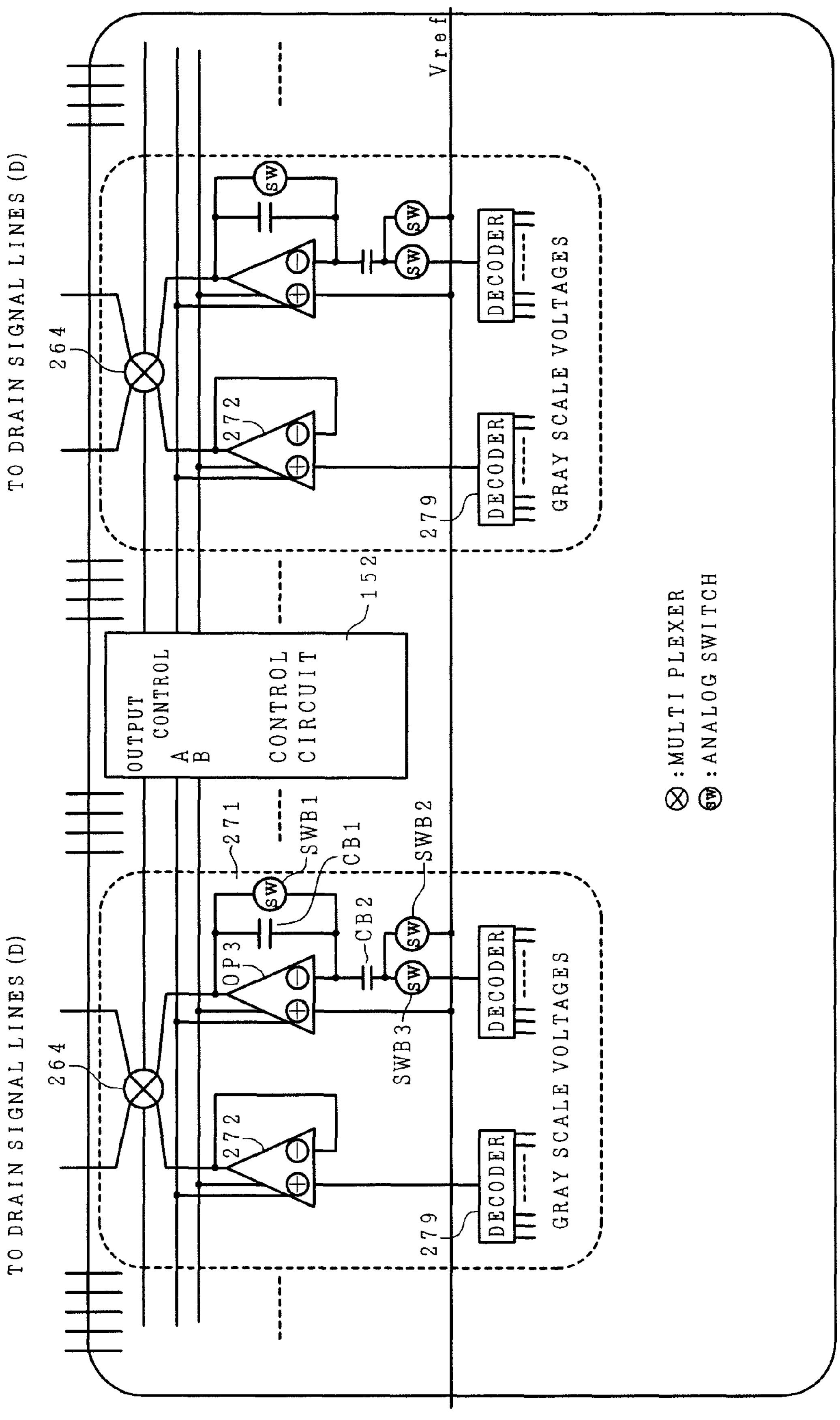
FIG. 45 is a diagram showing a constitution of an output stage of a drain driver according to Embodiment 4.

FIG. 45 is a diagram showing an outline constitution of the output stage of the drain driver 130 of the liquid crystal display module according to Embodiment 4.

In FIG. 45, the differential amplifier shown in FIG. 15 is used as the high-voltage amplifier circuit 271 and the differential amplifier shown in FIG. 14 is used as the low-voltage amplifier circuit 272.

In the high-voltage amplifier circuit 271 according to this embodiment, an op-amp (OP3) constitutes an inverting amplifier.

Therefore, the input stage of the op-amp (OP3) is connected with the low-voltage decoder circuit 279 shown in FIG. 6 in place of the high-voltage decoder circuit 278 shown in FIG. 6.

That is, according to this embodiment, the low-voltage decoder circuits 279 are used for all of the decoder portion 261 shown in FIG. 6.

Consequently, according to this embodiment, the positive voltage generating circuit 121 and the positive-polarity gray scale voltage generating circuit 151*a* are not necessary in the power supply circuit 120 (not shown) and in the drain driver 130 (not shown), respectively. As shown in FIG. 45, a parallel circuit of a switch circuit (SWB1) and a condenser (CB1) is connected between an inverting input terminal (−) and an output terminal of the op-amp (OP3), and the inverting input terminal (−) of the op-amp (OP3) is connected with one terminal of a condenser (CB2).

The other terminal of the condenser (CB2) is supplied with a gray scale voltage from the low-voltage decoder circuit 272 via a switch (SWB3) and is supplied with a reference voltage (Vref) via a switch (SWB2). Further, the reference potential (Vref) is applied to a noninverting input terminal (+) of the op-amp (OP3). In this case, the reference voltage (Vref) is also a potential of the liquid crystal drive voltage (Vcom) applied to the common electrode (ITO2).

In this inverting amplifier, in a resetting operation, the switch circuit (SWB1) and the switch circuit (SWB2) are made ON and the switch circuit (SWB3) is made OFF.

In this state, the op-amp (OP3) constitutes a voltage follower circuit, the output terminal and the inverting terminal of the op-amp (OP3) become at a potential of the reference voltage (Vref), the reference voltage (Vref) is also applied to the other terminal of the condenser (CB2) and accordingly, the condenser (CB1) and the condenser (CB2) are reset.

Moreover, in a normal state, the switch circuit (SWB1) and the switch circuit (SWB2) are made OFF, the switch circuit (SWB3) is made ON, a negative-polarity gray scale voltage inputted via the condenser (CA2) is inverted and amplified with the reference potential (Vref) as a reference and a positive-polarity gray scale voltage is outputted from the output terminal of the op-amp (OP3).

According to this embodiment, in place of the high-voltage decoder circuit 271 shown in FIG. 6, the low-voltage decoder circuit 272 shown in FIG. 6 is used, further, the positive voltage generating circuit 121 in the power supply circuit 120 and the positive-polarity gray scale voltage generating circuit 151*a* in the drain driver 130 are not needed and accordingly, the constitution can be simplified.

Embodiment 5

A liquid crystal display module according to Embodiment 5 of the invention differs from Embodiment 1 in that a single amplifier circuit 273 acts as the high-voltage amplifier circuit 271 and the low-voltage amplifier circuit 272.

An explanation will be given of the drain driver 130 according to this embodiment centering on difference from Embodiment 1.

Figure 46:
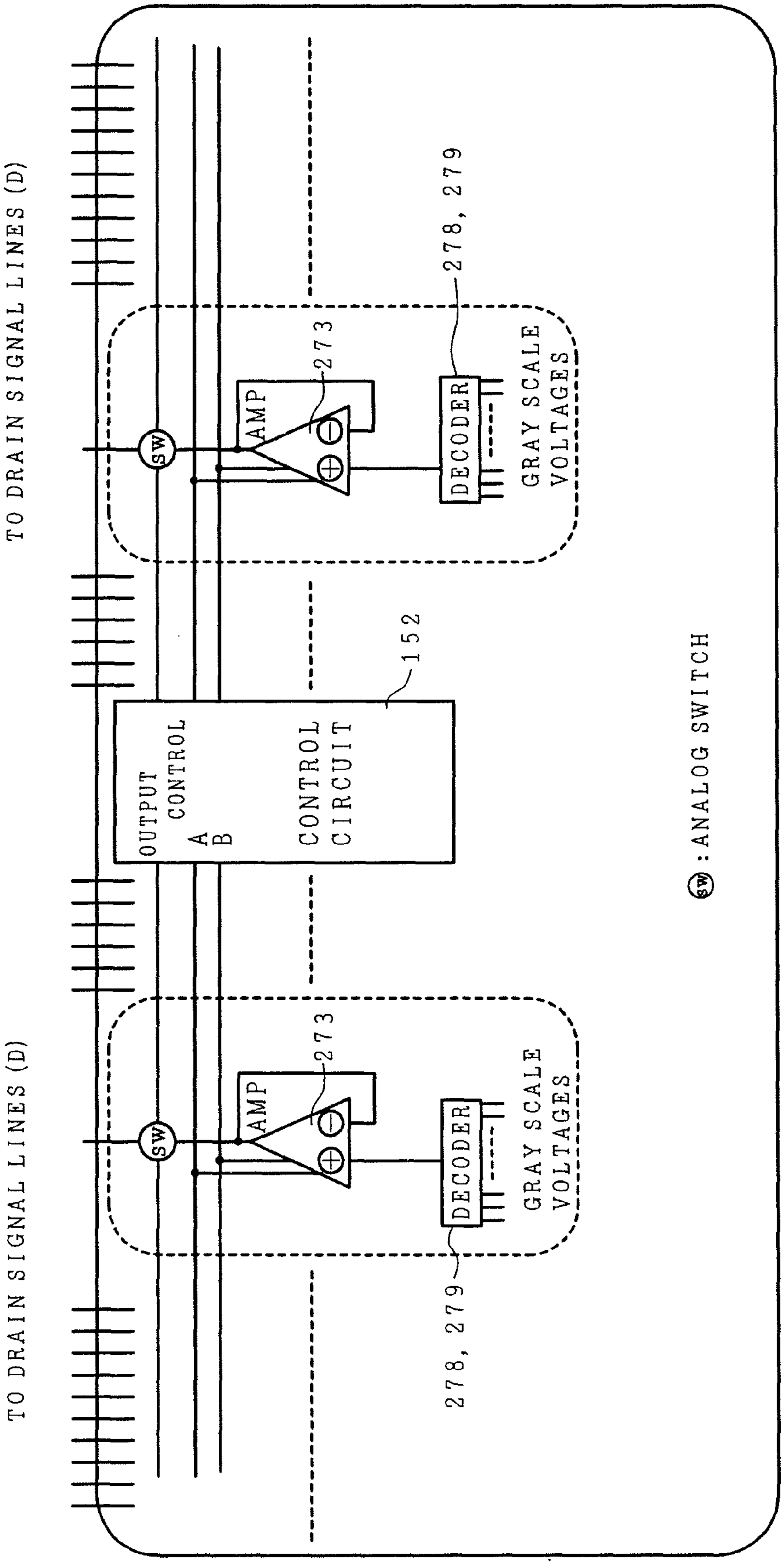
FIG. 46 is a diagram showing a constitution of an output stage of a drain driver according to Embodiment 5.

FIG. 46 is a diagram showing an outline constitution of the output stage of the drain driver 130 of the liquid crystal display module according to Embodiment 5.

In FIG. 46, reference numeral 273 designates a single amplifier circuit for outputting negative-polarity and positive-polarity gray scale voltages and according to this embodiment, negative-polarity and positive-polarity gray scale voltages are outputted from the amplifier circuit 273.

Therefore, the amplifier circuit 273 needs to be supplied with a positive-polarity gray scale voltage selected by the high-voltage decoder circuit 278 or a negative-polarity gray scale voltage selected by the negative-voltage decoder circuit 279.

Figure 47:
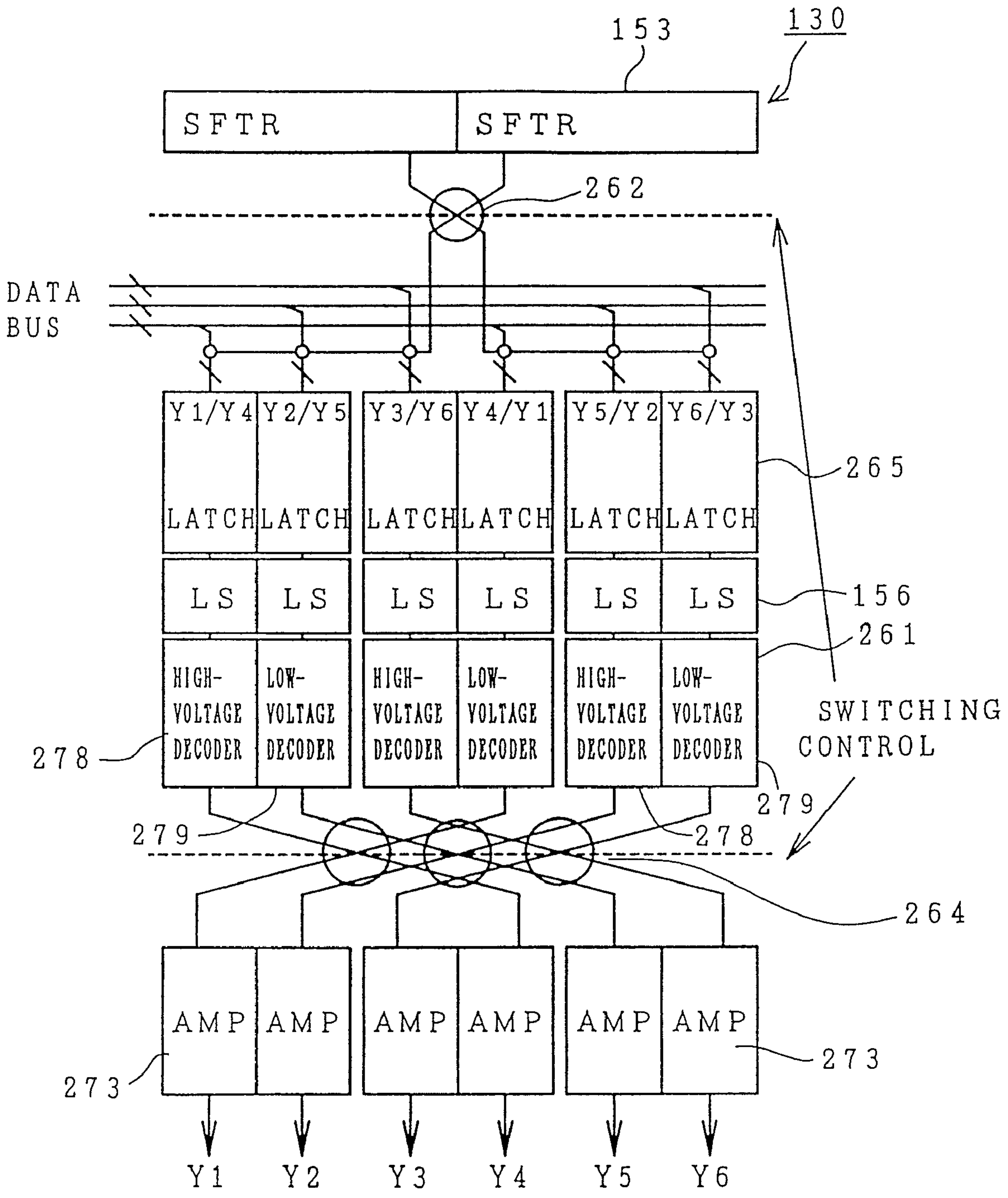
FIG. 47 is a block diagram for explaining a constitution of the drain driver according to Embodiment 5 centering on a constitution of an output circuit.

As shown in FIG. 47, the switch portion (2) 264 needs to be installed between the decoder portion 261 and the amplifier circuit 273.

Figure 48:
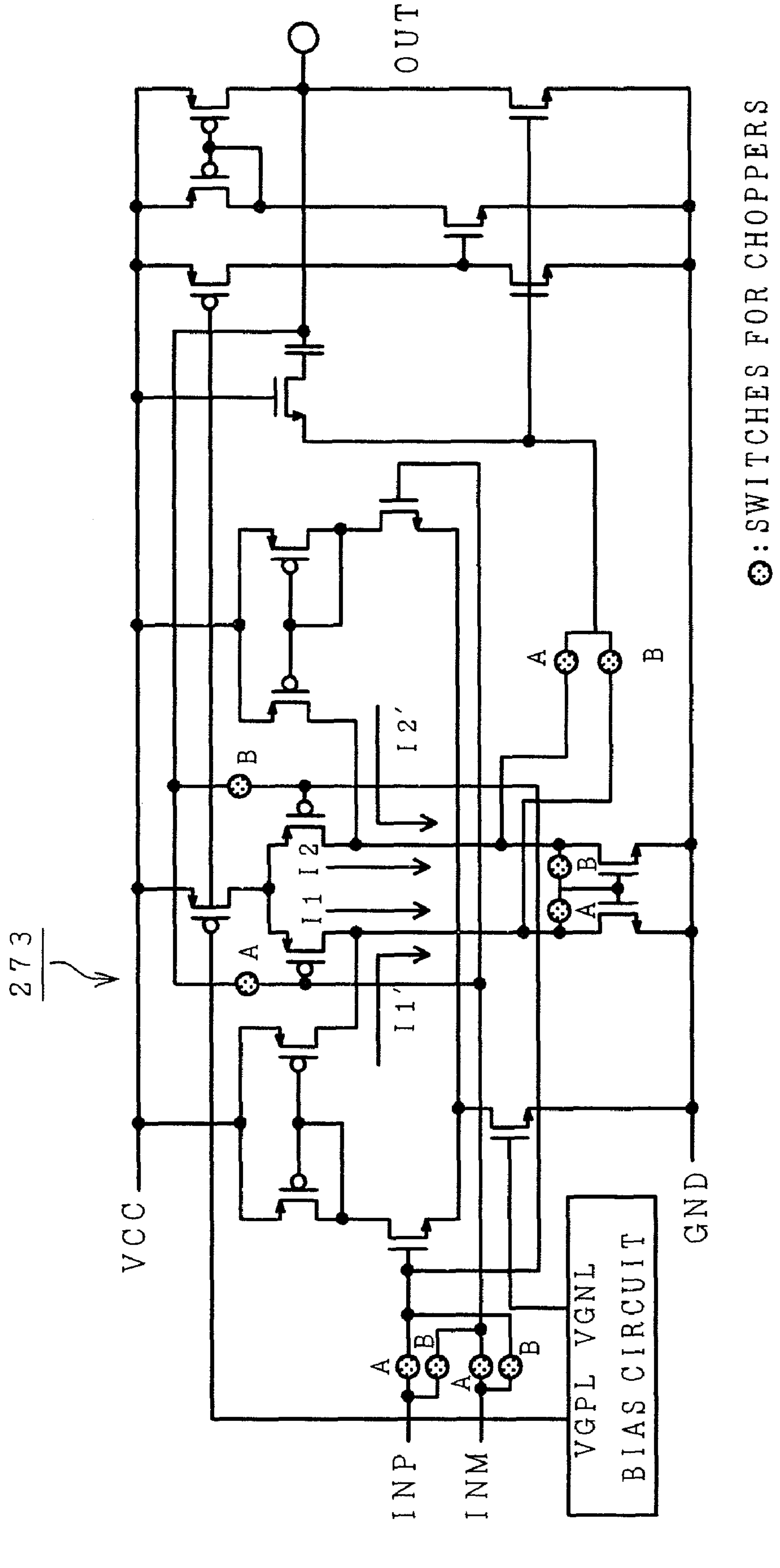
FIG. 48 is a circuit diagram showing a circuit constitution of an example of a differential amplifier used in an amplifier circuit shown in FIG. 47.

FIG. 48 is a diagram showing a circuit constitution of an example of a differential amplifier used in the amplifier circuit 273 shown in FIG. 46.

In the amplifier circuit 273 shown in FIG. 48, notation • designate switching transistors, • labeled "A" in the drawing designate switching transistors which are made ON by a control signal (A) and • labeled "B" designate switching transistors which are made ON by a control signal (B).

In this amplifier circuit 273, the output stage is configured by a push-pull constitution to output negative-polarity and positive-polarity gray scale voltages with the single amplifier circuit.

Additionally, the amplifier circuit 273 provides a wide dynamic range since currents (11', 12') can be flowed even when the currents (11, 12) are made OFF.

According to this embodiment, a single amplifier circuit is configured to output negative-polarity and positive-polarity gray scale voltages to a corresponding drain signal line (D), the brightness of each pixel is determined by its potential with respect to the common potential (Vcom) applied to the common electrode (ITO2). No problem of vertical spurious lines occurs on a displayed image if a voltage difference (|VH−Vcom|) between a positive-polarity gray scale voltage (VH) and the potential (Vcom) of the common electrode (ITO2) is equal to a voltage difference (|VL−Vcom|) between a negative-polarity gray scale voltage (VL) and the potential (Vcom) of the common electrode (ITO2), but in many cases, there occurs a difference between the positive-polarity gray scale voltages (VII) and the negative-polarity gray scale voltages (VL), due to asymmetrical characteristics of the liquid crystal layer with respect to the polarity of a voltage applied across it, or unintentional coupling in the gate drivers 140 and accordingly, this embodiment is advantageous.

Embodiment 6

As mentioned above, a higher resolution liquid crystal panel is requested in a liquid crystal display device.

For such a higher resolution liquid crystal panel, the display control circuit 110, the drain driver 130 and the gate driver 140 have to perform high-speed operation, particularly, the clock (CL2) outputted from the display control circuit 110 to the drain driver 130 and the operating frequency of display data undergo the considerable influence of high-speed operation. For example, in a liquid crystal display panel having 1024×768 pixels of an XGA display mode, the clock (CL2) frequency is 65 MHz and display data frequency is 32.5 MHz (half of 65 MHz).

Accordingly, for example, in the case of XGA display mode, in a liquid crystal display module of the embodiment, the frequency of the clock (CL2) between the display control circuit 110 and the drain driver 130 is 32.5 MHz (half of 65 MHz) and display data are latched on both the positive-going transition and the negative-going transition of the clock CL2 in the drain driver 130.

Figure 49:
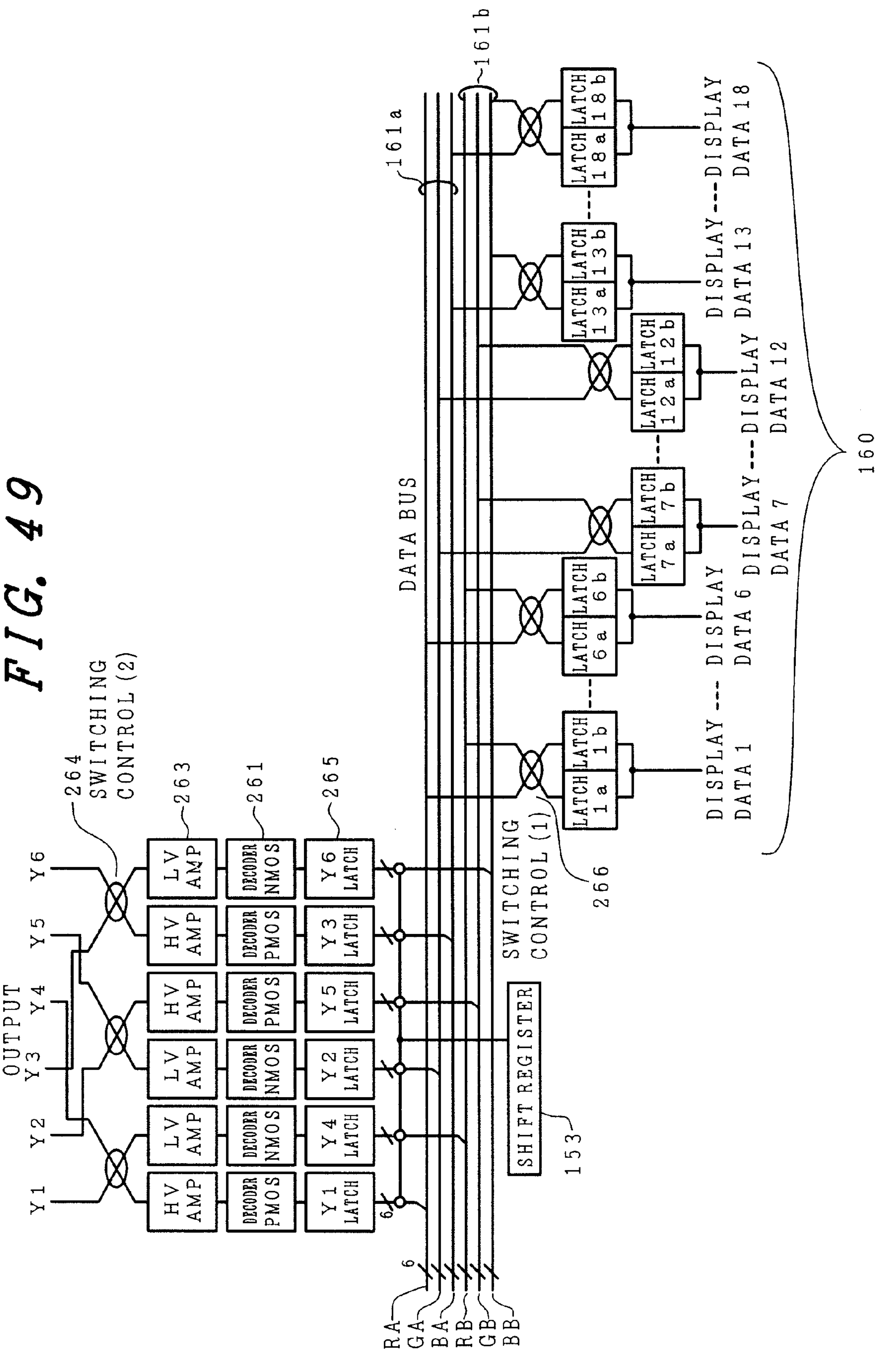
FIG. 49 is a block diagram for explaining a constitution of a drain driver 130 according to Embodiment 6 centering on a constitution of an output circuit.

FIG. 49 is a block diagram for explaining the constitution of the drain driver 130 according to Embodiment 6 centering on a constitution of an output circuit.

The structure of FIG. 49 corresponds to that of FIG. 6, but is slightly different from that of FIG. 6 and the shift register circuit (designated by numeral 156 in FIG. 6) is omitted.

An explanation will be given of the driver 130 according to this embodiment centering on a difference from Embodiment 1.

As shown in FIG. 49, a pre-latch circuit 160 is installed in the driver 130 according to the embodiment.

Figure 50:
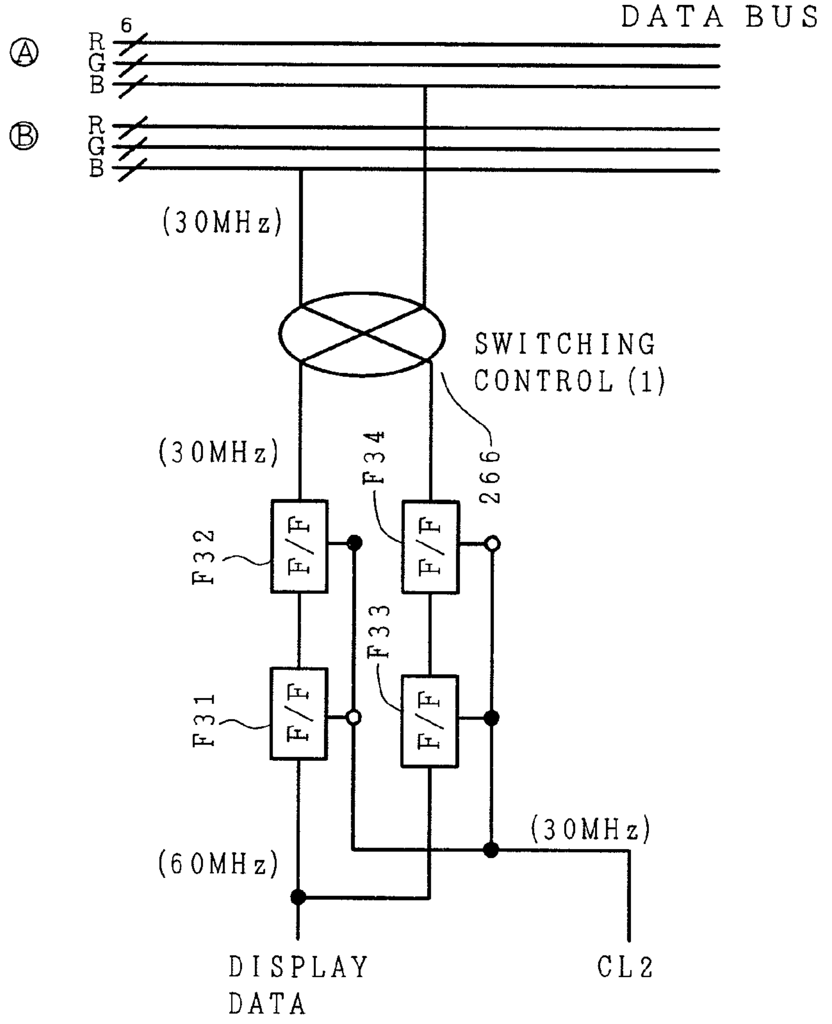
FIG. 50 is a diagram showing a circuit constitution of a pre-latch circuit 160 shown in FIG. 49.

FIG. 50 is a diagram showing a section of the pre-latch circuit 160 shown in FIG. 49.

As shown in FIG. 50, one display data transmitted from the display control circuit 110 is latched by a flip/flop circuit (F31) on the positive-going transition of the clock CL2, then is latched by a flip/flop circuit (F32) on the negative-going transition of the clock CL2, and is outputted to a switch portion (3) 266. Further, another succeeding display data is latched by a flip/flop circuit (F33) on the negative-going transition of the clock CL2, then is latched by a flip/flop circuit (F34) on the positive-going transition of the clock CL2, and is outputted to the switch portion (3) 266.

Display data latched by the pre-latch circuit 160 is selected by the switch portion (3) and is outputted alternately to the bus line 161*a* and the bus line 161*b* of display data.

Display data on two routes of the bus lines (161*a*, 161*b*) are inputted to the data latch portion 265 based on a control signal for data input from the shift register 153.

In this case, data of 2 pixels (data for six drain signal lines (D)) are inputted to the data latch portion 265 at one time.

A gray scale voltage in correspondence with display data is outputted from the amplifier pair 263 of the drain driver 130 to each drain signal line (D) based on display data latched at the data latch portion 265.

The operation is the same as in Embodiment 1 and therefore an explanation thereof will be omitted.

Figure 51:
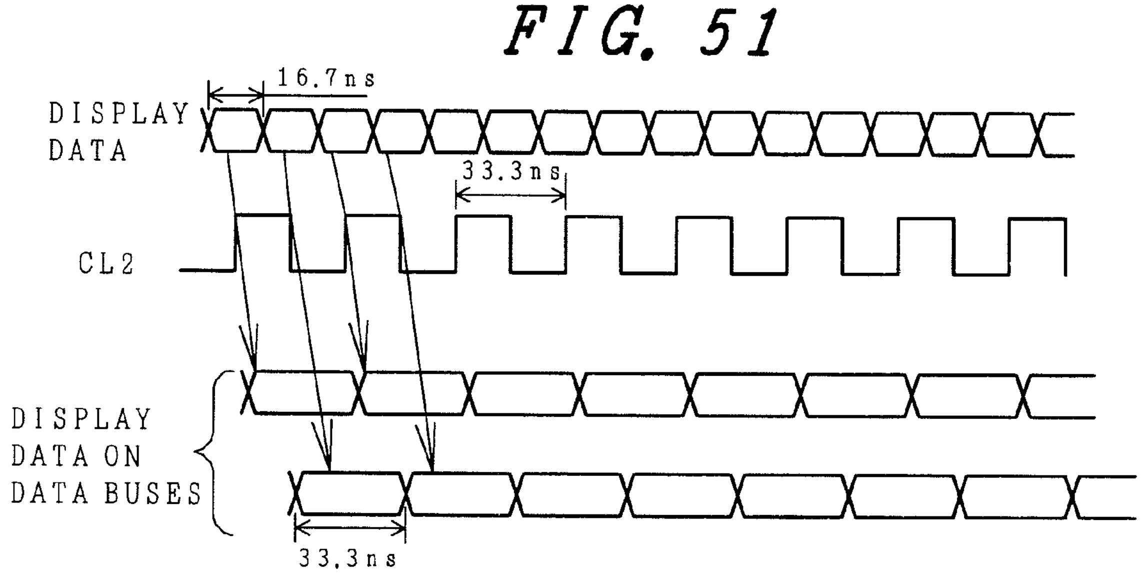
FIG. 51 is a diagram for explaining display data on bus lines (161*a*, 161*b*) and an operating frequency of a clock (CL2)

FIG. 51 is a diagram for explaining display data on the bus lines (161*a*, 161*b*) shown in FIG. 49 and the operating frequency of the clock (CL2). An explanation will be given of a case in which the frequency of display data is 60 MHz for one piece of data (30 MHz for two pieces of data) and the frequency of the clock (CL2) is 30 MHz in FIG. 51.

Figure 52:
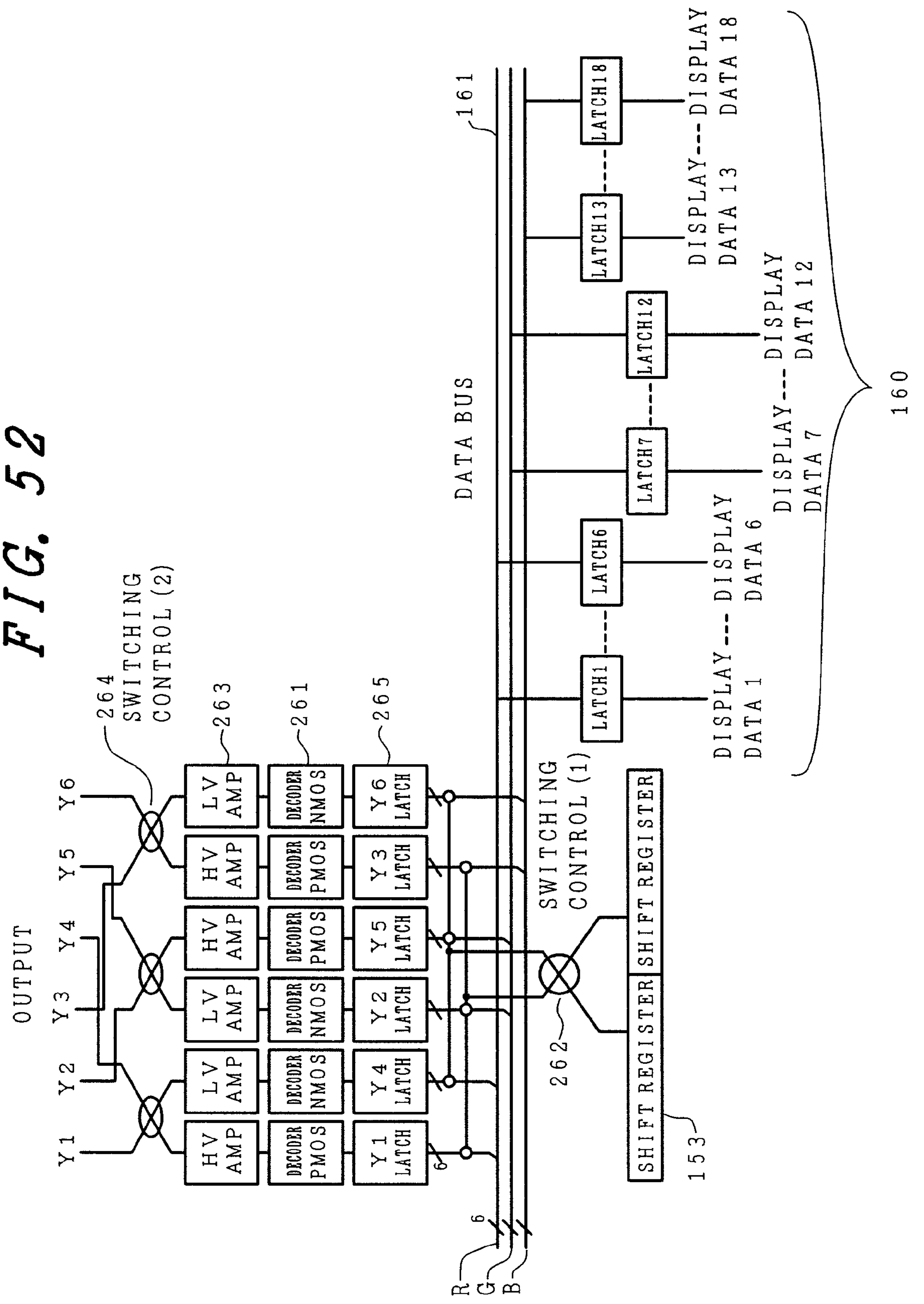
FIG. 52 is a block diagram for explaining a constitution of a drain driver centering on a constitution of an output circuit when display data is latched on the positive-going transition and the negative-going transition of the clock CL2 in the case where only one route of a bus line is provided in the drain driver.

As shown in FIGS. 50 and 51, display data transmitted from the display control circuit 110 at a frequency of 60 MHz, are latched by a pair of the flip/flop circuits (F31) and (F32) and a pair of the flip/flop circuits (F33) and (F34) and are transmitted to the bus lines (161*a*, 161*b*), and accordingly, the frequency of display data on the bus lines (161*a*, 161*b*) is 30 MHz for one piece of data (15 MHz for two pieces of data). FIG. 52 is a block diagram for explaining a constitution of the drain driver centering on an output circuit when display data is latched on the positive-going transition and the negative-going transition of the clock CL2 and when only one route of the bus line 161 is installed in the drain driver.

Figure 53:
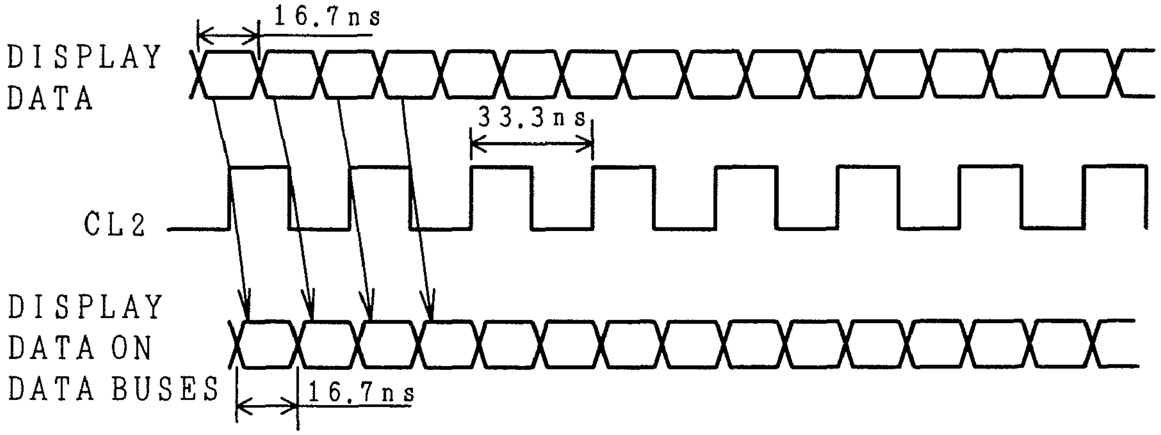
FIG. 53 is a diagram for explaining display data on the bus line shown in FIG. 52 and an operating frequency of the clock CL2.

FIG. 53 is a diagram for explaining display data on the bus line 161 shown in FIG. 52 and the operating frequency of the clock (CL2).

As is known from FIG. 53, when there is only one route of the bus line 161 in the drain driver, the frequency of display data on the one route of the bus line 161 becomes 60 MHz which is the same as that of display data transmitted from the display control circuit 110.

Figure 54:
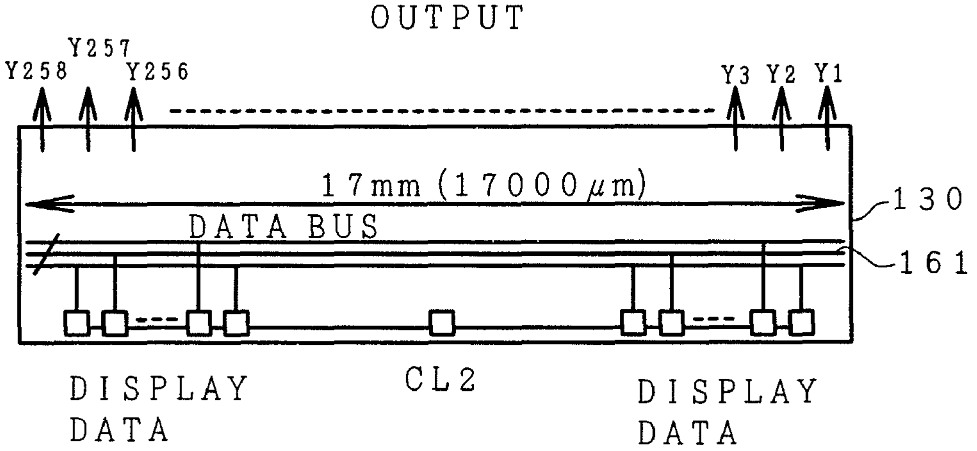
FIG. 54 is a diagram showing layout of the bus line in a semiconductor integrated circuit constituting the drain driver shown by FIG. 52.

FIG. 54 shows a layout of the bus line 161 in a semiconductor integrated circuit of the drain driver shown in FIG. 52.

As shown in FIG. 54, the bus line 161 is formed lengthwise up to both ends of the semiconductor integrated circuit constituting the drain driver and accordingly, the more remote from the pre-latch circuit 160, the more increased is a delay time.

Accordingly, when the frequency of display data on one route of the bus line 161 is the same frequency as that of display data transmitted from the display control circuit 110 (for example, 60 MHz), a timing margin for latching display data is reduced at the end remote from the pre-latch circuit 160.

However, according to this embodiment, two routes of the bus lines (161*a*, 161*b*) are installed, the frequency of display data on two routes of the bus lines (161*a*, 161*b*) can be made a half (for example, 30 MHz) of the frequency (for example, 60 MHz) transmitted from the display control circuit 110 and accordingly, compared with the case of the drain driver shown in FIG. 52, the timing margin in the case of latching display data at the end remote from the pre-latch circuit 160 can be doubled. Thereby, according to this embodiment, high-speed operation of the drain driver 130 can be achieved. Further, the drain driver shown in FIG. 52 needs one flip/flop circuit of the shift register 153 for every three drain signal lines (D) (for example, 86 when the total number of drain signal lines (D) is 258).

However, in the drain driver 130 of this embodiment, data for two pixels (data for six drain signal lines (D)) is inputted to the data latch portion 265 at one time and accordingly, one flip/flop circuit of the shift register 153 may be installed for every six drain signal lines (D) (for example, 43 when the total number of drain signal lines (D) is 258) and the number of flip/flop circuits of the shift register 153 can be made a half of those of the drain driver 130 shown in FIG. 52.

Moreover, in the drain driver 130 of this embodiment, display data from the pre-latch circuit 160 is outputted alternately to each of the two routes of the bus lines (161*a*, 161*b*) by using the switch portion (3) 266 and accordingly, the switch portion (1) 262 shown in FIG. 52 is not needed.

One switch portion (1) 262 is needed for every six drain signal lines (D) (for example, 43 when the total number of drain signal lines (D) is 258). However, the number of the switch portion (3) 266 of the drain driver 130 is no more than the number of bits for display data (in FIG. 49, 18 since display data is of six bits).

In this way, in the drain driver 130 of the embodiment, compared with the drain driver shown in FIG. 52, the number of flip/flop circuits of the shift register 153 and the switch portions can considerably be reduced and the constitution of the internal structure of the drain driver 130 can be simplified.

Although, in the above-described respective embodiments, an explanation has been given of embodiments in which the present invention is applied to a vertical field type liquid crystal display panel, the present invention is not limited thereto, but the present invention is also applicable to a horizontal field type liquid crystal display panel in which an electric field is applied in the direction parallel to its liquid crystal layer and which is commonly called an in-plane switching type liquid crystal display panel shown in FIG. 49.

Figure 55:
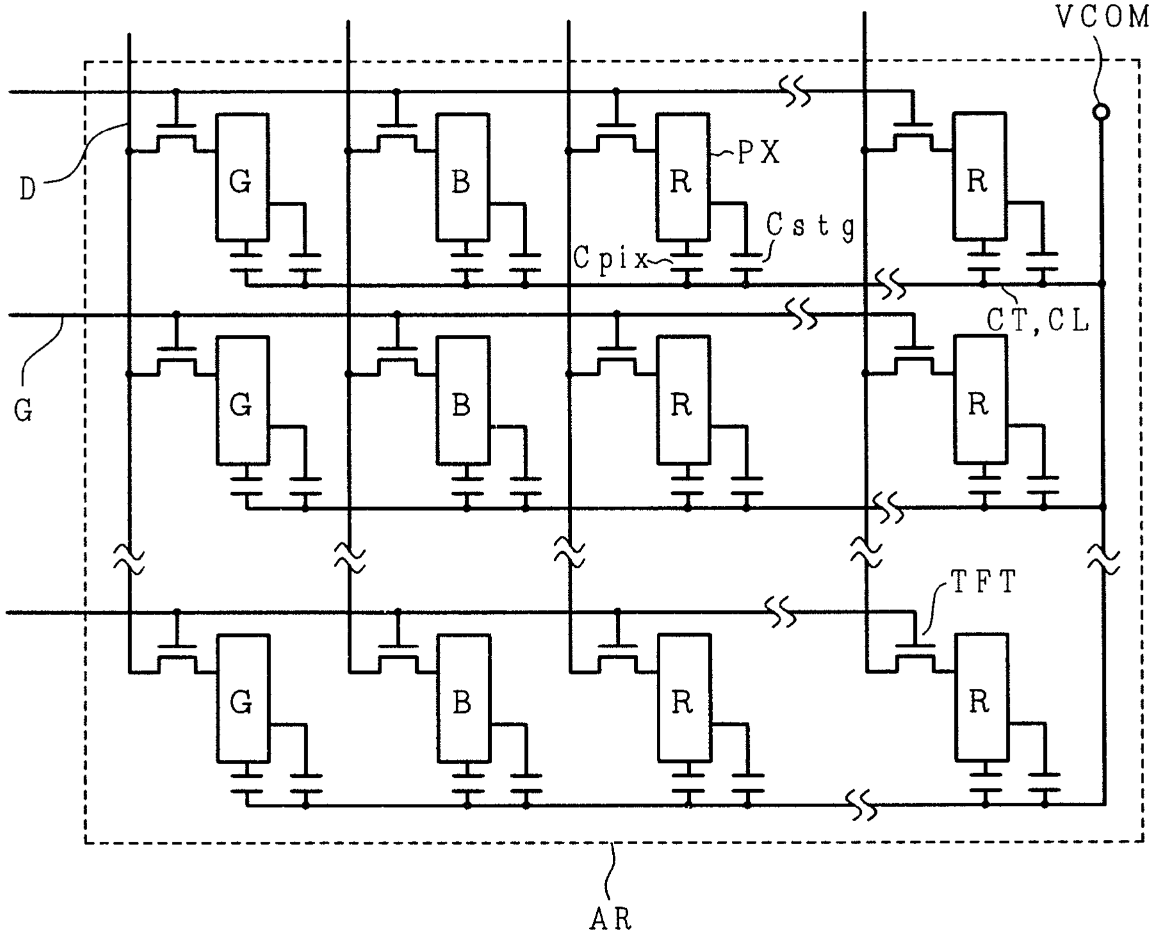
FIG. 55 is a diagram showing an equivalent circuit of an in-plane switching type liquid crystal panel.

FIG. 55 is a diagram showing an equivalent circuit of a liquid crystal display panel of the in-plane switching type.

In the liquid crystal display panel of a vertical field type shown in FIG. 2 or FIG. 3, the common electrode (ITO2) is disposed on a color filter substrate, but in the liquid crystal display panel of the in-plane switching type, a TFT substrate is provided with a counter electrode (CT) and signal lines for the counter electrode (CL) for applying a drive voltage (VCOM) to the counter electrode (CT).

Accordingly, the capacitance of the liquid crystal layer (Cpix) is equivalently connected between a pixel electrode (PX) and the counter electrode (CT). Further, the holding capacitance (Cstg) is also formed between the pixel electrode (PX) and the counter electrode (CT).

Moreover, although, in the above-described embodiments, an explanation has been given of the embodiments in which the dot-inversion drive method is used, the invention is not limited thereto, but the invention is applicable to a common-electrode voltage inversion drive method of inverting polarities of both drive voltages applied to a common electrode (ITO2) and a pixel electrode (ITO1) on successive lines or on successive frames.

Although a specific explanation has been given of the present invention carried out by the inventors based on the embodiments of the invention, the invention is not limited to the above-explained embodiments of the invention, and various changes and modifications can be made to those embodiments without departing from the true spirit and scope of the invention.

Advantages provided by the representative embodiments of the present invention can be summarized as follows:

(1) Improvement of display quality by preventing black or white spurious-signal vertical lines from appearing in a displayed image due to offset voltages in amplifier circuits of video signal line driver circuits;

(2) Reduction of an area occupied by level shift circuits in a chip of video signal line driver circuits by using low source-drain voltage rating transistors in the level shift circuit compared with the case of using higher source-drain voltage rating transistors;

(3) Reduction of border areas of the liquid crystal display panel, reduction of cost and improvement of reliability by the above-mentioned reduction of the chip size of the video signal line driver circuits; and (4) Sufficient timing margin in latching display data in a semiconductor IC of video signal line driver circuits even when the display data latch clock frequency and the operating frequency of display data are increased.

What is claimed is:

1. A liquid crystal display device including a plurality of drain signal lines, a plurality of gate signal lines arranged to intersect said plurality of drain signal lines, and a plurality of thin film transistors disposed in vicinities of intersections of said plurality of drain signal lines and said plurality of gate signal lines and coupled to corresponding ones of said plurality of drain signal lines and said plurality of gate signal lines, and a drain driver which supplies signal voltages to said plurality of drain signal lines, said drain driver comprising:

an amplifier circuit which outputs a signal voltage to a corresponding one of said plurality of drain signal lines;

wherein said amplifier circuit includes a switching circuit which switches between a first state and a second state, said first state being a state where a first input terminal of said amplifier circuit is coupled to an inverting input terminal and a second input terminal is coupled to a noninverting input terminal, and said second state being a state where said first input terminal is coupled to said noninverting input terminal and said second input terminal is coupled to said inverting input terminal; and wherein said signal voltages supplied to said plurality of thin film transistors coupled to a given one of said plurality of gate signal lines, via said plurality of drain signal lines are gray scale voltages one of plus and minus offset voltages in a first frame, and are gray scale voltages one of plus and minus said offset voltage in a second frame.

2. A liquid crystal display device according to claim 1, wherein said signal voltages supplied to said plurality of thin film transistors coupled to a first one of said plurality of gate signal lines, adjacent to said given one of said plurality of gate signal lines, via said plurality of drain signal lines are gray scale voltages plus said offset voltages in said first frame, and are gray scale voltages minus said offset voltage in said second frame.

3. A liquid crystal display device according to claim 1, wherein said signal voltages supplied to said plurality of thin film transistors coupled to a first one of said plurality of gate signal lines, adjacent to said given one of said plurality of gate signal lines, via said plurality of drain signal lines are gray scale voltages minus said offset voltages in said first frame, and are gray scale voltages plus said offset voltage in said second frame.

4. A video signal line driving circuit including an amplifier circuit which outputs a drive voltage to a video signal line, wherein said amplifier circuit includes a switching circuit which switches between a first state and a second state, said first state being a state where a first input terminal of said amplifier circuit is coupled to an inverting input terminal and a second input terminal is coupled to a noninverting input terminal, and said second state being a state where said first input terminal is coupled to said noninverting input terminal and said second input terminal is coupled to said inverting input terminal, and wherein said drive voltage supplied to said video signal line and corresponding to a first line in a first frame is a gray scale voltage one of plus and minus an offset voltage, and said drive voltage supplied to said video signal line and corresponding to said first line in a second frame is a gray scale voltage one of plus and minus said offset voltage.

5. A video signal line driving circuit according to claim 4, wherein said drive voltage supplied to said video signal line and corresponding to a second line in said first frame is a gray scale voltage plus said offset voltage, and said drive voltage supplied to said video signal line and corresponding to said second line in said second frame is a gray scale voltage minus said offset voltage.

6. A video signal line driving circuit according to claim 4, wherein said drive voltage supplied to said video signal line and corresponding to a second line in said first frame is a gray scale voltage minus said offset voltage, and said drive voltage supplied to said video signal line and corresponding to said second line in said second frame is a gray scale voltage plus said offset voltage.

* * * * *